(12) United States Patent
Wu et al.

(10) Patent No.: US 9,529,683 B2
(45) Date of Patent: *Dec. 27, 2016

(54) METHOD, SYSTEM, AND APPARATUS FOR CLOUD APPLICATION REDUNDANCY

(71) Applicant: Huawei Technologies Co., Ltd., Shenzhen (CN)

(72) Inventors: Xiangyang Wu, Xi'an (CN); Fengshao Zou, Shenzhen (CN); Gaoding Fu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,188

(22) Filed: Jun. 11, 2015

(65) Prior Publication Data

US 2015/0309896 A1 Oct. 29, 2015

Related U.S. Application Data

(63) Continuation of application No. 14/539,332, filed as application No. PCT/CN2013/085823 on Oct. 23, 2013.

(51) Int. Cl.
*G06F 11/00* (2006.01)
*G06F 11/20* (2006.01)
(Continued)

(52) U.S. Cl.
CPC ....... *G06F 11/2033* (2013.01); *G06F 9/45533* (2013.01); *G06F 11/1464* (2013.01);
(Continued)

(58) Field of Classification Search
CPC .................... G06F 11/1464; G06F 11/2033
See application file for complete search history.

(56) References Cited

U.S. PATENT DOCUMENTS 7,401,251 B1 * 7/2008 Haynes ............... G06F 11/1464
714/5.11
8,234,469 B2 * 7/2012 Ranade ............... G06F 11/1451
707/602
(Continued)

FOREIGN PATENT DOCUMENTS

CN 101448028 A 6/2009
CN 102025776 A 4/2011
(Continued)

OTHER PUBLICATIONS

Foreign Communication From A Counterpart Application, Chinese Application No. 201380001445.5, Chinese Search Report dated Sep. 19, 2014, 10 pages.
(Continued)

*Primary Examiner* — Michael Maskulinski
(74) *Attorney, Agent, or Firm* — Conley Rose, P.C.

(57) ABSTRACT

A redundancy method, system, and apparatus, which can acquire first description information of a cloud application needing redundancy, where the first description information includes information about a source virtual machine and a source network which are used at a production site by the cloud application needing redundancy; and can generate second description information of the cloud application needing redundancy at a redundancy site based on the first description information that gives an overall description about the cloud application needing redundancy, where the second description information gives an overall description about the deployment of the cloud application needing redundancy at the redundancy site; and the redundancy site is capable of acquiring the second description information, to recover the cloud application needing redundancy at the redundancy site, thereby implementing redundancy based on a cloud application.

14 Claims, 21 Drawing Sheets

(51) Int. Cl.
    *G06F 11/14*       (2006.01)
    *G06F 9/455*       (2006.01)
    *H04L 29/08*       (2006.01)

(52) U.S. Cl.
    CPC ...... *G06F 11/1484* (2013.01); *G06F 11/2097* (2013.01); *H04L 67/10* (2013.01); *G06F 2201/805* (2013.01); *G06F 2201/815* (2013.01)

(56) References Cited

U.S. PATENT DOCUMENTS

| | | | |
|---|---|---|---|
| 2009/0249284 A1* | 10/2009 | Antosz | G06F 8/10 717/104 |
| 2011/0258481 A1 | 10/2011 | Kern | |
| 2012/0136833 A1 | 5/2012 | Bartholomy et al. | |
| 2012/0167088 A1 | 6/2012 | Sok | |
| 2013/0086585 A1 | 4/2013 | Huang et al. | |
| 2013/0103834 A1 | 4/2013 | Dzerve et al. | |
| 2013/0111260 A1 | 5/2013 | Reddy et al. | |
| 2013/0111471 A1 | 5/2013 | Chandrasekaran | |
| 2015/0341221 A1 | 11/2015 | Vatnikov et al. | |
| 2016/0117231 A1* | 4/2016 | Lee | G06F 11/1469 714/4.11 |

FOREIGN PATENT DOCUMENTS

| | | |
|---|---|---|
| CN | 102523257 A | 6/2012 |
| CN | 102591741 A | 7/2012 |
| CN | 102629224 A | 8/2012 |
| CN | 102917064 A | 2/2013 |
| EP | 2648391 A1 | 10/2013 |

OTHER PUBLICATIONS

Foreign Communication From A Counterpart Application, European Application No. 13882628.4, Extended European Search Report dated May 13, 2015, 7 pages.

Foreign Communication From A Counterpart Application, PCT Application No. PCT/CN2013/085823, English Translation of International Search Report dated Aug. 1, 2014, 2 pages.

Foreign Communication From A Counterpart Application, PCT Application No. PCT/CN2013/085823, Written Opinion dated Aug. 1, 2014, 7 pages.

Office Action dated Nov. 3, 2016, 33 pages, U.S. Appl. No. 14/539,332, filed Nov. 12, 2014.

\* cited by examiner

METHOD, SYSTEM, AND APPARATUS FOR CLOUD APPLICATION REDUNDANCY

CROSS-REFERENCE TO RELATED APPLICATIONS

This application is a continuation of U.S. patent application Ser. No. 14/539,332, filed on Nov. 12, 2014, which is a continuation of International Patent Application PCT/CN2013/085823, filed on Oct. 23, 2013, both of which are hereby incorporated by reference in their entireties.

TECHNICAL FIELD

Embodiments of the present invention relate to computer technologies, and in particular, to a method, a system, and an apparatus for cloud application redundancy.

BACKGROUND

When a computer system suffers from disasters such as a fire, flood, an earthquake, or a war, if no effective measure is taken, cloud applications may be interrupted and data may be lost in the entire computer system, which brings about a great loss. A redundancy technology can effectively deal with impact on the computer system from an ambient environment, and particularly, a disastrous event. In the case of a disaster, the redundancy technology can back up data at a production site to a redundancy site, which ensures security of user data and high availability of the system.

A virtualization technology integrates a plurality of operating systems into one high-performance server, which maximizes the utilization of all resources of a hardware module, and can implement more cloud applications with less investment. This can not only simplify a system architecture, but also reduce resource management difficulty, so that the technology is widely applied in computer systems. At present, the prior art mainly uses the following manner to implement redundancy for cloud applications running on a virtualized computer system.

An administrator determines a virtual machine included in a cloud application needing redundancy, that is, the administrator specifies a virtual machine needing redundancy, then queries a virtualization module at a production site to determine a storage unit used by the virtual machine needing redundancy, and configures a corresponding storage unit at a redundancy site for the virtual machine needing redundancy, so that the redundancy site can replicate data in the storage unit used by the virtual machine needing redundancy to the corresponding storage unit at the redundancy site.

When redundancy needs to be performed for the production site, a virtual machine is created at the redundancy site, and corresponding configuration is performed for the created virtual machine by means of manual operations, for example, a corresponding network is configured, so that storage and a network of the virtual machine needing redundancy can be recovered at the redundancy site, so as to complete virtualized redundancy of the production site.

The prior art recovers a virtual machine needing redundancy at a production site, and an administrator specifies a virtual machine for which backup and recovery are to be implemented for redundancy. Because a cloud application is deployed at multiple virtual machines, if a part of virtual machines are not specified when the administrator specifies the virtual machine needing redundancy, the part of virtual machines will not be recovered, and finally, the cloud application cannot be completely recovered. In addition, during a recovery process of the virtual machines in the prior art, networks of the virtual machines need to be configured manually one by one, causing the recovery process of multiple virtual machines to be slow and at low efficiency.

SUMMARY

Embodiments of the present invention propose a method, a system, and an apparatus for cloud application redundancy, which can completely and rapidly recover a cloud application at a redundancy site.

According to a first aspect, an embodiment of the present invention proposes a method for cloud application redundancy, where the method includes acquiring first description information of a cloud application needing redundancy, where the first description information includes information about a source network used at a production site by the cloud application needing redundancy and information about a source virtual machine used at the production site by the cloud application needing redundancy; generating second description information of the cloud application needing redundancy according to the first description information, where the second description information includes information about a backup network used at a redundancy site by the cloud application needing redundancy and information about a backup virtual machine used at the redundancy site by the cloud application needing redundancy; and providing the second description information for the redundancy site, so that the redundancy site recovers the cloud application needing redundancy according to the second description information.

With reference to the first aspect, in a first possible implementation manner, the information about the source virtual machine used at the production site by the cloud application needing redundancy includes an identifier and specifications of the source virtual machine, information about a first storage unit occupied at the production site by the source virtual machine, and information about a home network of the source virtual machine; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

With reference to the first possible implementation manner of the first aspect, in a second possible implementation manner, the generating second description information of the cloud application needing redundancy according to the first description information includes determining the identifier and the specifications of the backup virtual machine according to the identifier and the specifications of the source virtual machine; determining the information about the second storage unit according to the information about the first storage unit; configuring the information about the backup network for the cloud application needing redundancy according to the information about the source network; and determining the information about the home network of the backup virtual machine according to the information about the backup network, the identifier of the backup virtual machine, and the information about the home network of the source virtual machine.

With reference to the first aspect or the first possible implementation manner of the first aspect or the second possible implementation manner of the first aspect, in a third possible implementation manner, the method is applied to a redundancy system, where the redundancy system includes a cloud management module at the production site, a cloud management module at the redundancy site, and a redundancy management module; and the method includes acquiring, by the redundancy management module, the first description information of the cloud application needing redundancy from the cloud management module at the production site; generating, by the redundancy management module, the second description information of the cloud application needing redundancy according to the first description information; and registering, by the redundancy management module, the second description information with the cloud management module at the redundancy site, so that the cloud management module at the redundancy site recovers the cloud application needing redundancy according to the second description information.

With reference to the first aspect or the first possible implementation manner of the first aspect or the second possible implementation manner of the first aspect, in a fourth possible implementation manner, the method is applied to a redundancy system, where the redundancy system includes a cloud management module at the production site and a cloud management module at the redundancy site; and the method includes acquiring, by the cloud management module at the production site, the first description information of the cloud application needing redundancy; generating, by the cloud management module at the production site, the second description information of the cloud application needing redundancy according to the first description information; and registering, by the cloud management module at the production site, the second description information with the cloud management module at the redundancy site, so that the cloud management module at the redundancy site recovers the cloud application needing redundancy according to the second description information.

With reference to the first aspect or the first possible implementation manner of the first aspect or the second possible implementation manner of the first aspect, in a fifth possible implementation manner, the method is applied to a redundancy system, where the redundancy system includes a cloud management module at the production site, a redundancy management module at the production site, a redundancy management module at the redundancy site, and a cloud management module at the redundancy site; and the method includes acquiring, by the redundancy management module at the production site, the first description information of the cloud application needing redundancy from the cloud management module at the production site; generating, by the redundancy management module at the production site, the second description information of the cloud application needing redundancy according to the first description information; and sending, by the redundancy management module at the production site, the second description information to the redundancy management module at the redundancy site, so that the redundancy management module at the redundancy site registers the second description information with the cloud management module at the redundancy site, to recover the cloud application needing redundancy.

According to a second aspect, an embodiment of the present invention proposes a method for cloud application redundancy, where the method includes acquiring second description information of a cloud application needing redundancy, where the second description information includes information about a backup network used at a redundancy site by the cloud application needing redundancy and information about a backup virtual machine used at the redundancy site by the cloud application needing redundancy; and registering the second description information with a cloud management module at the redundancy site, so that the cloud management module at the redundancy site recovers the cloud application needing redundancy according to the second description information.

With reference to the second aspect, in a first possible implementation manner, the acquiring second description information of a cloud application needing redundancy includes receiving the second description information sent by a redundancy management module at a production site; or acquiring first description information of the cloud application needing redundancy, where the first description information includes information about a source network used at the production site by the cloud application needing redundancy and information about a source virtual machine used at the production site by the cloud application needing redundancy, and generating the second description information of the cloud application needing redundancy according to the first description information.

According to a third aspect, an embodiment of the present invention proposes a method for cloud application redundancy, where the method includes acquiring second description information of a cloud application needing redundancy, where the second description information includes information about a backup network used at a redundancy site by the cloud application needing redundancy and information about a backup virtual machine used at the redundancy site by the cloud application needing redundancy; and recovering the cloud application needing redundancy at the redundancy site according to the second description information.

With reference to the third aspect, in a first possible implementation manner, the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

With reference to the first possible implementation manner of the third aspect, in a second possible implementation manner, the information about the home network of the backup virtual machine includes an association between a virtual network adapter of the backup virtual machine and the backup network, or a network address of the virtual network adapter of the backup virtual machine.

With reference to the first possible implementation manner or the second possible implementation manner of the third aspect, in a third possible implementation manner, the recovering the cloud application needing redundancy at the redundancy site according to the second description information includes creating the backup network according to the information about the backup network; creating the backup virtual machine according to the identifier and the specifications of the backup virtual machine and the information about the second storage unit; and associating the backup virtual machine with the backup network according to the information about the home network of the backup virtual machine.

According to a fourth aspect, an embodiment of the present invention proposes an apparatus for cloud application redundancy, where the apparatus includes an acquiring unit configured to acquire first description information of a cloud application needing redundancy, where the first description information includes information about a source network used at a production site by the cloud application needing redundancy and information about a source virtual machine used at the production site by the cloud application needing redundancy; a generating unit configured to generate second description information of the cloud application needing redundancy according to the first description information acquired by the acquiring unit, where the second description information includes information about a backup network used at a redundancy site by the cloud application needing redundancy and information about a backup virtual machine used at the redundancy site by the cloud application needing redundancy; and a submitting unit configured to provide, for the redundancy site, the second description information generated by the generating unit, so that the redundancy site recovers the cloud application needing redundancy according to the second description information.

With reference to the fourth aspect, in a first possible implementation manner, the information about the source virtual machine used at the production site by the cloud application needing redundancy includes an identifier and specifications of the source virtual machine, information about a first storage unit occupied at the production site by the source virtual machine, and information about a home network of the source virtual machine; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

With reference to the first possible implementation manner of the fourth aspect, in a second possible implementation manner, the generating unit is configured to determine the identifier and the specifications of the backup virtual machine according to the identifier and the specifications of the source virtual machine; determine the information about the second storage unit according to the information about the first storage unit; configure the information about the backup network for the cloud application needing redundancy according to the information about the source network; and determine the information about the home network of the backup virtual machine according to the information about the backup network, the identifier of the backup virtual machine, and the information about the home network of the source virtual machine.

With reference to the fourth aspect or the first possible implementation manner of the fourth aspect or the second possible implementation manner of the fourth aspect, in a third possible implementation manner, the apparatus is applied to a system that includes a cloud management module at the production site, a redundancy management module, and a cloud management module at the redundancy site; the apparatus is the redundancy management module; the acquiring unit is configured to acquire the first description information of the cloud application needing redundancy from the cloud management module at the production site; and the submitting unit is configured to register the second description information with the cloud management module at the redundancy site, so that the cloud management module at the redundancy site recovers the cloud application needing redundancy according to the second description information.

With reference to the fourth aspect or the first possible implementation manner of the fourth aspect or the second possible implementation manner of the fourth aspect, in a fourth possible implementation manner, the apparatus is applied to a system that includes a cloud management module at the production site and a cloud management module at the redundancy site; the apparatus is the cloud management module at the production site; the acquiring unit is configured to acquire the first description information of the cloud application needing redundancy recorded by the acquiring unit; and the submitting unit is configured to register the second description information generated by the determining unit with the cloud management module at the redundancy site, so that the cloud management module at the redundancy site recovers the cloud application needing redundancy according to the second description information.

With reference to the fourth aspect or the first possible implementation manner of the fourth aspect or the second possible implementation manner of the fourth aspect, in a fifth possible implementation manner, the apparatus is applied to a system that includes a cloud management module at the production site, a redundancy management module at the production site, and a redundancy management module at the redundancy site; the apparatus is the redundancy management module at the production site; the acquiring unit is configured to acquire the first description information of the cloud application needing redundancy from the cloud management module at the production site; and the submitting unit is configured to send the second description information generated by the determining unit to the redundancy management module at the redundancy site, so that the redundancy management module at the redundancy site registers the second description information with the cloud management module at the redundancy site, to recover the cloud application needing redundancy.

According to a fifth aspect, an embodiment of the present invention proposes an apparatus for cloud application redundancy, where the apparatus includes an acquiring unit configured to acquire second description information of a cloud application needing redundancy, where the second description information includes information about a backup network used at a redundancy site by the cloud application needing redundancy and information about a backup virtual machine used at the redundancy site by the cloud application needing redundancy; and a registering unit configured to register the second description information acquired by the acquiring unit with a cloud management module at the redundancy site, so that the cloud management module at the redundancy site recovers the cloud application needing redundancy according to the second description information.

With reference to the fifth aspect, in a first possible implementation manner, the acquiring unit is configured to receive the second description information sent by a redundancy management module at a production site; or is configured to acquire first description information of the cloud application needing redundancy, where the first description information includes information about a source network used at the production site by the cloud application needing redundancy and information about a source virtual machine used at the production site by the cloud application needing redundancy, and generate the second description information of the cloud application needing redundancy according to the first description information.

According to a sixth aspect, an embodiment of the present invention proposes an apparatus for cloud application redundancy, where the apparatus includes an acquiring unit configured to acquire second description information of a cloud application needing redundancy, where the second description information includes information about a backup network used at a redundancy site by the cloud application needing redundancy and information about a backup virtual machine used at the redundancy site by the cloud application needing redundancy; and a recovering unit configured to recover the cloud application needing redundancy at the redundancy site according to the second description information acquired by the acquiring unit.

With reference to the sixth aspect, in a first possible implementation manner, the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

With reference to the first possible implementation manner of the sixth aspect, in a second possible implementation manner, the information about the home network of the backup virtual machine includes an association between a virtual network adapter of the backup virtual machine and the backup network, or a network address of the virtual network adapter of the backup virtual machine.

With reference to the first possible implementation manner or the second possible implementation manner of the sixth aspect, in a third possible implementation manner, the recovering unit includes a first recovering unit configured to create the backup network according to the information about the backup network; a second recovering unit configured to create the backup virtual machine according to the identifier and the specifications of the backup virtual machine and the information about the second storage unit; and a third recovering unit configured to associate the backup virtual machine with the backup network according to the information about the home network of the backup virtual machine.

According to a seventh aspect, an embodiment of the present invention proposes a redundancy system, where the system includes a cloud management module at a production site, a redundancy management module, and a cloud management module at a redundancy site, where the cloud management module at the production site is configured to record first description information of a cloud application needing redundancy, where the first description information includes information about a source network used at the production site by the cloud application needing redundancy and information about a source virtual machine used at the production site by the cloud application needing redundancy; the redundancy management module is configured to acquire the first description information from the cloud management module at the production site; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and register the second description information with the cloud management module at the redundancy site; and the cloud management module at the redundancy site is configured to receive registration information, where the registration information carries the second description information; and recover the cloud application needing redundancy at the redundancy site according to the second description information.

According to an eighth aspect, an embodiment of the present invention proposes a redundancy system, where the system includes a cloud management module at a production site and a cloud management module at a redundancy site, where the cloud management module at the production site is configured to acquire first description information of a cloud application needing redundancy, where the first description information includes information about a source network used at the production site by the cloud application needing redundancy and information about a source virtual machine used at the production site by the cloud application needing redundancy; generate second description information of the cloud application needing redundancy according to the first description information, where the second description information includes information about a backup network used at the redundancy site by the cloud application needing redundancy and information about a backup virtual machine used at the redundancy site by the cloud application needing redundancy; and register the second description information with the cloud management module at the redundancy site; and the cloud management module at the redundancy site is configured to receive registration information, where the registration information carries the second description information; and recover the cloud application needing redundancy at the redundancy site according to the second description information.

According to a ninth aspect, an embodiment of the present invention proposes a redundancy system, where the system includes a cloud management module at a production site and a cloud management module at a redundancy site, where the cloud management module at the production site is configured to acquire first description information of a cloud application needing redundancy, where the first description information includes information about a source network used at the production site by the cloud application needing redundancy and information about a source virtual machine used at the production site by the cloud application needing redundancy; and send the first description information to the cloud management module at the redundancy site; and the cloud management module at the redundancy site is configured to receive the first description information; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and recover the cloud application needing redundancy at the redundancy site according to the second description information.

According to a tenth aspect, an embodiment of the present invention proposes a redundancy system, where the system includes a cloud management module at a production site, a redundancy management module at the production site, a cloud management module at a redundancy site, and a redundancy management module at the redundancy site, where the cloud management module at the production site is configured to record first description information of a cloud application needing redundancy, where the first description information includes information about a source network used at the production site by the cloud application needing redundancy and information about a source virtual machine used at the production site by the cloud application needing redundancy; the redundancy management module at the production site is configured to acquire the first description information of the cloud application needing redundancy from the cloud management module at the production site; generate second description information of the cloud application needing redundancy according to the first description information, where the second description information includes information about a backup network used at the redundancy site by the cloud application needing redundancy and information about a backup virtual machine used at the redundancy site by the cloud application needing redundancy; and send the second description information to the redundancy management module at the redundancy site; the redundancy management module at the redundancy site is configured to receive the second description information sent by the redundancy management module at the production site, and register the second description information with the cloud management module at the redundancy site; and the cloud management module at the redundancy site is configured to receive registration information, where the registration information carries the second description information; and recover the cloud application needing redundancy at the redundancy site according to the second description information.

According to an eleventh aspect, an embodiment of the present invention proposes a redundancy system, where the system includes a cloud management module at a production site, a redundancy management module at the production site, a cloud management module at a redundancy site, and a redundancy management module at the redundancy site, where the cloud management module at the production site is configured to record first description information of a cloud application needing redundancy, where the first description information includes information about a source network used at the production site by the cloud application needing redundancy and information about a source virtual machine used at the production site by the cloud application needing redundancy; the redundancy management module at the production site is configured to acquire the first description information of the cloud application needing redundancy from the cloud management module at the production site; and send the first description information to the redundancy management module at the redundancy site; the redundancy management module at the redundancy site is configured to receive the first description information sent by the redundancy management module at the production site; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and register the second description information with the cloud management module at the redundancy site; and the cloud management module at the redundancy site is configured to receive registration information, where the registration information carries the second description information; and recover the cloud application needing redundancy at the redundancy site according to the second description information.

In the embodiments of the present invention, second description information of a cloud application needing redundancy can be acquired, where the second description information gives an overall description about the deployment of the cloud application needing redundancy at a redundancy site; and the acquired second description information is provided for a cloud management module at the redundancy site, so that the cloud management module at the redundancy site can completely and rapidly recover the cloud application needing redundancy at the redundancy site according to the second description information, thereby implementing redundancy based on a cloud application. Different from a manner of redundancy based on a virtual machine granularity in the prior art, the embodiments of the present invention implement configuration and recovery for redundancy at an application level, and avoid a possible problem, which is caused by the redundancy based on a virtual machine granularity, that a cloud application cannot be completely and rapidly recovered.

BRIEF DESCRIPTION OF DRAWINGS

To describe the technical solutions in the embodiments of the present invention or in the prior art more clearly, the following briefly introduces accompanying drawings required for describing the embodiments or the prior art. The accompanying drawings in the following description show merely some embodiments of the present invention, and a person of ordinary skill in the art may still derive other drawings according to these accompanying drawings without creative efforts.

DESCRIPTION OF EMBODIMENTS

Embodiments of the present invention propose a method, a system, and an apparatus for cloud application redundancy, which can completely and rapidly recover a cloud application at a redundancy site.

Redundancy Method

Figure 1A:
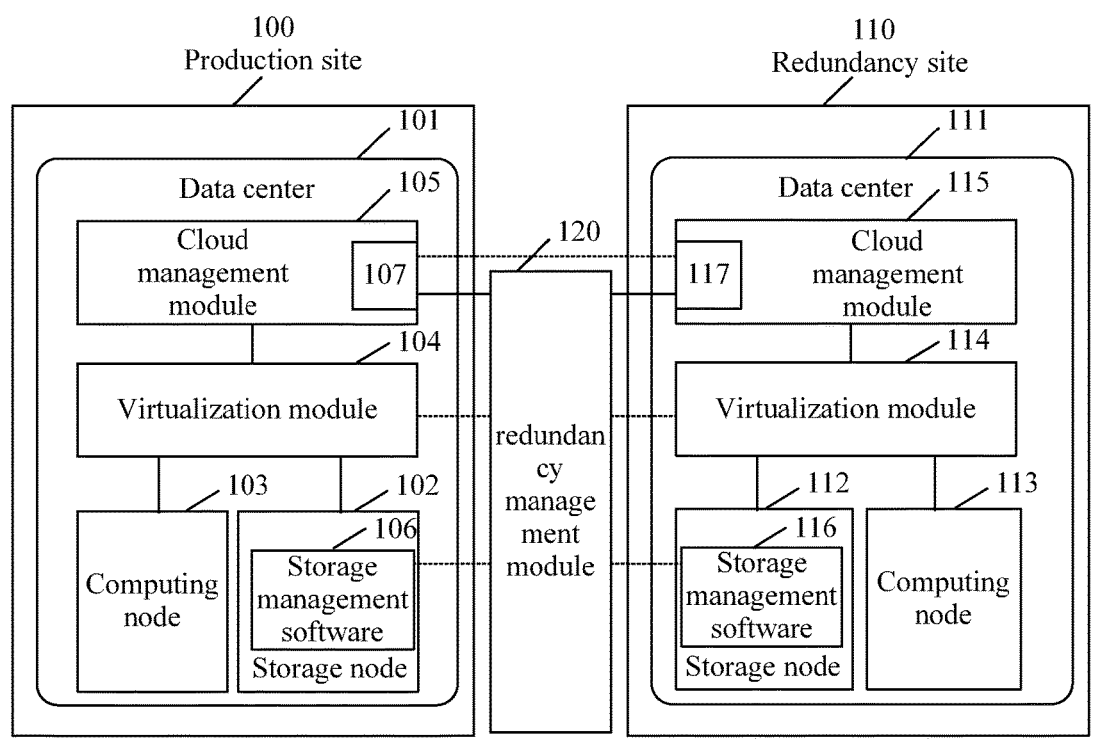
FIG. 1A, FIG. 1B, and FIG. 1C are block diagrams of a system provided by embodiments of the present invention.
Figure 1B:
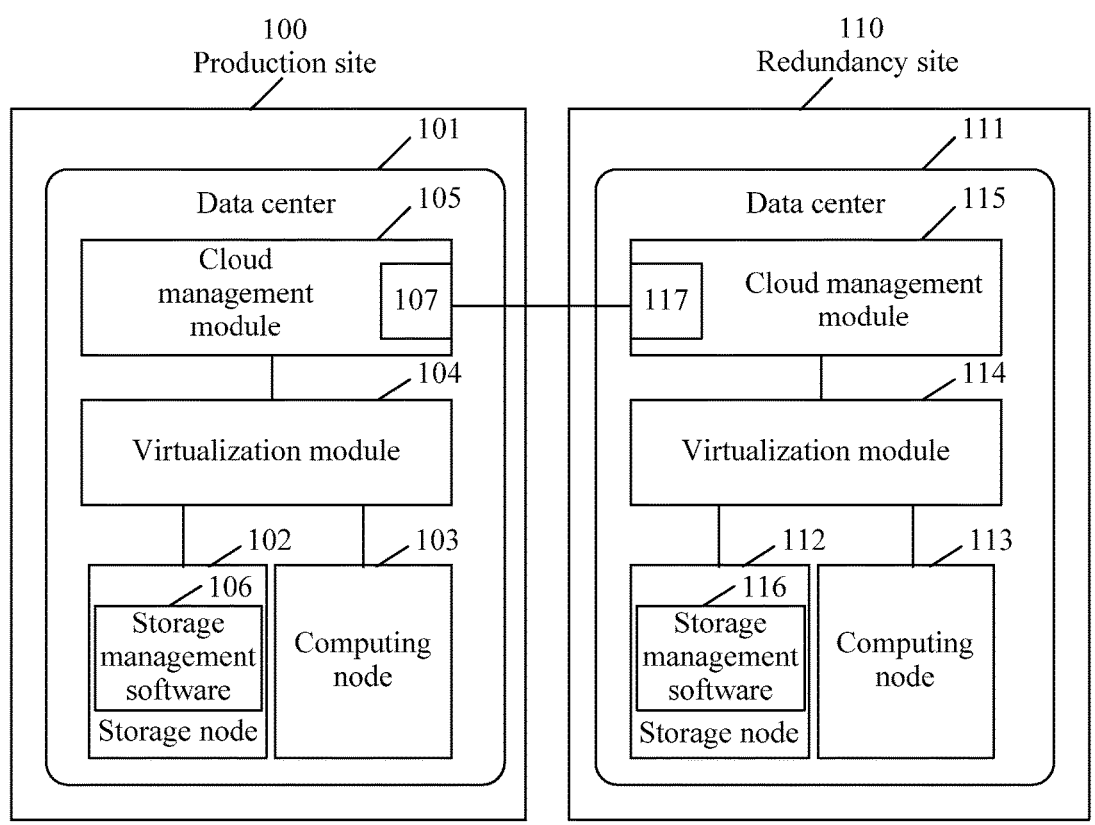
Figure 1C:
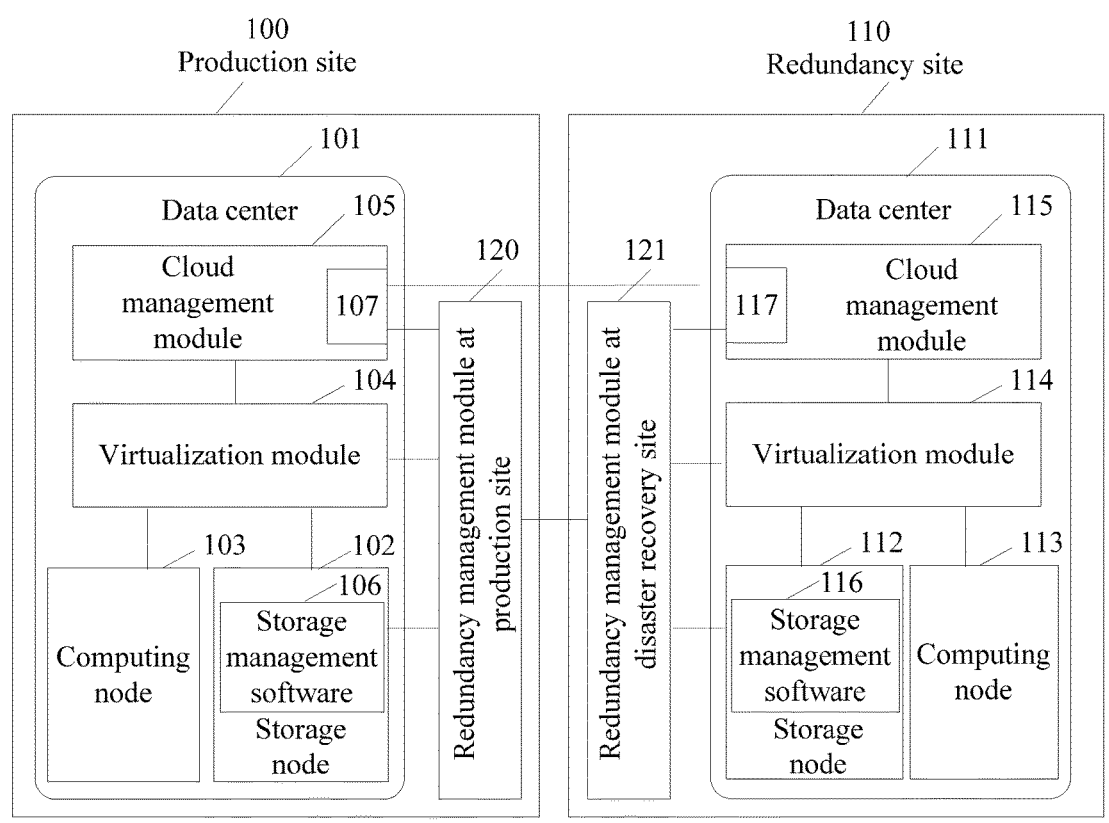

FIG. 1A, FIG. 1B, and FIG. 1C are block diagrams of a system provided by embodiments of the present invention. The system includes a production site 100 and a redundancy site 110, where the production site 100 provides a service for at least one cloud application, and the redundancy site 110 is configured to recover a cloud application needing redundancy at the production site. The production site 100 and the redundancy site 110 are relative concepts. The production site 100 represents a site where a cloud application runs before recovery, and the redundancy site 110 represents a site where the cloud application runs after the recovery. The production site 100 and the redundancy site 110 may be differentiated according to regional locations, for example, a Beijing site and a Xi' an site, or may be differentiated according to another rule.

The production site 100 and the redundancy site 110 may include at least one data center each, for example, as shown in FIG. 1A, FIG. 1B, and FIG. 1C, the production site 100 includes a data center 101, and the redundancy site 110 includes a data center 111. The data center may include physical servers, where the physical servers may be configured to provide computation, storage, and network resources for the production site or the redundancy site, a physical server that is configured to provide computation and network resources may be referred to as a computing node, and a physical server that is configured to provide storage resources may be referred to as a storage node, for example, a storage node 102, a storage node 112, a computing node 103, and a computing node 113 shown in FIG. 1. In the example shown in FIG. 1, the production site 100 and the redundancy site 110 include one data center each, and each data center includes one computing node and one storage node. In other embodiments, the production site and the redundancy site may include a plurality of data centers each, and each of the data centers may include a plurality of computing nodes and a plurality of storage nodes.

The data center 101, 111 may further include a virtualization module 104, 114 and a cloud management module 105, 115, where the virtualization module 104, 114 is configured to abstract the computation (including a processor and a memory), storage, and network resources on the physical servers to a plurality of virtual machines, and each of the virtual machines in fact has a processor, a memory, a network connection, and a storage, and can run its operating system and applications; and the cloud management module 105, 115 can manage the virtualization module 104, 114 or each virtual machine, for example, instruct the virtualization module 104, 114 to create a virtual machine.

The storage node 102, 112 of the data center 101, 111 may be deployed separately, for example, a shared storage device is used. The storage node 102, 112 includes a plurality of storage units, is configured to provide storage resources for each virtual machine, and can provide a shared partition access (read and write) capability for the production site/redundancy site, so that virtual machines on different computing nodes can access a same partition of a same storage device at the same time. The storage node 102, 112 includes storage management software 106, 116 that can manage the storage units on the storage node 102, 112. The shared storage device may be a network attached storage (NAS) device or may be a storage area network (SAN) device. For example, the storage node 102, 112 may be a SAN device; the storage units of the SAN device may be logical unit numbers (LUN), where the LUNs are logical disks displayed in a form of a storage array; a file system of each virtual machine is created on one or more LUNs of the SAN device; and storage management software of the SAN device can control read and write on the LUNs and can manage information of the LUNs.

In the embodiment of the present invention, in order to implement complete redundancy of a cloud application, when the cloud application is created, a cloud application template may be directly used to create the cloud application, and the cloud management module 105, 115 may receive the cloud application template, and instruct, according to the cloud application template, the virtualization module 104, 114 to create virtual machines and networks to be used by the cloud application. Because the cloud application template can completely describe information such as the virtual machines and networks required by the cloud application, a deployment consideration can be made on the whole when the virtualization module 104, 114 deploys virtual machines for the cloud application, thereby improving the efficiency of virtual machine deployment. Certainly, the cloud application template may not be used in creating virtual machines, and a virtual machine template in the prior art is used instead, and the cloud management module 105, 115 still provides the virtual machine template for creating virtual machines.

After the virtual machines and networks to be used by the cloud application have been created by the virtualization module 104, 114, the cloud management module 105, 115 or the virtualization module 104, 114 may generate description information of the cloud application according to the deployed virtual machines and the networks of the virtual machines, where the description information of the cloud application includes description information of an instance running the cloud application, such as information about virtual machines running the cloud application and information about the networks used by the cloud application. The description information of the cloud application is described in detail in subsequent embodiments. It is clear that the description information of the cloud application may include static description information of the cloud application, and may also include dynamic description information of the cloud application. Before the virtualization module 104, 114 deploys the virtual machines, information carried in the cloud application template or the virtual machine template received by the cloud management module 105, 115 may be referred to as the static description information of the cloud application, such as a quantity or specifications of the virtual machines; and after the virtualization module 104, 114 deploys the virtual machines, a location or a home network of a physical resource deployed on the virtual machines has been configured, and such information may be referred to as the dynamic description information of the cloud application. After the virtualization module 104, 114 deploys the virtual machines, the cloud management module 105, 115 may collect the dynamic description information and the static description information of the cloud application, and generate the description information of the cloud application. If the cloud management module 105, 115 has acquired the static description information of the cloud application using the cloud application template, the cloud management module 105, 115 may acquire only the dynamic description information of the cloud application in this case. The description information of the cloud application may also be recorded in a form of a template in the cloud management module 105, 115. The cloud management module 105, 115 may record the description information of the cloud application using a new template, or may store complete description information of the cloud application by means of updating the cloud application template.

Besides, in the embodiment of the present invention, in order to implement redundancy based on a cloud application, a cloud management interface 107, 117 may be added on the cloud management module 105, 115, which means that the cloud management module 105, 115 supports query of cloud application description information of a cloud application currently running at the production site, and performs a redundancy operation for the cloud application according to the cloud application description information obtained by query. For ease of description, in the embodiment of the present invention, the description information of the cloud application running at the production site is referred to as first description information of the cloud application, and the description information of the cloud application running at the redundancy site is referred to as second description information of the cloud application.

In the embodiment of the present invention, the system composition may be shown in FIG. 1A, and the system may further include a redundancy management module 120 in addition to the production site and the redundancy site, where the redundancy management module 120 is connected to the cloud management module 105 at the production site and the cloud management module 115 at the redundancy site separately; the redundancy management module 120 may query, using the cloud management interface 107 on the cloud management module 105, for the first description information of the cloud application currently running at the production site; and the redundancy management module 120 may register the determined second description information of the cloud application with the cloud management module 115 using the cloud management interface 117. The redundancy management module 120 may also be connected to the virtualization module 104, 114, so that the redundancy management module 120 can further query for information of a source virtual machine used at the production site or the redundancy site by the cloud application. The redundancy management module may also be connected to the storage management software 106, 116.

Further, in the embodiment of the present invention, the production site 100 and the redundancy site 110 in the system may also be connected for communication using the cloud management module, as shown in FIG. 1B, so that the redundancy site can query for the description information of the cloud application at the production site, that is, the first description information, and perform the redundancy operation for the cloud application according to the first description information of the cloud application obtained by query.

In the system architecture shown in FIG. 1A, one redundancy management module may be shared by the production site 100 and the redundancy site 110, or one redundancy management module may be configured for the production site and the redundancy site separately. As shown in FIG. 1C, the system includes the redundancy management module 120 at the production site and the redundancy management module 121 at the redundancy site, where the redundancy management module 120 at the production site is connected to the cloud management module 105 at the production site 100, the redundancy management module 121 at the redundancy site is connected to the cloud management module 115 at the redundancy site 110, and data can be transmitted between the redundancy management module 120 at the production site and the redundancy management module 121 at the redundancy site. The redundancy management module 120 at the production site may acquire first description information of the cloud application of the production site from the cloud management module 105 at the production site 100, and send the first description information to the redundancy management module 121 at the redundancy site. The redundancy management module 121 at the redundancy site may receive the first description information sent by the redundancy management module 120 at the production site, generate second description information according to the first description information, and register the second description information with the cloud management module 115 at the redundancy site. A specific process is described in the subsequent embodiments.

Besides, in the system architecture shown in FIG. 1A and FIG. 1C, the cloud management module 115 at the redundancy site 110 may also be connected to the cloud management module 105 at the production site 100, so that the cloud management module 115 can acquire the first description information of the cloud application of the production site from the cloud management module 105. A dotted line connection in FIG. 1A and FIG. 1C indicates that the connection relationship is optional.

Figure 2:
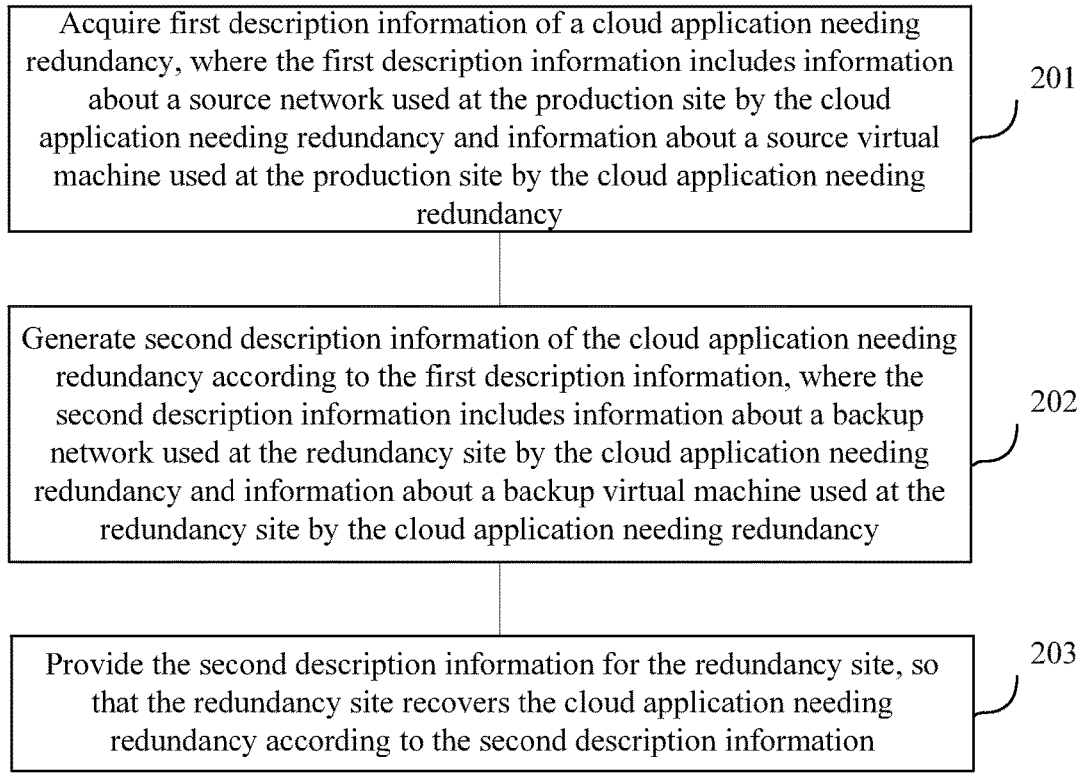
FIG. 2 is a flowchart of a redundancy method provided by an embodiment of the present invention.

With reference to the system architecture shown in FIG. 1A, or FIG. 1B, or FIG. 1C and as shown in FIG. 2, the redundancy method in an embodiment of the present invention is used to configure a cloud application needing redundancy of the production site at the redundancy site, so as to recover the cloud application needing redundancy at the redundancy site according to configuration information when a redundancy incident occurs at the production site. The method may include:

201: Acquire first description information of a cloud application needing redundancy, where the first description information includes information about a source network used at the production site by the cloud application needing redundancy and information about a source virtual machine used at the production site by the cloud application needing redundancy.

202: Generate second description information of the cloud application needing redundancy according to the first description information, where the second description information includes information about a backup network used at the redundancy site by the cloud application needing redundancy and information about a backup virtual machine used at the redundancy site by the cloud application needing redundancy.

203: Provide the second description information for the redundancy site, so that the redundancy site recovers the cloud application needing redundancy according to the second description information.

In the embodiment of the present invention, an execution body of step 201 may vary with the system composition. For example, in FIG. 1B, the execution body may be the cloud management module at the production site or the cloud management module at the redundancy site; in FIG. 1A, the execution body may be the redundancy management module; and in FIG. 1C, the execution body may be the redundancy management module at the production site or the redundancy management module at the redundancy site. The first description information includes not only the information about the source virtual machine used at the production site by the cloud application needing redundancy, but also the information about the source network used at the production site by the cloud application needing redundancy. Based on the first description information that gives an overall description about the cloud application needing redundancy, the second description information of the cloud application needing redundancy at the redundancy site may be generated, and the second description information can also give an overall description about the deployment of the cloud application needing redundancy. In step 203 of providing the second description information for the redundancy site, execution of the action may vary based on different execution bodies, which will be described in detail in the subsequent embodiments. After the redundancy site acquires the second description information, the cloud application needing redundancy can be completely recovered at the redundancy site according to the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 3:
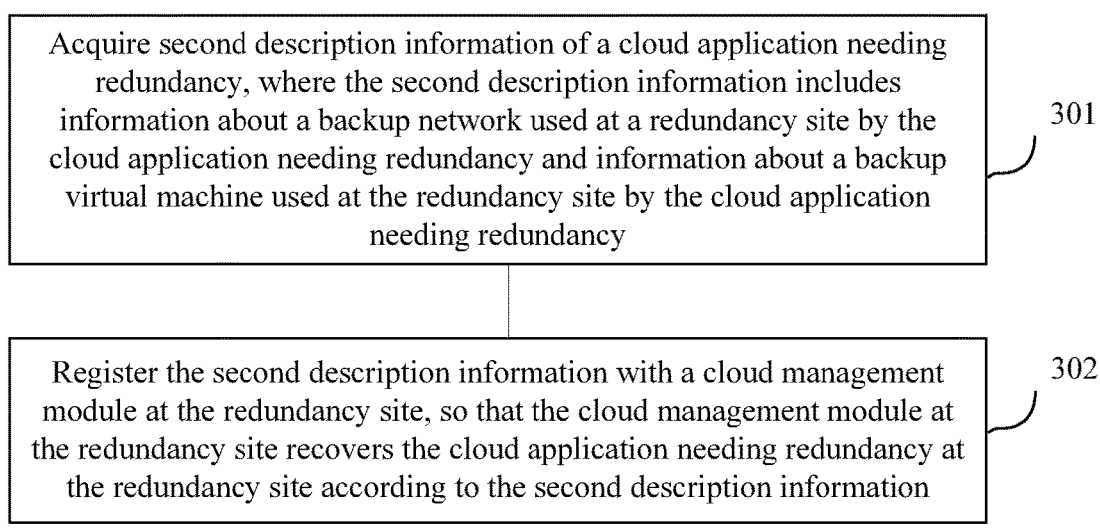
FIG. 3 is a flowchart of another redundancy method provided by an embodiment of the present invention.

With reference to the system architecture shown in FIG. 1C and as shown in FIG. 3, the redundancy method in an embodiment of the present invention is used to configure a cloud application needing redundancy of the production site at the redundancy site, so as to recover the cloud application needing redundancy at the redundancy site according to configuration information when a redundancy incident occurs at the production site. The method may be executed by the redundancy management module at the redundancy site. The method may include:

301: Acquire second description information of a cloud application needing redundancy, where the second description information includes information about a backup network used at a redundancy site by the cloud application needing redundancy and information about a backup virtual machine used at the redundancy site by the cloud application needing redundancy.

302: Register the second description information with a cloud management module at the redundancy site, so that the cloud management module at the redundancy site recovers the cloud application needing redundancy at the redundancy site according to the second description information.

In the embodiment of the present invention, the redundancy management module at the redundancy site may acquire second description information of the cloud application needing redundancy from the redundancy management module at the production site, where the second description information gives an overall description about the deployment of the cloud application needing redundancy at the redundancy site; and the redundancy management module at the redundancy site may register the acquired second description information with the cloud management module at the redundancy site, so that the cloud management module at the redundancy site can completely recover the cloud application needing redundancy at the redundancy site, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 4:
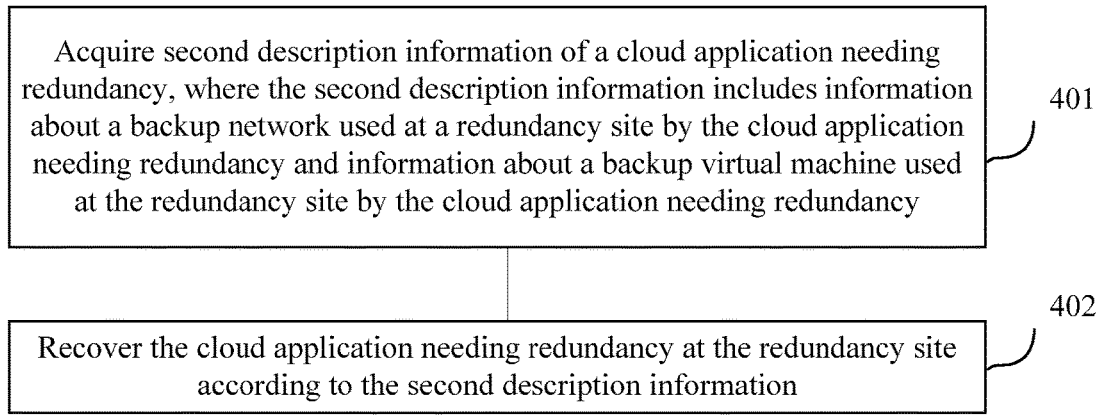
FIG. 4 is a flowchart of another redundancy method provided by an embodiment of the present invention.

With reference to the system architecture shown in FIG. 1A, or FIG. 1B, or FIG. 1C and as shown in FIG. 4, the redundancy method in an embodiment of the present invention is used to recover a cloud application needing redundancy of the production site at the redundancy site. The method may be executed by the cloud management module at the redundancy site. The method includes:

401: Acquire second description information of a cloud application needing redundancy, where the second description information includes information about a backup network used at a redundancy site by the cloud application needing redundancy and information about a backup virtual machine used at the redundancy site by the cloud application needing redundancy.

402: Recover the cloud application needing redundancy at the redundancy site according to the second description information.

In the embodiment of the present invention, the cloud management module at the redundancy site may acquire the second description information of the cloud application needing redundancy from the cloud management module at the production site shown in FIG. 1B, or the redundancy management module shown in FIG. 1A, or the redundancy management module at the production site shown in FIG. 1C, where the second description information gives an overall description about the deployment of the cloud application needing redundancy at the redundancy site; and after acquiring the second description information, the cloud management module at the redundancy site may completely and rapidly recover the cloud application needing redundancy at the redundancy site, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

Configuration Process in Specific Embodiment 1

Figure 5:
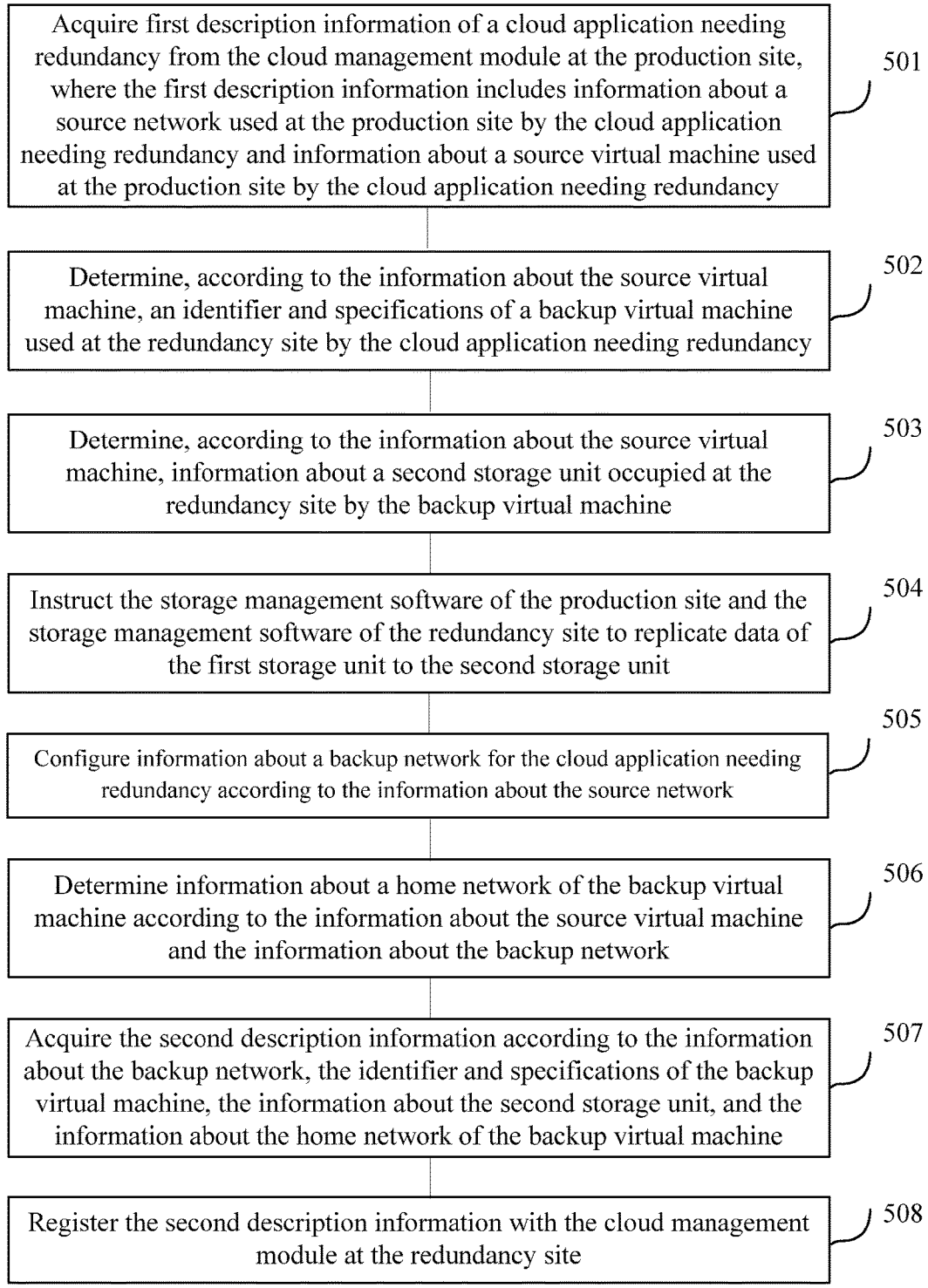
FIG. 5 is a flowchart of another redundancy method provided by an embodiment of the present invention.

With reference to the system architecture shown in FIG. 1A and as shown in FIG. 5, a redundancy method provided by the embodiment of the present invention is used to configure a cloud application needing redundancy of the production site at the redundancy site, so as to recover the cloud application needing redundancy at the redundancy site according to configuration information when a redundancy incident occurs at the production site. The method may be executed by the redundancy management module. The method may include:

501: Acquire first description information of a cloud application needing redundancy from the cloud management module at the production site, where the first description information includes information about a source network used at the production site by the cloud application needing redundancy and information about a source virtual machine used at the production site by the cloud application needing redundancy.

The information about the source virtual machine includes an identifier and specifications of the source virtual machine, information about a first storage unit occupied at the production site by the source virtual machine, and information about a home network of the source virtual machine.

Further, the information about the home network of the source virtual machine includes a network address of the source virtual machine or an association between a virtual network adapter of the source virtual machine and the source network.

Figure 6:
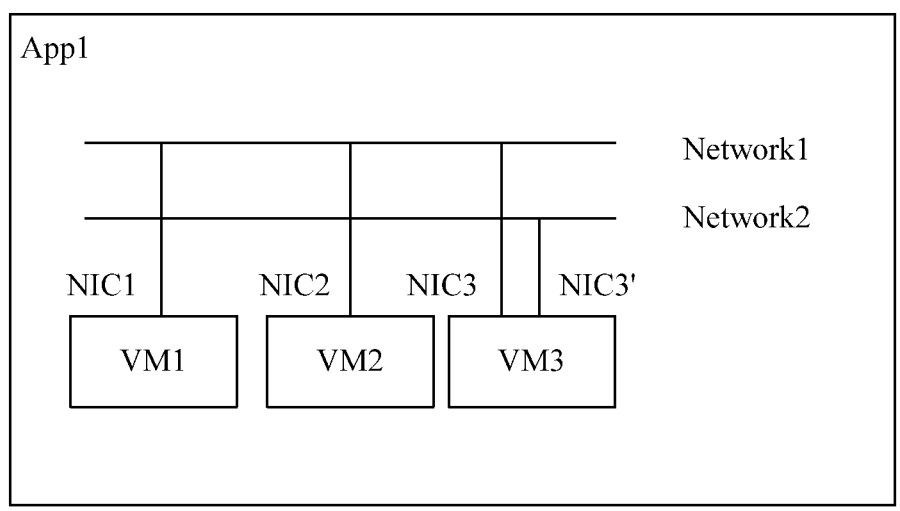
FIG. 6 is a topology diagram of first description information of a cloud application APP1 provided by an embodiment of the present invention.

For example, in the system architecture shown in FIG. 1A, three cloud applications run at the production site, including APP1, APP2, and APP3; and the cloud management module at the production site may store a topology relationship of each cloud application, where the topology relationship of the cloud application may be expressed using first description information of the cloud application, for example, first description information of the cloud application APP1 is shown in FIG. 6.

When it is determined that APP1 is the cloud application needing redundancy, the cloud management module at the production site or the redundancy management module may acquire the first description information of APP1. The first description information of APP1 may be shown in Table 1 and includes.

3) Information about First Storage Unit Occupied at Production Site by Source Virtual Machine Used by APP1.

The information about the first storage unit occupied at the production site by the source virtual machine may be information about a storage unit of a single virtual machine. For example, the information about the first storage unit occupied by the source virtual machine used by APP1 is VM1→LUN1 and LUN2; VM2→LUN1; and VM3→LUN2 and LUN3; or may be overall information about the first storage unit used at the production site by the cloud application needing redundancy. For example, the information about the first storage unit occupied by the source virtual machine used by APP1 is LUN1, LUN2, and LUN3; in this case, the information about the first storage unit occupied at the production site by the source virtual machine may not include an association between the source virtual machine and the storage unit occupied by the source virtual machine. Because the identifier of the source virtual machine is stored in the storage unit occupied by the source virtual machine, the cloud management module at the production site or the redundancy site may determine, according to the identifier of the source virtual machine, which disk files on which LUNs are used by the source virtual machine, that is,

TABLE 1

| First Description Information of APP1 | | | |
|---|---|---|---|
| Information about source network | | | Network1 (Subnet address: 10.100.35.0/24, VLAN ID=35); Network2 (Subnet address: 10.100.36.0/24, VLAN ID=36); |
| Information about source virtual machine | Identifier and specifications of source virtual machine | | VM1 (uuid=1, 2VCPU, 60G memory); VM2 (uuid=2, 2VCPU, 60G memory); VM3 (uuid=3, 2VCPU, 40G memory); |
| | Information about first storage unit occupied at production site by source virtual machine | | It may be: a) VM1->LUN1 and LUN2, VM2->LUN1, VM3-> LUN2 and LUN3; or, it may be: b) LUN1, LUN2, LUN3. |
| | Information about home network of source virtual machine | Network address of source virtual machine (optional) | VM1-VNIC1-> IP address: 10.100.35.10/24; VM2-VNIC2-> IP address: 10.100.35.11/24; VM3-VNIC3-> IP address: 10.100.35.12/24; VM3-VNIC3'-> IP address: 10.100.36.12/24; |
| | | Association between virtual network adapter of source virtual machine and source network (optional) | VM1-VNIC1->connected to Network1; VM2-VNIC2->connected to Network2; VM3-VNIC3->connected to Network1; VM3-VNIC3'->connected to Network2; |

1) Information about Source Network Used at Production Site by APP1

The information about the source network may be information about a subnet (Subnet) where the source virtual machine running the cloud application is located, or information about a virtual local area network (VLAN) where the virtual machine running the cloud application is located, or both. For example:

APP1 uses Network1 and Network2; Network1 (Subnet address: 10.100.35.0/24, VLAN ID=35); and Network2 (Subnet address: 10.100.36.0/24, VLAN ID=36).

2) Identifier and Specifications of Source Virtual Machine Used at Production Site by APP1.

The identifier of the source virtual machine is allocated by the production site, which may be a universally unique identifier (UUID), and the specifications of the source virtual machine include information about a processor and a memory. For example, if the production site uses source virtual machines VM1, VM2, and VM3 to run the cloud application APP1, identifiers and specifications of the source virtual machines used at the production site by APP1 are as follows: VM1 (uuid=1, 2 virtual central processing unit (VCPU), 60 gigabyte (G) memory); VM2 (uuid=2, 2VCPU, 60 G memory); and VM3 (uuid=3, 2VCPU, 40 G memory);

determine an association between the source virtual machine used at the production site by the cloud application needing redundancy and the storage unit occupied by the source virtual machine.

4) Network Address of Source Virtual Machine Used at Production Site by APP1.

The network address of the source virtual machine used at the production site by the cloud application needing redundancy may be an internet protocol (IP) address of a virtual network adapter of the source virtual machine. For example, the network address of the source virtual machine used by APP1 is VM1-virtual network interface card (VNIC)1→IP address: 10.100.35.10/24; VM2-VNIC2→IP address: 10.100.35.11/24; VM3-VNIC3→IP address: 10.100.35.12/24; and VM3-VNIC3'→IP address: 10.100.36.12/24.

5) Association Between the Virtual Network Adapter of Source Virtual Machine Used by APP1 and the Source Network.

For example, the association between the virtual network adapter of the source virtual machine used by APP1 and the source network is VM1-VNIC1→connected to Network1; VM2-VNIC2→connected to Network2; VM3-VNIC3→connected to Network1; and VM3-VNIC3'→connected to Network2.

In the foregoing, 4) and 5) are two optional factors. The information about the home network of the source virtual machine of APP1 may include any one in 4) or 5), or may include both 4) and 5).

Further, there may be two methods for implementing step 501 of acquiring the first description information of the cloud application needing redundancy from the cloud management module at the production site, which are:

1) A First Method,

The redundancy management module queries, using an interface connected to the cloud management module at the production site, for the first description information of the cloud application needing redundancy from the cloud management module at the production site, where the cloud management module at the production site may collect, after the virtual machine of the cloud application is deployed, static description information and dynamic description information of a running instance of the cloud application to generate the first description information.

2) A Second Method,

The redundancy management module queries, from the cloud management module at the production site using the interface connected to the cloud management module at the production site, for the identifier and specifications of the source virtual machine used at the production site by the cloud application needing redundancy, the information about the first storage unit occupied at the production site by the source virtual machine, and the network address of the source virtual machine, and generates the first description information.

Further, the generating the first description information includes determining, according to the network address of the source virtual machine, information about the source network used at the production site by the cloud application needing redundancy; determining the information about the home network of the source virtual machine; and obtaining the first description information according to the information about the source network, the identifier and the specifications of the source virtual machine, the information about the first storage unit occupied at the production site by the source virtual machine, and the information about the home network of the source virtual machine. For example, if the IP address of the virtual network adapter of the source virtual machine VM1 is 10.100.35.10/24, it can be obtained that a mask of the IP address is 255.255.255.0, and an AND operation is performed between the IP address and the mask to obtain that the Subnet address used at the production site by APP1 is 10.100.35.0/24; similarly, it is obtained that the Subnet address used at the production site by APP1 is 10.100.35.0/24 and 10.100.36.0/24 separately based on the IP address of the virtual network adapter of VM2 and the IP address of the virtual network adapter of VM3; therefore, it can obtained that the information about the source network used at the production site by APP1 is Network1 (Subnet address: 10.100.35.0/24) and Network2 (Subnet address: 10.100.36.0/24). Finally, according to the generated information about the source network used at the production site by the cloud application needing redundancy, the identifier and the specifications of the source virtual machine, the information about the first storage unit occupied at the production site by the source virtual machine, and the network address of the source virtual machine, the first description information of APP1 is generated, as shown in Table 1.

Further, if the information about the home network of the source virtual machine includes the association between the virtual network adapter of the source virtual machine and the source network, the association between the virtual network adapter of the source virtual machine and the source network may be determined according to the information about the source network and the network address of the source virtual machine. For example, if the information about the source network of APP1 is Network1 (Subnet address: 10.100.35.0/24, VLAN ID=35), and Network2 (Subnet address: 10.100.36.0/24, VLAN ID=36), according to the network address VM1-VNIC1→IP address: 10.100.35.10/24, of the source virtual machine used by APP1, it can be determined that the IP address of the virtual network adapter of the source virtual machine belongs to a network segment 10.100.35.0/24, and then, it can be further determined that VM1-VNIC1 is associated with Network1; similarly, it can be determined that VM2-VNIC2 is associated with Network1, VM3-VNIC3 is associated with Network1, and VM3-VNIC3' is associated with Network2, that is, the relationship between the virtual network adapter of the source virtual machine of APP1 and the source network is obtained.

502: Determine, according to the information about the source virtual machine, an identifier and specifications of a backup virtual machine used at the redundancy site by the cloud application needing redundancy.

After acquiring the first description information, the redundancy management module may determine, according to the identifier and the specifications of the source virtual machine which are carried in the information about the source virtual machine, the identifier and specifications of the backup virtual machine used at the redundancy site by the cloud application needing redundancy. Further, when the cloud application needing redundancy is recovered at the redundancy site, the backup virtual machine needs to be correspondingly created for the source virtual machine used at the production site by the cloud application needing redundancy. The specifications of the backup virtual machine used at the redundancy site by the cloud application needing redundancy are the same as the specifications of the source virtual machine. Therefore, the virtual machine identifier may be configured for the backup virtual machine according to the identifier of the source virtual machine, and the specifications of the backup virtual machine may be determined acceding to the specifications of the source virtual machine, where the identifier of the backup virtual machine may be the same as or different from the identifier of the source virtual machine.

For example, identifiers and specifications of three source virtual machines used by APP1 are VM1 (uuid=1; 2VCPU, 60 G memory), VM2 (uuid=1; 2VCPU, 60 G memory), and VM3 (uuid=1; 2VCPU, 40 G memory). Three virtual machines may be correspondingly configured for the three source virtual machines as the backup virtual machines used at the redundancy site by the cloud application needing redundancy, that is, a backup virtual machine VM11' (uuid=11) is correspondingly configured for VM1 (uuid=1), a backup virtual machine VM12' (uuid=12) is correspondingly configured for VM2 (uuid=2), and a backup virtual machine VM13' (uuid=13) is correspondingly configured for VM3 (uuid=3). It is determined that the specifications of VM11' (uuid=11), VM12' (uuid=12), and VM13' (uuid=13) are respectively consistent with the specifications of VM1 (uuid=1), VM2 (uuid=2), and VM3 (uuid=3), as shown in Table 2; then, it is determined that the identifiers and specifications of the backup virtual machines are VM11' (uuid=11, 2VCPU, 60 G memory), VM12' (uuid=12, 2VCPU, 60 G memory), and VM13' (uuid=13, 2VCPU, 40 G memory).

503: Determine, according to the information about the source virtual machine, information about a second storage unit occupied at the redundancy site by the backup virtual machine.

After acquiring the first description information, the redundancy management module may determine the information about the second storage unit according to the information about the first storage unit carried in the information about the source virtual machine. It may include the following three steps:

503a: Acquire an idle storage unit of the redundancy site.

Storage management software of the redundancy site may manage a storage node of the redundancy site, and is capable of collecting statistics of resource occupancy of all storage units of the storage node. Therefore, the redundancy management module may acquire information about the idle storage unit by querying the storage management software of the redundancy site. For example, if the storage management software of the redundancy site collects statistics of LUN resource occupancy of a SAN device of the redundancy site: LUN1' to LUN6' have been occupied, LUN7' to LUN15' are not occupied, the acquired idle storage units are LUN7' to LUN15'.

503b: Select the second storage unit from the idle storage unit of the redundancy site.

The redundancy management module may select a storage unit from the idle storage unit of the redundancy site as the second storage unit according to the information about the first storage unit. For example, if the first storage units occupied by the source virtual machine used by APP1 are LUN1, LUN2, and LUN3, and three storage units are selected as the second storage units from the idle storage units LUN7' to LUN15', the second storage units include LUN7', LUN8', and LUN9'.

503c: Create a replication relationship between the first storage unit and the second storage unit, and determine the information about the second storage unit occupied at the redundancy site by the backup virtual machine.

After determining the second storage unit, the redundancy management module may further determine the replication relationship between the first storage unit and the second storage unit, and determine, according to the replication relationship, the information about the second storage unit occupied at the redundancy site by the backup virtual machine. Further, after determining the identifier and specifications of the backup virtual machine used at the redundancy site by the cloud application needing redundancy, the redundancy management module further creates a correspondence between the source virtual machine identifier and the backup virtual machine identifier, and may determine, according to the correspondence between the source virtual machine identifier and the backup virtual machine identifier, the information about the first storage unit occupied at the production site by the source virtual machine, and the replication relationship between the first storage unit and the second storage unit, the information about the second storage unit occupied at the redundancy site by the backup virtual machine. For example, if the first storage units occupied at the production site by the source virtual machines used by APP1 are VM1→LUN1 and LUN2, VM2→LUN1, and VM3→LUN2 and LUN3, the second storage units occupied at the redundancy site by the backup virtual machine used by APP1 are LUN7', LUN8', and LUN9', and a user may directly specify a replication relationship between (LUN1, LUN2, and LUN3) and (LUN7', LUN8', and LUN9') as follows: LUN1→LUN7', LUN2→LUN8', and LUN3→LUN9', according to VM1 (uuid=1)→VM11' (uuid=11), VM2 (uuid=2)→VM12' (uuid=12), and VM3 (uuid=3)→VM13' (uuid=13), it can be determined that the information about the second storage units occupied at the redundancy site by the backup virtual machine is VM11' (uuid=11)→LUN7' and LUN8', VM12' (uuid=12)→LUN7', and VM13' (uuid=13)→LUN8' and LUN9', and the replication relationship between the first storage units and the second storage units may be determined according to the specification of the user.

The information about the second storage unit occupied at the redundancy site by the backup virtual machine may be information about the storage unit of a single virtual machine, for example, VM11' (uuid=11)→LUN7' and LUN8', VM12' (uuid=12)→LUN7', and VM13' (uuid=13) →LUN8' and LUN9'. Alternatively, the information about the second storage unit occupied at the redundancy site by the backup virtual machine may be overall information about the second storage unit used at the redundancy site by the cloud application needing redundancy, for example, LUN7', LUN8' and LUN9; in this case, the information about the first storage unit occupied at the production site by the backup virtual machine may not include the association between the backup virtual machine and the storage unit occupied by the backup virtual machine, but the source virtual machine identifier is stored in the second storage unit, and the association between the backup virtual machine and the storage unit occupied by the backup virtual machine may be determined according to the source virtual machine identifier and the backup virtual machine identifier.

504: Instruct the storage management software of the production site and the storage management software of the redundancy site to replicate data of the first storage unit to the second storage unit.

After step 503, the redundancy management module configures the replication relationship between the first storage unit and the second storage unit in the storage management software of the production site and the storage management software of the redundancy site, so that the storage management software of the production site and the storage management software of the redundancy site can replicate the data of the first storage unit to the second storage unit according to the replication relationship between the first storage unit and the second storage unit and a set replication cycle and replication manner.

For example, the first storage units occupied at the production site by the source virtual machine used by APP1 are LUN1, LUN2, and LUN3, and the second storage units occupied at the redundancy site by the backup virtual machine used by APP1 are LUN7', LUN8', and LUN9', and it is determined that the replication relationship between (LUN1, LUN2, and LUN3) and (LUN7', LUN8', and LUN9') is LUN1→LUN7', LUN2→LUN8', and LUN3→LUN9'; then, the replication relationship is configured in the storage management software of the production site and the redundancy site, so that the storage management software of the production site and the redundancy site replicates data of LUN1, LUN2, and LUN3 to LUN7', LUN8', and LUN9' respectively in an incremental manner at an interval of a preset time, for example, 5 minutes.

505: Configure information about a backup network for the cloud application needing redundancy according to the information about the source network.

After acquiring the first description information, the redundancy management module may configure the information about the backup network for the cloud application needing redundancy according to the information about the source network carried in the first description information.

Further, because the information about the source network may be information about a subnet where the source virtual machine running the cloud application needing redundancy is located, or a VLAN where the source virtual machine running the cloud application needing redundancy is located, or both, the configuring the information about the backup network for the cloud application needing redundancy according to the information about the source network may be allocating, according to the Subnet information of the source network, a Subnet address in unused Subnet addresses of the redundancy site and using it as Subnet information of the backup network; and allocating, according to the VLAN information of the source network, a VLAN ID in unused VLAN IDs of the redundancy site and using it as VLAN information of the backup network.

In this case, the information about the backup network may be the Subnet information of the backup network, or may be the VLAN information of the backup network, or may be both.

The unused Subnet addresses and VLAN IDs of the redundancy site may be stored in advance, or may be acquired from a user, or may be determined according to a rule. During the process of configuring the backup network of APP1, a Subnet address and/or a VLAN ID may be selected from the unused Subnet addresses and/or VLAN IDs of the redundancy site and serve as the information about the backup network.

For example, the information about the source network used by APP1 is Network1 (Subnet address: 10.100.35.0/24, VLAN ID=35); and Network2 (Subnet address: 10.100.36.0/24, VLAN ID=36), and two Subnet addresses and two VLAN IDs in unused networks of the redundancy site may be specified as information about the backup networks of APP1 according to a user instruction. Further, if corresponding backup Subnet addresses specified for the Subnet addresses of Network1 and Network2 are 10.100.35.0/24→20.200.135.0/24, and 10.100.36.0/24→20.200.136.0/24, and corresponding backup VLAN IDs specified for the VLAN IDs of Network1 and Network2 are VLAN ID=35→135, and VLAN ID=36→136, the information about the backup networks of APP1 is network1' (Subnet address: 20.200.135.0/24, VLAN ID=135); and network2' (Subnet address: 20.200.136.0/24, VLAN ID=136).

Besides, the unused Subnet addresses and VLAN IDs of the redundancy site may include a Subnet address and a VLAN ID which are consistent with the Subnet address and the VLAN ID of the source network. Therefore, the information about the backup network may be specified to be same as the information about the source network, so that the network address of the source virtual machine may be the same as the network address of the backup virtual machine, that is, the cloud application needing redundancy can use the same network address at the production site and the redundancy site for service processing. For example, if the unused Subnet addresses of the redundancy site include 10.100.35.0/24 and 10.100.36.0/24, and the unused VLAN IDs of the redundancy site include VLAN ID=35 and VLAN ID=36, the information about the backup networks may be configured as follows: network1' (Subnet address: 10.100.135.0/24, VLAN ID=35); and network2' (Subnet address: 10.100.136.0/24, VLAN ID=36), so that the information about the backup networks network1' and network2' is the same as the information about the source networks Network1 and Network2, and therefore, the network address that is the same as that of the source virtual machine may be allocated to the backup virtual machine during redundancy.

506: Determine information about a home network of the backup virtual machine according to the information about the source virtual machine and the information about the backup network.

After acquiring the first description information, the redundancy management module may further acquire the information about the home network of the source virtual machine, the identifier of the backup virtual machine, and the information about the backup network, and determine the information about the home network of the backup virtual machine according to the information about the home network of the source virtual machine, the identifier of the backup virtual machine, and the information about the backup network, where the information about the home network of the backup virtual machine may include the network address of the backup virtual machine, or an association between the virtual network adapter of the backup virtual machine and the backup network.

Because the information about the home network of the source virtual machine includes the network address of the source virtual machine or the association between the virtual network adapter of the source virtual machine and the source network, the determining the information about the home network of the backup virtual machine according to the information about the home network of the source virtual machine, the identifier of the backup virtual machine, and the information about the backup network may include (1) determining the association between the virtual network adapter of the source virtual machine and the source network according to the network address of the source virtual machine and the information about the source network which are carried in the information about the home network of the source virtual machine; and determining the network address of the backup virtual machine according to the association between the virtual network adapter of the source virtual machine and the source network, the identifier of the backup virtual machine and the information about the backup network, so that after the redundancy, the cloud application needing redundancy can use the specified network address of the backup virtual machine, where, for a specific implementation manner of determining the association between the virtual network adapter of the source virtual machine and the source network according to the network address of the source virtual machine and the information about the source network, reference is made to step 501; or, may include:

(2) acquiring the association between the virtual network adapter of the source virtual machine and the source network and carried in the information about the home network of the source virtual machine; and determining the network address of the backup virtual machine according to the association between the virtual network adapter of the source virtual machine and the source network, the identifier of the backup virtual machine, and the information about the backup network; or, may include:

(3) determining the association between the virtual network adapter of the source virtual machine and the source network according to the information about the source network and the network address of the source virtual machine which is carried in the information about the home network of the source virtual machine; and determining the association between the virtual network adapter of the backup virtual machine and the backup network according to the information about the backup network, the identifier of the backup virtual machine, and the association between the virtual network adapter of the source virtual machine and the source network, where the association between the virtual network adapter of the backup virtual machine and the backup network may not be determined in advance; instead, the association between the virtual network adapter of the backup virtual machine and the backup network is determined according to the information about the backup network and the network address of the backup virtual machine during the redundancy process; or, may include:

(4) acquiring the association between the virtual network adapter of the source virtual machine and the source network and carried in the information about the home network of the source virtual machine; and determining the association between the virtual network adapter of the backup virtual machine and the backup network according to the association between the virtual network adapter of the source virtual machine and the source network, the identifier of the backup virtual machine, and the information about the backup network.

Further, the redundancy management module creates a correspondence between the information about the source network and the information about the backup network after configuring the information about the backup network for the cloud application needing redundancy; and further creates a correspondence between the identifier of the source virtual machine and the identifier of the backup virtual machine after determining the identifier and the specifications of the backup virtual machine used at the redundancy site by the cloud application needing redundancy. Therefore, the determining the network address of the backup virtual machine according to the association between the virtual network adapter of the source virtual machine and the source network, the identifier of the backup virtual machine, and the information about the backup network may be that the network address of the backup virtual machine may be determined according to the correspondence between the information about the source network and the information about the backup network, the correspondence between the identifier of the source virtual machine and the identifier of the backup virtual machine, and the association between the virtual network adapter of the source virtual machine and the source network. For example, the network addresses of the source virtual machines used at the production site by APP1 are VM1-VNIC1→IP address: 10.100.35.10/24, VM2-VNIC2→IP address: 10.100.35.11/24, VM3-VNIC3→IP address: 10.100.35.12, and VM3-VNIC3'→IP address: 10.100.36.12/24; and the information about the backup networks configured for APP1 is network1' (Subnet address: 20.200.135.0/24), and network2' (Subnet address: 20.200.136.0/24). Because VM3-VNIC3'→IP address: 10.100.36.12/24 belongs to Network2 (Subnet address: 10.100.36.0/24), one IP address in the backup network network2' (Subnet address: 20.200.136.0/24) corresponding to Network2 is specified as the network address of the backup virtual machine VM13'. Because VM1-VNIC1→IP address: 10.100.35.10/24, VM2-VNIC2→IP address: 10.100.35.11/24, and VM3-VNIC3→IP address: 10.100.35.12/24 belong to Network1 (Subnet address: 10.100.35.0/24), three IP addresses in the backup network network1' (Subnet address: 20.200.135.0/24) corresponding to Network1 are specified as IP addresses of the virtual network adapters of the backup virtual machines VM11', VM12', and VM13'. Then, the network addresses of the backup virtual machines used at the redundancy site by APP1 may be VM11'-VNIC11→IP address: 20.200.135.10/24, VM12'-VNIC12→IP address: 20.200.135.11/24, VM13'-VNIC13→IP address: 20.200.135.12/24, and VM3-VNIC13'→IP address: 20.200.136.12/24. The network address of the backup virtual machine may not be configured in advance, but is allocated according to the information about the backup network and the relationship between the virtual network adapter of the backup virtual machine and the backup network during the redundancy process.

The determining the information about the home network of the backup virtual machine according to the association between the virtual network adapter of the source virtual machine and the source network, the identifier of the backup virtual machine, and the information about the backup network may be determining the association between the virtual network adapter of the backup virtual machine and the backup network according to the correspondence between the information about the source network and the information about the backup network, the correspondence between the identifier of the source virtual machine and the identifier of the backup virtual machine, and the association between the virtual network adapter of the source virtual machine and the source network. For example, the correspondence between the identifier of the source virtual machine and the identifier of the backup virtual machine of APP1 is VM1 (uuid=1)→VM11' (uuid=11), VM2 (uuid=2)→VM12' (uuid=12), and VM3 (uuid=3)→VM13' (uuid=13); the correspondence between the information about the source network and the information about the backup network of APP1 is Network1→network1', and Network2→network2'; and the association between the virtual network adapter of the source virtual machine used by APP1 and the source network is VM1 (uuid=1)-VNIC1→connected to Network1, VM2 (uuid=2)-VNIC1→connected to Network2, VM3 (uuid=3)-VNIC1→connected to Network1, and VM3 (uuid=3)-VNIC1→connected to Network2. Then, according to the association VM1 (uuid=1)→connected to Network1, it can be determined that VM11' (uuid=11)-VNIC11 is associated with network1', and similarly, it can be determined that VM12' (uuid=12)-VNIC12 is associated with network2', VM13' (uuid=13)-VNIC13 is associated with network1', and VM13' (uuid=13)-VNIC13' is associated with network2', that is, the association between the virtual network adapters used by APP1 and the backup networks is obtained.

507: Acquire the second description information according to the information about the backup network, the identifier and specifications of the backup virtual machine, the information about the second storage unit, and the information about the home network of the backup virtual machine.

The redundancy management module may generate the second description information, where the second description information includes the information about the backup network used at the redundancy site by the cloud application needing redundancy and the information about the backup virtual machine used at the redundancy site by the cloud application needing redundancy, and the information about the backup virtual machine includes the identifier and the specifications of the backup virtual machine, the information about the second storage unit occupied at the redundancy site by the backup virtual machine, and the information about the home network of the backup virtual machine.

For example, the second description information of APP1 may be shown in Table 3.

| Second description information of APP1 | | | |
|---|---|---|---|
| Information about backup network | | | network1' (Subnet address: 20.200.135.0/24, VLAN ID=135); network2' (Subnet address: 20.200.136.0/24, VLAN ID=136); |
| Information about backup virtual machine | Identifier and specifications of backup virtual machine | | VM11' (uuid=11, 2VCPU, 60G memory); VM12' (uuid=12, 2VCPU, 60G memory); VM13' (uuid=13, 2VCPU, 40G memory); |
| | Information about second storage unit occupied at redundancy site by backup virtual machine | | It may be: a) VM11'–> LUN7' and LUN8'; VM12'–> LUN7'; VM13'–> LUN8' and LUN9'; or, it may be: b) LUN7', LUN8', LUN9'. |
| | Information about home network of backup virtual machine | Network address of backup virtual machine (optional) | VM11'-VNIC11–> IP address: 20.200.135.10/24; VM12'-VNIC12–> IP address: 20.200.135.11/24; VM13'-VNIC13–> IP address: 20.200.135.12/24; VM13'-VNIC13'–> IP address: 20.200.136.12/24; |
| | | Association between virtual network adapter of backup virtual machine and source network (optional) | VM11'-VNIC11–>connected to Network1; VM12'-VNIC12–>connected to Network1; VM13'-VNIC13–>connected to Network1; VM13'-VNIC13'–>connected to Network2; |

508: Register the second description information with the cloud management module at the redundancy site.

There may be two manners of registering, by the redundancy management module, the second description information with the cloud management module at the redundancy site. In a first manner, the redundancy management module directly registers the second description information with the cloud management module at the redundancy site, so that the cloud management module at the redundancy site recovers the cloud application needing redundancy at the redundancy site according to the second description information; and in a second manner, the redundancy management module sends the second description information to the cloud management module at the production site, so that the cloud management module at the production site registers the second description information with the cloud management module at the redundancy site using the cloud management interface.

In the embodiment of the present invention, the redundancy management module is capable of acquiring first description information of a cloud application needing redundancy, where the first description information not only includes information about a source virtual machine used at a production site by the cloud application needing redundancy, but also includes information about a source network used at the production site by the cloud application needing redundancy; based on the first description information that gives an overall description about the cloud application needing redundancy, information about a backup network used by the cloud application needing redundancy at the redundancy site and information about a backup virtual machine used by the cloud application needing redundancy at the redundancy site can be configured for the cloud application needing redundancy, that is, second description information of the cloud application needing redundancy at the redundancy site can be generated, where the second description information gives an overall description about the deployment of the cloud application needing redundancy at the redundancy site; and the redundancy management module registers the second description information with the cloud management module at the redundancy site, so that the cloud management module at the redundancy site can recover the cloud application needing redundancy completely at the redundancy site, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Recovery Process in Specific Embodiment 1

Figure 7:
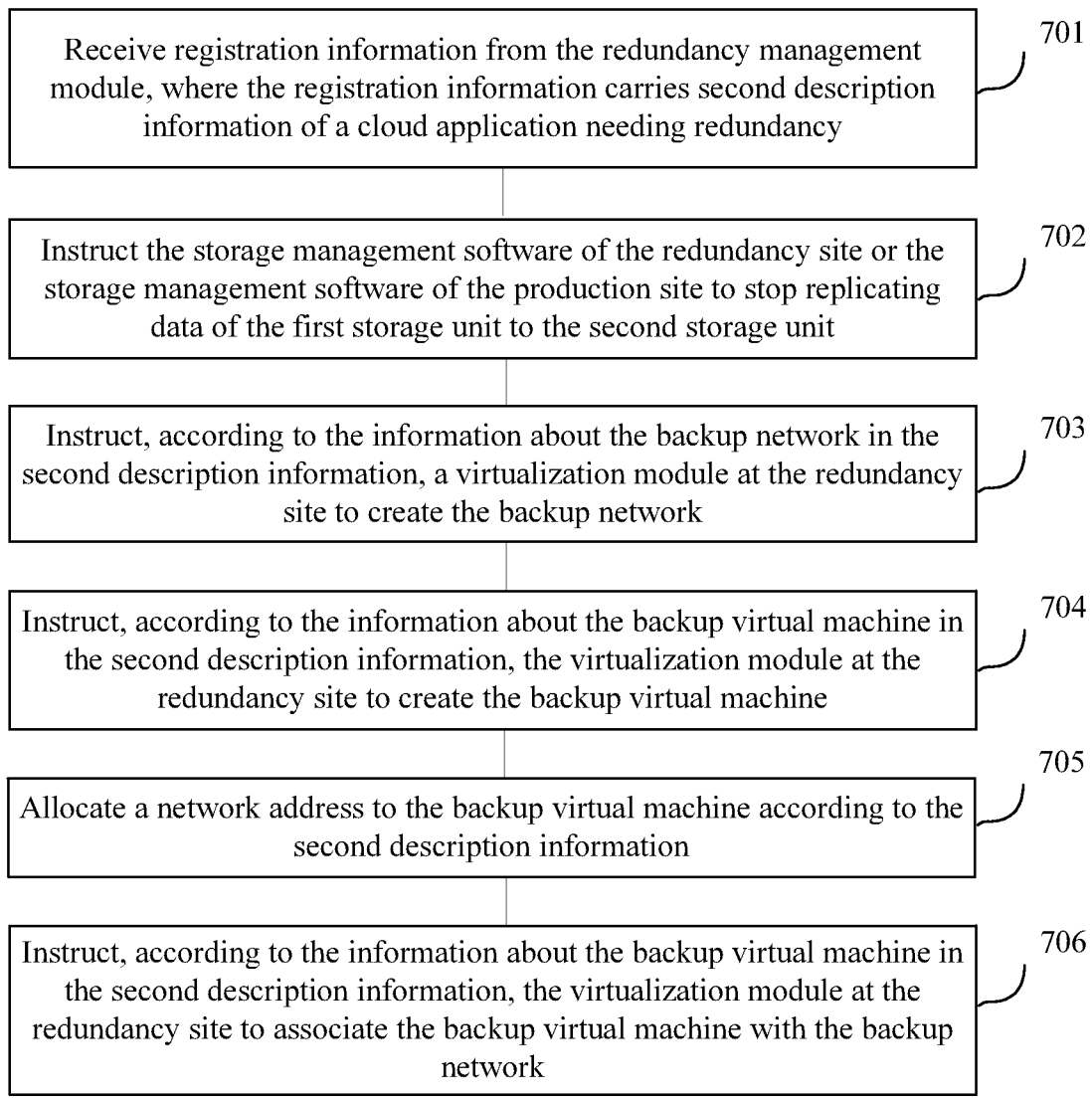
FIG. 7 is a flowchart of another redundancy method provided by an embodiment of the present invention.

With reference to the system architecture shown in FIG. 1A and as shown in FIG. 7, a redundancy method in the embodiment of the present invention is used to recover a cloud application needing redundancy of the production site at the redundancy site when a redundancy incident occurs at the production site. The method may be executed by the cloud management module at the redundancy site. The method may include:

701: Receive registration information from the redundancy management module, where the registration information carries second description information of a cloud application needing redundancy.

The cloud management module at the redundancy site may receive the registration information from the redundancy management module, and acquire the second description information of the cloud application needing redundancy carried in the registration information, where the registration information from the redundancy management module includes the registration information that is directly registered by the redundancy management module with the cloud management module at the redundancy site, and may also include the registration information that is registered by the redundancy management module with the cloud management module at the redundancy site using the cloud management module at the production site.

The second description information includes information about a backup network used at the redundancy site by the cloud application needing redundancy and information about a backup virtual machine used at the redundancy site by the cloud application needing redundancy, and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine. For example, the second description information of APP1 may be shown in Table 2.

Further, the information about the home network of the backup virtual machine may include an association between a virtual network adapter of the backup virtual machine and the backup network, or a network address of the virtual network adapter of the backup virtual machine.

702: Instruct the storage management software of the redundancy site or the storage management software of the production site to stop replicating data of the first storage unit to the second storage unit.

Before the cloud application needing redundancy is recovered at the redundancy site, the cloud management module at the redundancy site may first configure the storage management software of the redundancy site or the storage management software of the production site, so as to stop the redundancy site from replicating the data of the first storage unit to the second storage unit, thereby avoiding that after the redundancy, data is overwritten because the second storage unit continues to acquire the data of the first storage unit by means of replication, and ensuring reliable recovery of the cloud application needing redundancy.

Step 702 is an optional step. Step 702 may be performed before step 701, or may be performed after step 701, which is not limited in the embodiment of the present invention.

703: Instruct, according to the information about the backup network in the second description information, a virtualization module at the redundancy site to create the backup network.

After acquiring the second description information, the cloud management module at the redundancy site may send a virtualized network creating command to the virtualization module at the redundancy site, where the virtualized network creating command carries the information about the backup network, so that the virtualization module at the redundancy site determines, according to the virtualized network creating command, a virtual switch used by the cloud application needing redundancy, and configures the information about the backup network for a port group of the virtual switch. Further, the cloud management module at the redundancy site sends the virtualized network creating command to the virtualization module at the redundancy site, where the virtualized network creating command carries the information about the backup network and the information about the second storage unit; and after receiving the virtualized network creating command, the virtualization module determines, according to the information about the second storage unit, the virtual switch used at the redundancy site by the cloud application needing redundancy, specifies or creates the port group of the virtual switch, creates a correspondence between the backup network and the port group of the virtual switch, and then configures the information about the backup network for the port group of the virtual switch according to the correspondence between the backup network and the port group of the virtual switch, so that the backup network is recovered. For example, assuming that the storage units occupied by the backup virtual machine used at the redundancy site by APP1 are LUN7', LUN8', and LUN9', the cloud management module at the redundancy site may select two virtual switches DVS1' and DVS2' from the virtual switches used by computing nodes associated with LUN7', LUN8', and LUN9', determines to correspondingly associate network1' with DVS1', and correspondingly associate network2' with DVS2', and then instructs, according to the determined correspondences, the virtualization module at the redundancy site to register and configure network1' information (Subnet address: 20.200.135.0/24, VLAN ID=135) with a port group of DVS1', and register and configure network2' information (Subnet address: 20.200.136.0/24, VLAN ID=136) for a port group of DVS2', so that the backup networks network1' and network2' used at the redundancy site by APP1 are recovered, where network1' and network2' may also be correspondingly associated with a same virtual switch, which is not limited in the embodiment of the present invention.

Further, after the virtualization module creates the backup network, the cloud management module at the redundancy site may acquire the correspondence between the backup network and the port group of the virtual switch from the virtualization module at the redundancy site, and record a correspondence between the information about the backup network and the port group of the virtual switch.

704: Instruct, according to the information about the backup virtual machine in the second description information, the virtualization module at the redundancy site to create the backup virtual machine.

After acquiring the second description information, the cloud management module at the redundancy site may instruct, according to the identifier and the specifications of the backup virtual machine in the second description information, and the information about the second storage unit, the virtualization module at the redundancy site to create the backup virtual machine, which includes sending a command for creating a virtual machine to the virtualization module at the redundancy site, where the command for creating a virtual machine carriers the identifier and the specifications of the backup virtual machine, and the information about the second storage unit, and instructing, according to the foregoing information, the virtualization module at the redundancy site to create the backup virtual machine and the virtual network adapter of the backup virtual machine, where the created backup virtual machine occupies the second storage unit.

Further, after receiving the command for creating a virtual machine, the virtualization module at the redundancy site determines, according to the information about the second storage unit carried in the command for creating a virtual machine, a computing node used for creating the backup virtual machine, creates, according to the identifier and the specifications of the backup virtual machine using a resource of the computing node, the backup virtual machine and the virtual network adapter of the backup virtual machine, and specifies, according to the information about the second storage unit, that the backup virtual machine occupies the second storage unit. For example, assuming that the information about the second storage unit occupied by the backup virtual machine used at the redundancy site by APP1 is VM11'→LUN7' and LUN8', VM12'→LUN7', and VM13'→LUN8' and LUN9', the cloud management module at the redundancy site may determine a computing node associated with LUN7', LUN8', and LUN9', then instructs the virtualization module at the redundancy site to use a resource of the computing node to create the backup virtual machines and the virtual network adapters of the backup virtual machines: VM11' (uuid=11; 2VCPU, 60 G memory, VNIC11), VM12' (uuid=12; 2VCPU, 60 G memory, VNIC12), and VM13' (uuid=13; 2VCPU, 40 G memory, VNIC13 and VNIC13'), and specifies, according to the information about the second storage unit, that VM11' occupies the storage units LUN7' and LUN8', VM12' occupies the storage unit LUN7', and VM13' occupies the storage units LUN8' and LUN9', where the computing node may be one or more, as long as it is ensured that the backup virtual machine VM11' created on the computing node can access the storage units LUN7' and LUN8', VM12' can access the storage unit LUN7', and VM13' can access the storage units LUN8' and LUN9', which are not limited in the embodiment of the present invention.

Further, the virtualization module at the redundancy site may further allocate a media access control (MAC) address to the virtual network adapter of the created backup virtual machine.

705: Allocate a network address to the backup virtual machine according to the second description information.

After the backup virtual machine is created, the cloud management module at the redundancy site may instruct the virtualization module at the redundancy site or a dynamic host configuration protocol (DHCP) server of the redundancy site to allocate the network address to the virtual network adapter of the created backup virtual machine, where the network address may be an IP address. Further, the redundancy site may allocate the network address to the virtual network adapter of the backup virtual machine using the following two methods:

1) A First Method,

The cloud management module at the redundancy site determines the network address of the backup virtual machine, and then instructs the virtualization module at the redundancy site to create the virtual network adapter of the backup virtual machine and then allocate the network address of the backup virtual machine to the virtual network adapter of the backup virtual machine. Further, if, during the redundancy configuration process, the network address has been configured for the backup virtual machine used by the cloud application needing redundancy, the information about the home network of the backup virtual machine carries the network address of the backup virtual machine, and the cloud management module at the redundancy site may acquire the network address of the backup virtual machine carried in the information about the home network of the backup virtual machine; and if, during the redundancy configuration process, no network address is configured for the backup virtual machine used by the cloud application needing redundancy, the cloud management module at the redundancy site may allocate, from unused network addresses of the backup networks corresponding to the backup virtual machine, a network address to the virtual network adapter of the backup virtual machine according to the information about the backup network and the association between the virtual network adapter of the backup virtual machine and the backup network.

2) A Second Method,

The cloud management module at the redundancy site may register address allocation information with the DHCP server of the redundancy site, so that the DHCP server allocates the network address to the virtual network adapter of the created backup virtual machine according to the registration information, where the address allocation information may be the network address of the backup virtual machine, a physical address of the virtual network adapter of the backup virtual machine, and an association between the network address of the backup virtual machine and the physical address of the virtual network adapter of the backup virtual machine, or may be information about the backup network associated with the backup virtual machine.

Further, if, during the redundancy configuration process, the network address has been configured for the backup virtual machine used by the cloud application needing redundancy, the information about the home network of the backup virtual machine carries the network address of the backup virtual machine, and the cloud management module at the redundancy site may acquire the physical address of the virtual network adapter of the backup virtual machine, create the association between the network address of the backup virtual machine and the physical address of the virtual network adapter of the backup virtual machine, and then register the network address of the backup virtual machine, the physical address of the virtual network adapter of the backup virtual machine, and the association between the network address of the backup virtual machine and the physical address of the virtual network adapter of the backup virtual machine with the DHCP server of the redundancy site, so that the DHCP server of the redundancy site allocates the network address of the backup virtual machine to the virtual network adapter of the backup virtual machine. For example, the cloud management module at the redundancy site acquires MAC addresses of VM11', VM12', and VM13' from the virtualization module at the redundancy site, acquires preconfigured IP addresses of VM11', VM12', and VM13' from the second description information, creates correspondences between the MAC addresses and IP addresses of VM11', VM12', and VM13' separately, and registers the correspondences with the DHCP server, so that the DHCP server can allocate the preconfigured IP addresses to VM11', VM12', and VM13'. If, during the redundancy configuration process, no network address is configured for the backup virtual machine used by the cloud application needing redundancy, the cloud management module at the redundancy site determines, according to the information about the backup network and the association between the virtual network adapter of the backup virtual machine and the backup network, the information about the backup network correspondingly associated with the backup virtual machine, and registers, with the DHCP server of the redundancy site, the information about the backup network correspondingly associated with the backup virtual machine, so that the DHCP server of the redundancy site allocates the network address to the virtual network adapter of the backup virtual machine according to the information about the backup network correspondingly associated with the backup virtual machine. For example, the cloud management module at the redundancy site shown in FIG. 1A, or FIG. 1B, or FIG. 1C determines that a subnet address of the network correspondingly associated with VM11' is 20.200.135.0/24, a subnet address of the network correspondingly associated with VM12' is 20.200.135.0/24, and the subnet addresses of the networks correspondingly associated with VM13' are 20.200.135.0/24 and 20.200.136.0/24, and registers, with the DHCP server, the subnet addresses of the networks correspondingly associated with the backup virtual machine, so that the DHCP server allocates a dynamic IP address to VM11' according to the subnet address of the network correspondingly associated with VM11', allocates a dynamic IP address to VM12' according to the subnet address of the network correspondingly associated with VM12', and allocates dynamic IP addresses to VM13' according to the subnet addresses of the networks correspondingly associated with VM13'.

706: Instruct, according to the information about the backup virtual machine in the second description information, the virtualization module at the redundancy site to associate the backup virtual machine with the backup network.

After creating the backup virtual machine and the backup network, the cloud management module at the redundancy site may instruct the virtualization module at the redundancy site to associate the virtual network adapter of the backup virtual machine with the virtual switch according to the information about the home network of the backup virtual machine in the information about the backup virtual machine. It includes that the cloud management module at the redundancy site may acquire the association between the virtual network adapter of the backup virtual machine and the backup network according to the information about the home network of the backup virtual machine, where the acquiring the association between the virtual network adapter of the backup virtual machine and the backup network may be directly acquiring from the information about the home network of the backup virtual machine, or determining the association between the virtual network adapter of the backup virtual machine and the backup network according to the network address of the backup virtual machine in the information about the home network of the backup virtual machine and the information about the backup network; the cloud management module at the redundancy site may acquire, from the virtualization module at the redundancy site, the correspondence between the information about the backup network and the port group of the virtual switch, and determine the correspondence between the virtual network adapter of the backup virtual machine and the port group of the virtual switch according to the association between the virtual network adapter of the backup virtual machine and the backup network and the correspondence between the information about the backup network and the port group of the virtual switch; and the cloud management module at the redundancy site instructs, according to the correspondence between the virtual network adapter of the backup virtual machine and the port group of the virtual switch, the virtualization module to associate the virtual network adapter of the backup virtual machine with the port group of the virtual switch, so that the backup virtual machine can use, according to the network address of the backup virtual machine, the port group of the virtual switch correspondingly associated with the virtual network adapter of the backup virtual machine and the backup network for data transmission.

In the embodiment of the present invention, the cloud management module at the redundancy site can acquire second description information of a cloud application needing redundancy from the redundancy management module, where the second description information gives an overall description about the deployment of the cloud application needing redundancy at the redundancy site; and after acquiring the second description information, the cloud management module at the redundancy site can instruct, according to the information about the backup network in the second description information, the virtualization module at the redundancy site to create the backup network; instruct, according to the identifier and specifications of the backup virtual machine in the second description information and the information about the second storage unit, the virtualization module at the redundancy site to create the backup virtual machine; associate the backup virtual machine with the backup network according to the information about the home network of the backup virtual machine in the second description information; and completely and rapidly recover the cloud application needing redundancy at the redundancy site, thereby implementing redundancy based on a cloud application. Different from a manner of redundancy based on a virtual machine granularity in the prior art, the embodiment of the present invention implements redundancy at an application level, and avoids a possible problem, which is caused by the redundancy based on a virtual machine granularity, that a cloud application cannot be completely and rapidly recovered.

Configuration Process in Specific Embodiment 2

Figure 8:
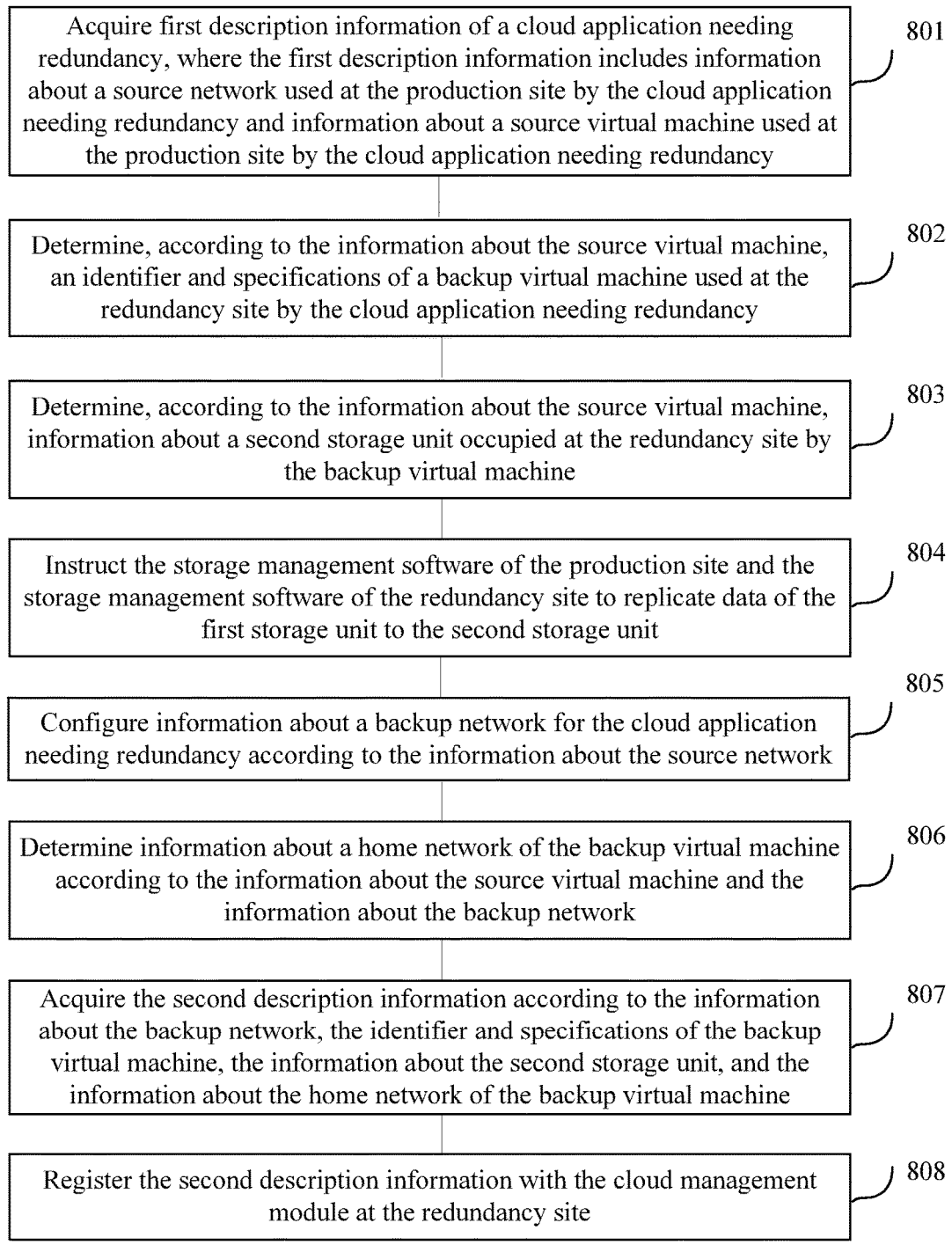
FIG. 8 is a flowchart of another redundancy method provided by an embodiment of the present invention.

With reference to the system architecture shown in FIG. 1B and as shown in FIG. 8, a redundancy method provided by the embodiment of the present invention is used to configure a cloud application needing redundancy of the production site at the redundancy site, so as to recover the cloud application needing redundancy at the redundancy site according to configuration information when a redundancy incident occurs at the production site. The method may be executed by the cloud management module at the production site. The method may include:

801: Acquire first description information of a cloud application needing redundancy, where the first description information includes information about a source network used at the production site by the cloud application needing redundancy and information about a source virtual machine used at the production site by the cloud application needing redundancy.

There may be two methods for the cloud management module at the production site to acquire the first description information of the cloud application needing redundancy, which are:

1) A First Method,

The cloud management module at the production site directly acquires the first description information, which is recorded by the cloud management module at the production site, of the cloud application needing redundancy, where the cloud management module at the production site may collect, after the virtual machine of the cloud application is deployed, static description information and dynamic description information of a running instance of the cloud application to generate the first description information.

2) A Second Method,

The cloud management module at the production site generates the first description information according to the identifier and specifications of the source virtual machine used at the production site by the cloud application needing redundancy, the information about the first storage unit occupied at the production site by the source virtual machine, and the network address of the source virtual machine, where the foregoing information is recorded by the cloud management module at the production site.

The first description information includes the information about a source network used at the production site by the cloud application needing redundancy and information about a source virtual machine used at the production site by the cloud application needing redundancy. The information about the source virtual machine includes the identifier and specifications of the source virtual machine used at the production site by the cloud application needing redundancy, the information about the first storage unit occupied at the production site by the source virtual machine, and the information about the home network of the source virtual machine.

Further, the information about the home network of the source virtual machine may include a network address of the source virtual machine or an association between a virtual network adapter of the source virtual machine and the source network.

802: Determine, according to the information about the source virtual machine, an identifier and specifications of a backup virtual machine used at the redundancy site by the cloud application needing redundancy.

803: Determine, according to the information about the source virtual machine, information about a second storage unit occupied at the redundancy site by the backup virtual machine.

After acquiring the first description information, the cloud management module at the production site may determine the information about the second storage unit according to the information about the first storage unit carried in the information about the source virtual machine. It may include the following three steps:

803a: Acquire an idle storage unit of the redundancy site.

803b: Select the second storage unit from the idle storage unit of the redundancy site.

803c: Create a replication relationship between the first storage unit and the second storage unit, and determine the information about the second storage unit occupied at the redundancy site by the backup virtual machine.

804: Instruct the storage management software of the production site and the storage management software of the redundancy site to replicate data of the first storage unit to the second storage unit.

805: Configure information about a backup network for the cloud application needing redundancy according to the information about the source network.

806: Determine information about a home network of the backup virtual machine according to the information about the source virtual machine and the information about the backup network.

807: Acquire the second description information according to the information about the backup network, the identifier and specifications of the backup virtual machine, the information about the second storage unit, and the information about the home network of the backup virtual machine.

808: Register the second description information with the cloud management module at the redundancy site.

The cloud management module at the production site directly registers the second description information with the cloud management module at the redundancy site, so that the cloud management module at the redundancy site recovers the cloud application needing redundancy at the redundancy site according to the second description information.

The specific implementation manners of steps 802 to 807 in the embodiment of the present invention are similar to those of steps 502 to 507, and details are not repeatedly described herein.

In the embodiment of the present invention, the cloud management module at the production site is capable of acquiring first description information of a cloud application needing redundancy, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, information about a backup network used by the cloud application needing redundancy at the redundancy site and information about a backup virtual machine used by the cloud application needing redundancy at the redundancy site can be configured for the cloud application needing redundancy, that is, second description information of the cloud application needing redundancy at the redundancy site can be generated; and the cloud management module at the production site registers the second description information with the cloud management module at the redundancy site, so that the cloud management module at the redundancy site can recover the cloud application needing redundancy completely at the redundancy site, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Recovery Process in Specific Embodiment 2

Figure 9:
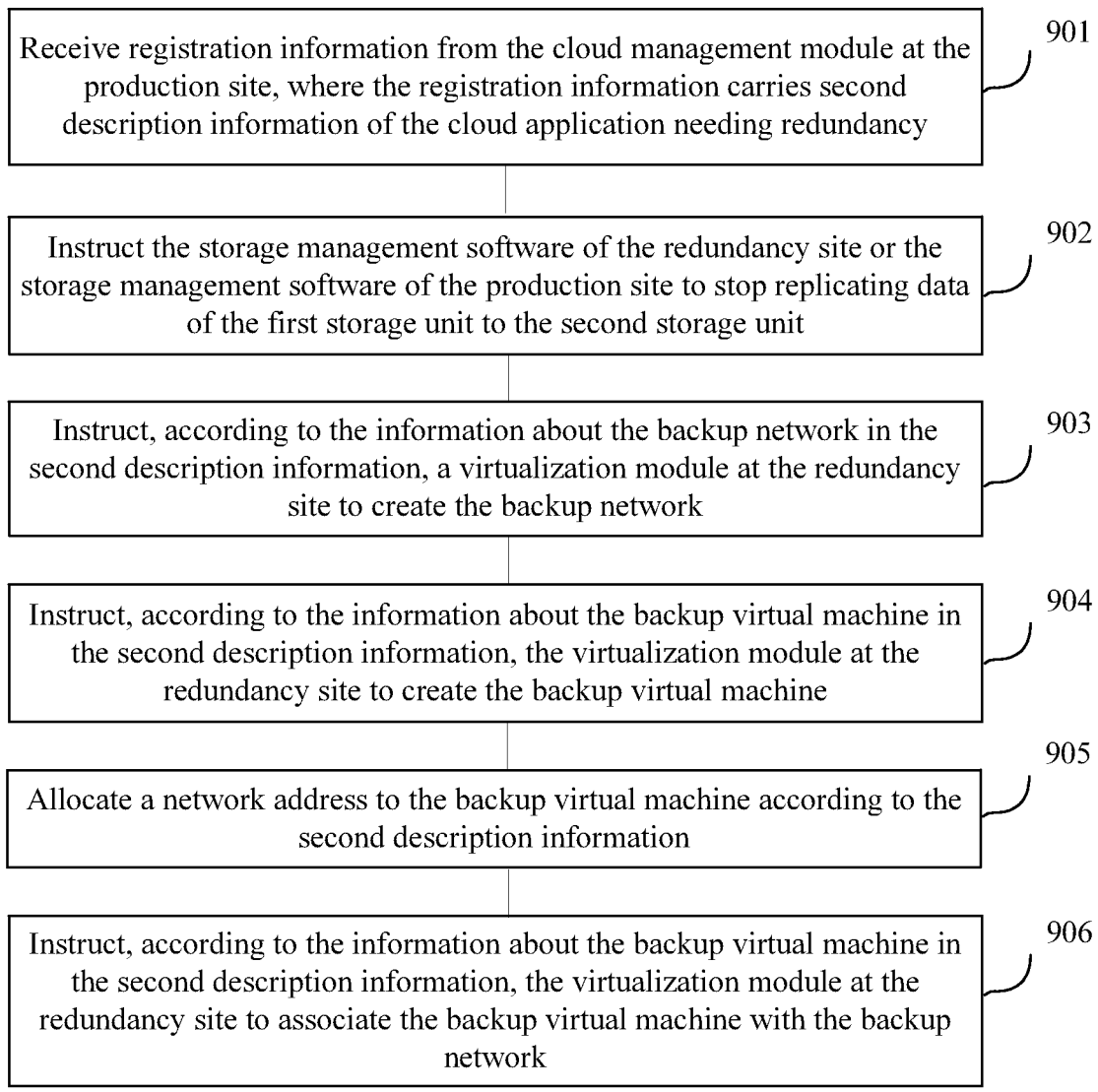
FIG. 9 is a flowchart of another redundancy method provided by an embodiment of the present invention.

With reference to the system architecture shown in FIG. 1B and as shown in FIG. 9, a redundancy method in the embodiment of the present invention is used to recover a cloud application needing redundancy of the production site at the redundancy site when a redundancy incident occurs at the production site. The method may be executed by the cloud management module at the redundancy site. The method may include:

901: Receive registration information from the cloud management module at the production site, where the registration information carries second description information of the cloud application needing redundancy.

The cloud management module at the redundancy site may receive the registration information from the cloud management module at the production site, and acquire the second description information of the cloud application needing redundancy carried in the registration information, where the second description information includes information about a backup network used at the redundancy site by the cloud application needing redundancy and information about a backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

Further, the information about the home network of the backup virtual machine may include an association between a virtual network adapter of the backup virtual machine and the backup network, or a network address of the virtual network adapter of the backup virtual machine.

902: Instruct the storage management software of the redundancy site or the storage management software of the production site to stop replicating data of the first storage unit to the second storage unit.

Step 902 is an optional step. Step 902 may be performed before step 901, or may be performed after step 901, which is not limited in the embodiment of the present invention.

903: Instruct, according to the information about the backup network in the second description information, a virtualization module at the redundancy site to create the backup network.

904: Instruct, according to the information about the backup virtual machine in the second description information, the virtualization module at the redundancy site to create the backup virtual machine.

905: Allocate a network address to the backup virtual machine according to the second description information.

906: Instruct, according to the information about the backup virtual machine in the second description information, the virtualization module at the redundancy site to associate the backup virtual machine with the backup network.

The specific implementation manners of steps 902 to 906 in the embodiment of the present invention are similar to those of steps 702 to 706, and details are not repeatedly described herein.

In the embodiment of the present invention, the cloud management module at the redundancy site can acquire second description information of a cloud application needing redundancy from the cloud management module at the production site, where the second description information gives an overall description about the deployment of the cloud application needing redundancy at the redundancy site; and after acquiring the second description information, the cloud management module at the redundancy site can instruct, according to the information about the backup network in the second description information, the virtualization module at the redundancy site to create the backup network; instruct, according to the identifier and specifications of the backup virtual machine in the second description information and the information about the second storage unit, the virtualization module at the redundancy site to create the backup virtual machine; associate the backup virtual machine with the backup network according to the information about the home network of the backup virtual machine in the second description information; and completely and rapidly recover the cloud application needing redundancy at the redundancy site, thereby implementing redundancy based on a cloud application. Different from a manner of redundancy based on a virtual machine granularity in the prior art, the embodiment of the present invention implements redundancy at an application level, and avoids a possible problem, which is caused by the redundancy based on a virtual machine granularity, that a cloud application cannot be completely and rapidly recovered.

Configuration Process in Specific Embodiment 3

Figure 10:
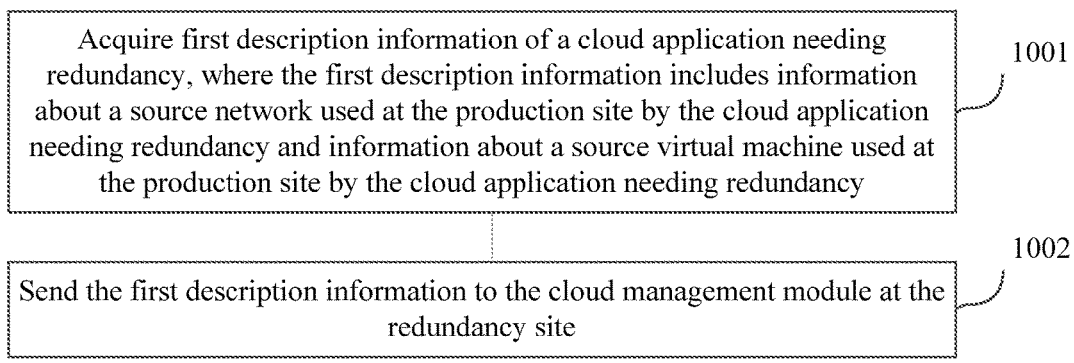
FIG. 10 is a flowchart of another redundancy method provided by an embodiment of the present invention.

With reference to the system architecture shown in FIG. 1B and as shown in FIG. 10, a redundancy method provided by the embodiment of the present invention is used to acquire configuration information of a cloud application needing redundancy at the production site, so that the cloud management module at the redundancy site can configure the cloud application needing redundancy at the redundancy site according to the configuration information, so as to recover the cloud application needing redundancy. The method may be executed by the cloud management module at the production site. The method may include:

1001: Acquire first description information of a cloud application needing redundancy, where the first description information includes information about a source network used at the production site by the cloud application needing redundancy and information about a source virtual machine used at the production site by the cloud application needing redundancy.

There may be two methods for the cloud management module at the production site to acquire the first description information of the cloud application needing redundancy, which are:

1) A First Method,

The cloud management module at the production site directly acquires the first description information, which is recorded by the cloud management module at the production site, of the cloud application needing redundancy, where the cloud management module at the production site may collect, after the virtual machine of the cloud application is deployed, static description information and dynamic description information of a running instance of the cloud application to generate the first description information.

2) A Second Method,

The cloud management module at the production site generates the first description information according to the identifier and specifications of the source virtual machine used at the production site by the cloud application needing redundancy, the information about the first storage unit occupied at the production site by the source virtual machine, and the network address of the source virtual machine, where the foregoing information is recorded by the cloud management module at the production site.

The first description information includes the information about a source network used at the production site by the cloud application needing redundancy and information about a source virtual machine used at the production site by the cloud application needing redundancy. The information about the source virtual machine includes the identifier and specifications of the source virtual machine used at the production site by the cloud application needing redundancy, the information about the first storage unit occupied at the production site by the source virtual machine, and the information about the home network of the source virtual machine.

Further, the information about the home network of the source virtual machine includes a network address of the source virtual machine or an association between a virtual network adapter of the source virtual machine and the source network.

1002: Send the first description information to the cloud management module at the redundancy site.

The cloud management module at the production site may send the first description information to the cloud management module at the redundancy site, so that the cloud management module at the redundancy site can configure, based on the first description information that gives an overall description about the cloud application needing redundancy, second description information of the cloud application needing redundancy for the cloud application needing redundancy, to recover the cloud application needing redundancy.

In the embodiment of the present invention, the cloud management module at the production site is capable of acquiring first description information of a cloud application needing redundancy, where the first description information not only includes information about a source virtual machine used at the production site by the cloud application needing redundancy, but also includes information about a source network used at the production site by the cloud application needing redundancy; and the cloud management module at the production site is capable of sending the first description information to the cloud management module at the redundancy site, so that the cloud management module at the redundancy site can configure, based on the first description information that gives an overall description about the cloud application needing redundancy, second description information of the cloud application needing redundancy for the cloud application needing redundancy, so as to completely recover the cloud application needing redundancy at the redundancy site according to the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Recovery Process in Specific Embodiment 3

Figure 11:
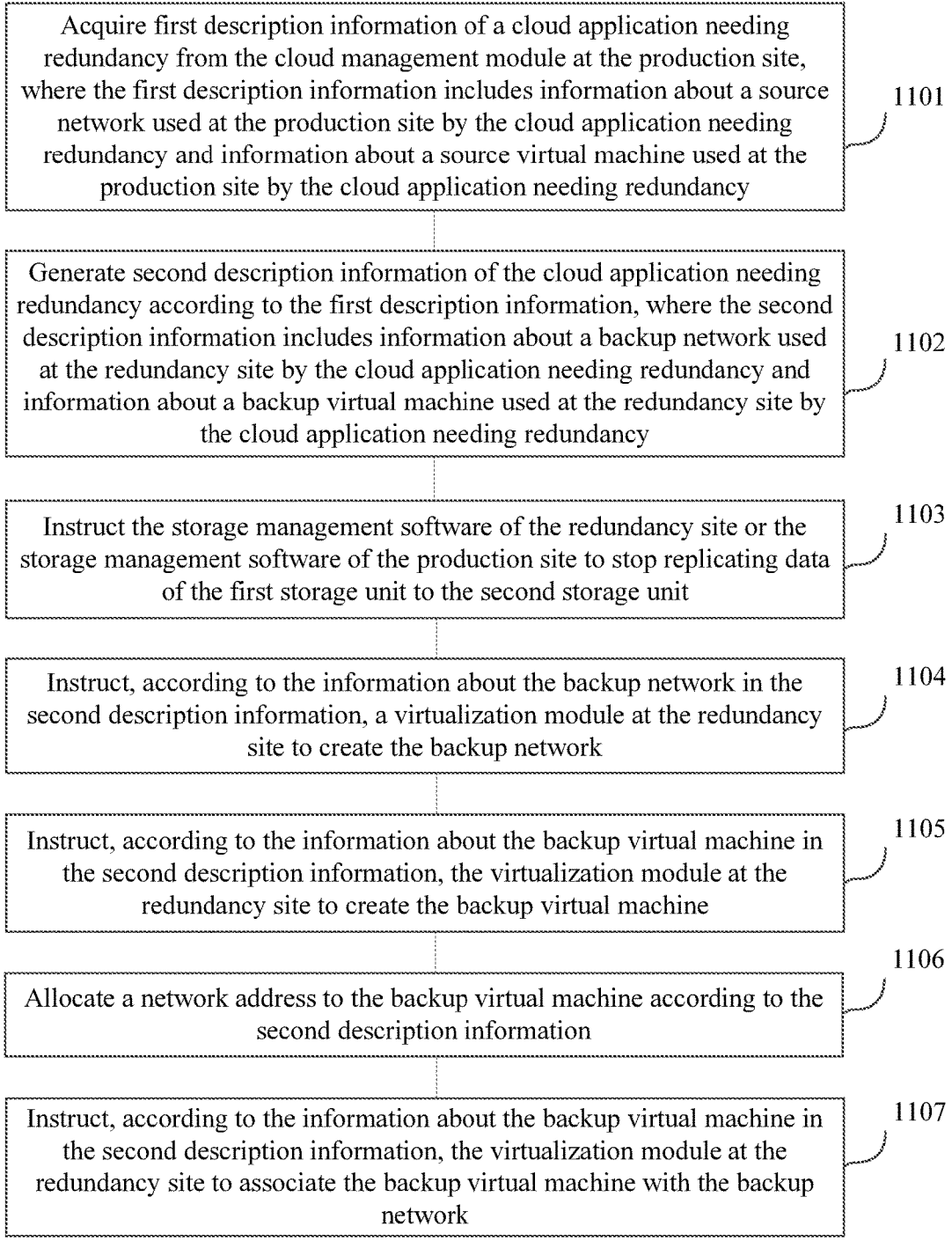
FIG. 11 is a flowchart of another redundancy method provided by an embodiment of the present invention.

With reference to the system architecture shown in FIG. 1B and as shown in FIG. 11, the redundancy method in the embodiment of the present invention is used to configure a cloud application needing redundancy of the production site at the redundancy site, so as to recover the cloud application needing redundancy of the production site at the redundancy site when a redundancy incident occurs at the production site. The method may be executed by the cloud management module at the redundancy site. The method may include:

1101: Acquire first description information of a cloud application needing redundancy from the cloud management module at the production site, where the first description information includes information about a source network used at the production site by the cloud application needing redundancy and information about a source virtual machine used at the production site by the cloud application needing redundancy.

The cloud management module at the redundancy site may receive the first description information of the cloud application needing redundancy sent by the cloud management module at the production site.

The information about the source virtual machine used at the production site by the cloud application needing redundancy includes an identifier and specifications of the source virtual machine, information about a first storage unit occupied at the production site by the source virtual machine, and information about a home network of the source virtual machine.

The information about the home network of the source virtual machine includes an association between a virtual network adapter of the source virtual machine and the source network, or a network address of the virtual network adapter of the source virtual machine.

1102: Generate second description information of the cloud application needing redundancy according to the first description information, where the second description information includes information about a backup network used at the redundancy site by the cloud application needing redundancy and information about a backup virtual machine used at the redundancy site by the cloud application needing redundancy.

The information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

The generating, by the cloud management module, second description information of the cloud application needing redundancy according to the first description information includes determining the identifier and the specifications of the backup virtual machine according to the identifier and the specifications of the source virtual machine; determining the information about the second storage unit according to the information about the first storage unit; configuring the information about the backup network for the cloud application needing redundancy according to the information about the source network; and determining the information about the home network of the backup virtual machine according to the identifier of the backup virtual machine and the information about the home network of the source virtual machine.

The information about the home network of the backup virtual machine may include an association between a virtual network adapter of the backup virtual machine and the backup network, or a network address of the virtual network adapter of the backup virtual machine.

For a specific implementation manner of generating second description information of the cloud application needing redundancy according to the first description information, reference may be made to steps 502 to 507.

1103: Instruct the storage management software of the redundancy site or the storage management software of the production site to stop replicating data of the first storage unit to the second storage unit.

Step 1103 is an optional step. Step 1103 may be performed before step 1102, or may be performed after step 1102, which is not limited in the embodiment of the present invention.

1104: Instruct, according to the information about the backup network in the second description information, a virtualization module at the redundancy site to create the backup network.

1105: Instruct, according to the information about the backup virtual machine in the second description information, the virtualization module at the redundancy site to create the backup virtual machine.

1106: Allocate a network address to the backup virtual machine according to the second description information.

1107: Instruct, according to the information about the backup virtual machine in the second description information, the virtualization module at the redundancy site to associate the backup virtual machine with the backup network.

The specific implementation manners of steps 1103 to 1107 in the embodiment of the present invention are similar to those of steps 702 to 706, and details are not repeatedly described herein.

In the embodiment of the present invention, the cloud management module at the redundancy site is capable of acquiring first description information of a cloud application needing redundancy from the cloud management module at the production site, where the first description information not only includes information about a source virtual machine used at the production site by the cloud application needing redundancy, but also includes information about a source network used at the production site by the cloud application needing redundancy; and can generate, based on the first description information that gives an overall description about the cloud application needing redundancy, second description information of the cloud application needing redundancy at the redundancy site, where the second description information gives an overall description about the deployment of the cloud application needing redundancy at the redundancy site; instruct, according to information about a backup network in the second description information, a virtualization module at the redundancy site to create the backup network; instruct, according to an identifier and specifications of a backup virtual machine in the second description information and information about a second storage unit, the virtualization module at the redundancy site to create the backup virtual machine; associate the backup virtual machine with the backup network according to information about a home network of the backup virtual machine in the second description information; and completely and rapidly recover the cloud application needing redundancy at the redundancy site, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

Configuration Process in Specific Embodiment 4

Figure 12:
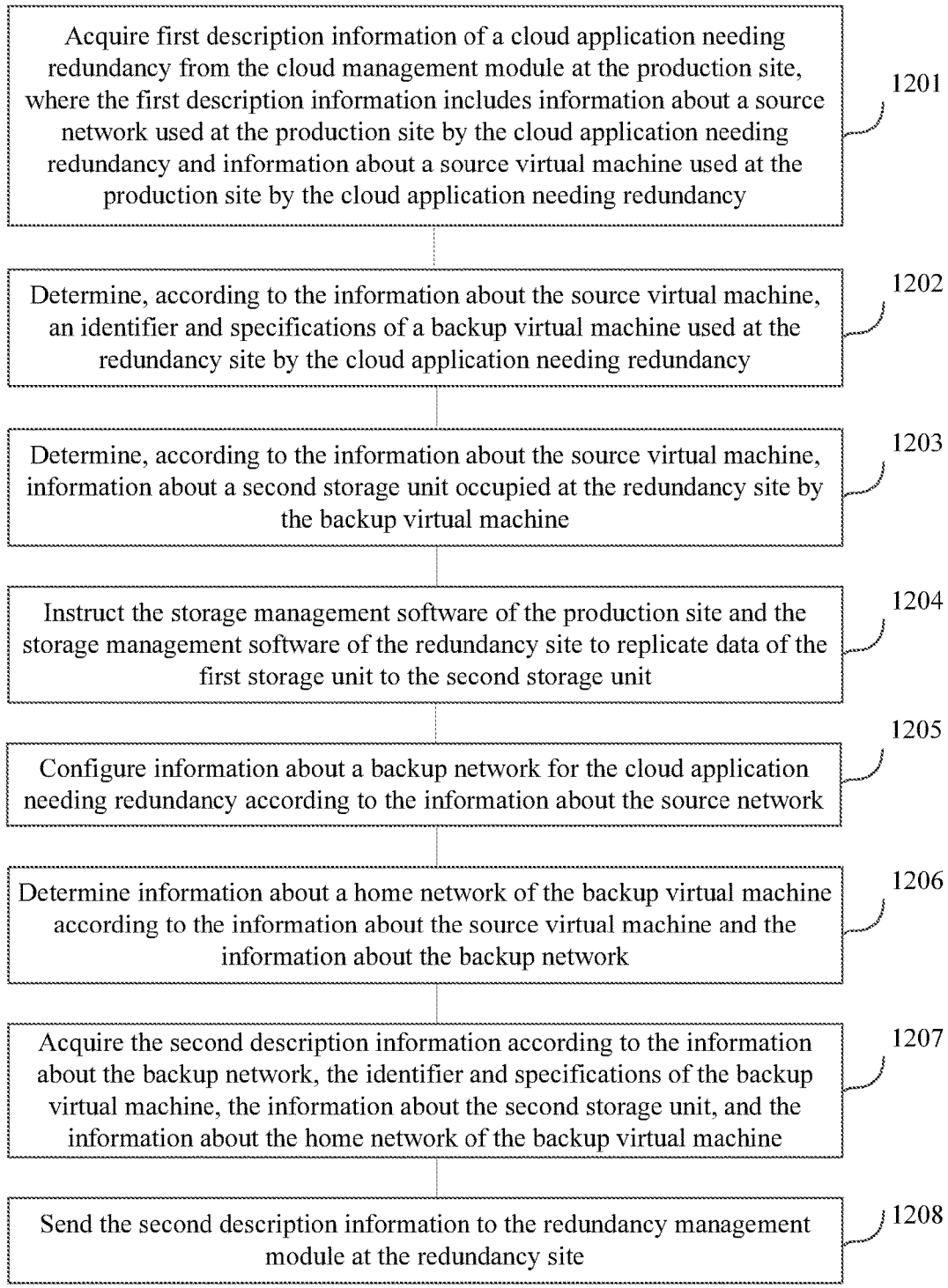
FIG. 12 is a flowchart of another redundancy method provided by an embodiment of the present invention.

With reference to the system architecture shown in FIG. 1C and as shown in FIG. 12, a redundancy method provided by the embodiment of the present invention is used to configure a cloud application needing redundancy of the production site at the redundancy site, so as to recover the cloud application needing redundancy at the redundancy site according to configuration information when a redundancy incident occurs at the production site. The method may be executed by the redundancy management module at the production site. The method may include:

1201: Acquire first description information of a cloud application needing redundancy from the cloud management module at the production site, where the first description information includes information about a source network used at the production site by the cloud application needing redundancy and information about a source virtual machine used at the production site by the cloud application needing redundancy.

There may be two methods for the redundancy management module at the production site to acquire the first description information of the cloud application needing redundancy from the cloud management module at the production site, which are:

1) A First Method,

The redundancy management module at the production site queries, using an interface connected to the cloud management module at the production site, for the first description information of the cloud application needing redundancy from the cloud management module at the production site, where the cloud management module at the production site may collect, after the virtual machine of the cloud application is deployed, static description information and dynamic description information of a running instance of the cloud application to generate the first description information.

2) A Second Method,

The redundancy management module queries, from the cloud management module at the production site using the interface connected to the cloud management module at the production site, for the identifier and specifications of the source virtual machine used at the production site by the cloud application needing redundancy, the information about the first storage unit occupied at the production site by the source virtual machine, and the network address of the source virtual machine, and generates the first description information.

The information about the source virtual machine includes an identifier and specifications of the source virtual machine, information about a first storage unit occupied at the production site by the source virtual machine, and information about a home network of the source virtual machine.

Further, the information about the home network of the source virtual machine includes a network address of the source virtual machine or an association between a virtual network adapter of the source virtual machine and the source network.

1202: Determine, according to the information about the source virtual machine, an identifier and specifications of a backup virtual machine used at the redundancy site by the cloud application needing redundancy.

1203: Determine, according to the information about the source virtual machine, information about a second storage unit occupied at the redundancy site by the backup virtual machine.

1204: Instruct the storage management software of the production site and the storage management software of the redundancy site to replicate data of the first storage unit to the second storage unit.

1205: Configure information about a backup network for the cloud application needing redundancy according to the information about the source network.

1206: Determine information about a home network of the backup virtual machine according to the information about the source virtual machine and the information about the backup network.

1207: Acquire the second description information according to the information about the backup network, the identifier and specifications of the backup virtual machine, the information about the second storage unit, and the information about the home network of the backup virtual machine.

1208: Send the second description information to the redundancy management module at the redundancy site.

The cloud management module at the production site may send the second description information to the redundancy management module at the redundancy site, so that the redundancy management module at the redundancy site can register the second description information with the redundancy site, to recover the cloud application needing redundancy at the redundancy site.

The specific implementation manners of steps 1202 to 1207 in the embodiment of the present invention are similar to those of steps 502 to 507, and details are not repeatedly described herein.

In the embodiment of the present invention, the redundancy management module at the production site is capable of acquiring first description information of a cloud application needing redundancy from the cloud management module at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, information about a backup network used at the redundancy site by the cloud application needing redundancy and information about a backup virtual machine used at the redundancy site by the cloud application needing redundancy may be configured for the cloud application needing redundancy, that is, second description information of the cloud application needing redundancy at the redundancy site can be generated, where the second description information gives an overall description about the deployment of the cloud application needing redundancy at the redundancy site; and the redundancy management module at the production site sends the second description information to the redundancy management module at the redundancy site, so that the redundancy management module at the redundancy site can provide the second description information for the redundancy site to recover the cloud application needing redundancy completely, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Configuration Process in Specific Embodiment 5

Figure 13:
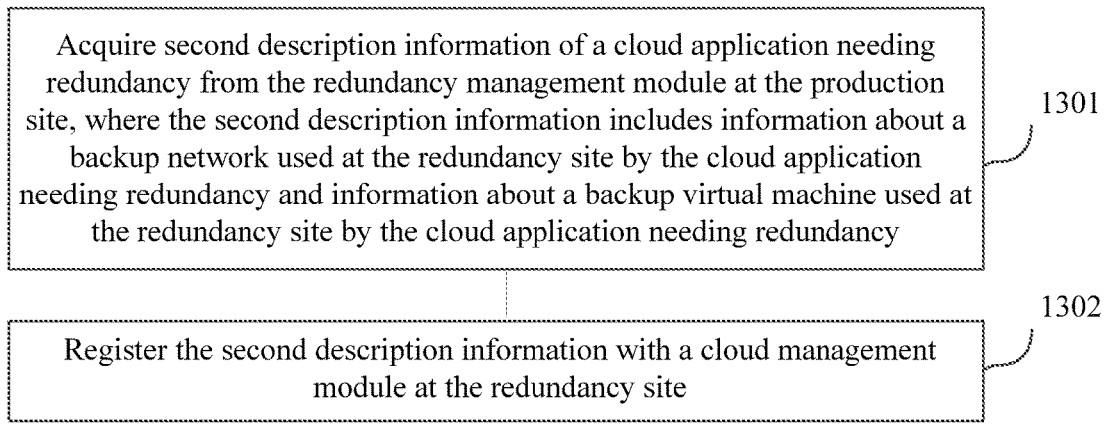
FIG. 13 is a flowchart of another redundancy method provided by an embodiment of the present invention.

With reference to the system architecture shown in FIG. 1C and as shown in FIG. 13, a redundancy method provided by the embodiment of the present invention is used to provide, for the redundancy site, configuration information of a cloud application needing redundancy of the production site at the redundancy site, so as to recover the cloud application needing redundancy at the redundancy site according to the configuration information when a redundancy incident occurs at the production site. The method may be executed by the redundancy management module at the redundancy site. The method may include:

1301: Acquire second description information of a cloud application needing redundancy from the redundancy management module at the production site, where the second description information includes information about a backup network used at the redundancy site by the cloud application needing redundancy and information about a backup virtual machine used at the redundancy site by the cloud application needing redundancy.

The redundancy management module at the redundancy site may receive the second description information sent by the redundancy management module at the production site, where the second description information includes information about a backup network used at the redundancy site by the cloud application needing redundancy and information about a backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

Further, the information about the home network of the backup virtual machine may include a network address of the backup virtual machine or an association between a virtual network adapter of the backup virtual machine and the backup network.

1302: Register the second description information with a cloud management module at the redundancy site, so that the cloud management module at the redundancy site recovers the cloud application needing redundancy at the redundancy site according to the second description information.

In the embodiment of the present invention, the redundancy management module at the redundancy site may acquire second description information of the cloud application needing redundancy from the redundancy management module at the production site, where the second description information gives an overall description about the deployment of the cloud application needing redundancy at the redundancy site; and the redundancy management module at the redundancy site may register the acquired second description information with the cloud management module at the redundancy site, so that the cloud management module at the redundancy site can completely recover the cloud application needing redundancy at the redundancy site, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Configuration Process in Specific Embodiment 6

Figure 14:
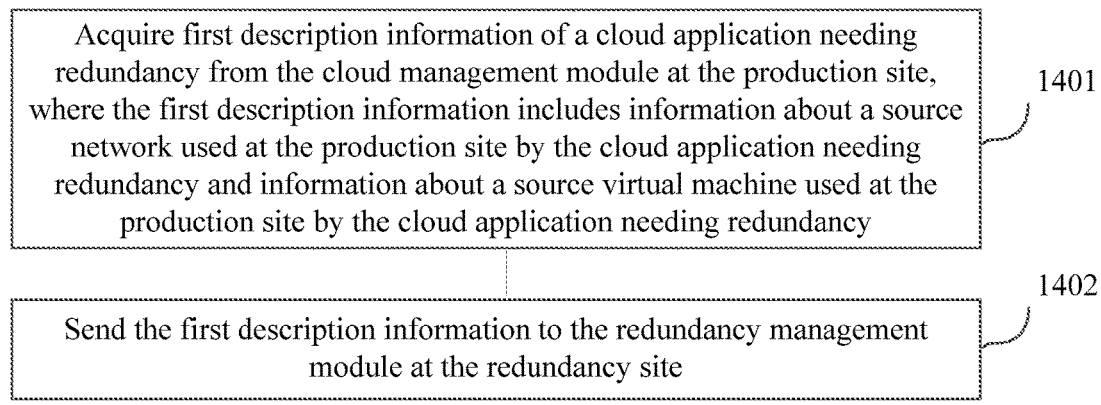
FIG. 14 is a flowchart of another redundancy method provided by an embodiment of the present invention.

With reference to the system architecture shown in FIG. 1C and as shown in FIG. 14, a redundancy method provided by the embodiment of the present invention is used to acquire configuration information of a cloud application needing redundancy at the production site, so that the redundancy management module at the redundancy site can configure the cloud application needing redundancy at the redundancy site according to the configuration information, so as to recover the cloud application needing redundancy at the redundancy site. The method may be executed by the redundancy management module at the production site. The method may include:

1401: Acquire first description information of a cloud application needing redundancy from the cloud management module at the production site, where the first description information includes information about a source network used at the production site by the cloud application needing redundancy and information about a source virtual machine used at the production site by the cloud application needing redundancy.

There may be two methods for acquiring the first description information of the cloud application needing redundancy, which are:

1) A First Method,

The redundancy management module at the production site may acquire the first description information, which is recorded by the cloud management module at the production site, of the cloud application needing redundancy, where the cloud management module at the production site may collect, after the virtual machine of the cloud application is deployed, static description information and dynamic description information of a running instance of the cloud application to generate the first description information.

2) A Second Method,

The redundancy management module at the production site may acquire, from the cloud management module at the production site, the identifier and specifications of the source virtual machine used at the production site by the cloud application needing redundancy, the information about the first storage unit occupied at the production site by the source virtual machine, and the network address of the source virtual machine, and generate the first description information.

The first description information includes the information about a source network used at the production site by the cloud application needing redundancy and information about a source virtual machine used at the production site by the cloud application needing redundancy. The information about the source virtual machine includes the identifier and specifications of the source virtual machine used at the production site by the cloud application needing redundancy, the information about the first storage unit occupied at the production site by the source virtual machine, and the information about the home network of the source virtual machine.

Further, the information about the home network of the source virtual machine includes a network address of the source virtual machine or an association between a virtual network adapter of the source virtual machine and the source network.

1402: Send the first description information to the redundancy management module at the redundancy site.

The redundancy management module at the production site may send the first description information to the redundancy management module at the redundancy site, so that the cloud management module at the redundancy site can configure, based on the first description information that gives an overall description about the cloud application needing redundancy, second description information of the cloud application needing redundancy for the cloud application needing redundancy, to recover the cloud application needing redundancy at the redundancy site.

In the embodiment of the present invention, the redundancy management module at the production site is capable of acquiring first description information of a cloud application needing redundancy, where the first description information not only includes information about a source virtual machine used at the production site by the cloud application needing redundancy, but also includes information about a source network used at the production site by the cloud application needing redundancy; and the redundancy management module at the production site is capable of sending the first description information to the redundancy management module at the redundancy site, so that the redundancy management module at the redundancy site can configure, based on the first description information that gives an overall description about the cloud application needing redundancy, second description information of the cloud application needing redundancy for the cloud application needing redundancy, so as to completely recover the cloud application needing redundancy at the redundancy site, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Configuration Process in Specific Embodiment 7

Figure 15:
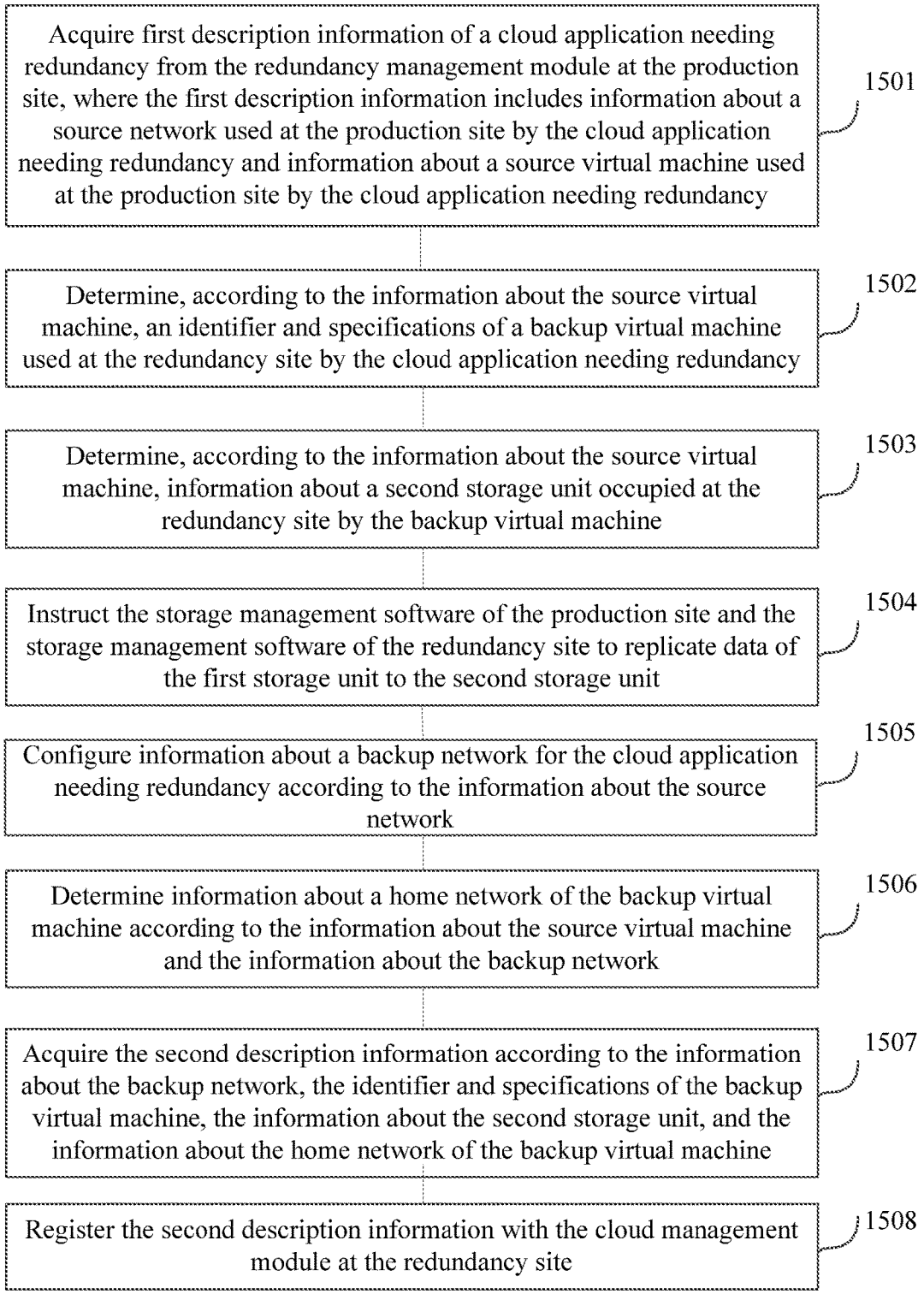
FIG. 15 is a flowchart of another redundancy method provided by an embodiment of the present invention.

With reference to the system architecture shown in FIG. 1C and as shown in FIG. 15, a redundancy method provided by the embodiment of the present invention is used to configure a cloud application needing redundancy of the production site at the redundancy site, so as to recover the cloud application needing redundancy at the redundancy site according to configuration information when a redundancy incident occurs at the production site. The method may be executed by a redundancy management module at the redundancy site. The method may include:

1501: Acquire first description information of a cloud application needing redundancy from the redundancy management module at the production site, where the first description information includes information about a source network used at the production site by the cloud application needing redundancy and information about a source virtual machine used at the production site by the cloud application needing redundancy.

The redundancy management module at the redundancy site may receive the first description information sent by the redundancy management module at the production site, where the first description information includes information about a source network used at the production site by the cloud application needing redundancy and information about a source virtual machine used at the production site by the cloud application needing redundancy; and the information about the source virtual machine used at the production site by the cloud application needing redundancy includes an identifier and specifications of the source virtual machine, information about a first storage unit occupied at the production site by the source virtual machine, and information about a home network of the source virtual machine.

Further, the information about the home network of the source virtual machine includes a network address of the source virtual machine or an association between a virtual network adapter of the source virtual machine and the source network.

1502: Determine, according to the information about the source virtual machine, an identifier and specifications of a backup virtual machine used at the redundancy site by the cloud application needing redundancy.

1503: Determine, according to the information about the source virtual machine, information about a second storage unit occupied at the redundancy site by the backup virtual machine.

1504: Instruct the storage management software of the production site and the storage management software of the redundancy site to replicate data of the first storage unit to the second storage unit.

1505: Configure information about a backup network for the cloud application needing redundancy according to the information about the source network.

1506: Determine information about a home network of the backup virtual machine according to the information about the source virtual machine and the information about the backup network.

1507: Acquire the second description information according to the information about the backup network, the identifier and specifications of the backup virtual machine, the information about the second storage unit, and the information about the home network of the backup virtual machine.

1508: Register the second description information with the cloud management module at the redundancy site.

The redundancy management module at the redundancy site directly registers the second description information with the cloud management module at the redundancy site, so that the cloud management module at the redundancy site recovers the cloud application needing redundancy at the redundancy site according to the second description information.

The specific implementation manners of steps 1502 to 1507 in the embodiment of the present invention are similar to those of steps 502 to 507, and details are not repeatedly described herein.

In the embodiment of the present invention, the redundancy management module at the redundancy site is capable of acquiring first description information of a cloud application needing redundancy, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, information about a backup network used at the redundancy site by the cloud application needing redundancy and information about a backup virtual machine used at the redundancy site by the cloud application needing redundancy can be configured for the cloud application needing redundancy, that is, second description information of the cloud application needing redundancy at the redundancy site can be generated, where the second description information gives an overall description about the deployment of the cloud application needing redundancy at the redundancy site; and the redundancy management module at the redundancy site registers the second description information with the cloud management module at the redundancy site, so that the cloud management module at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Recovery Processes in Specific Embodiments 4 to 7

Figure 16:
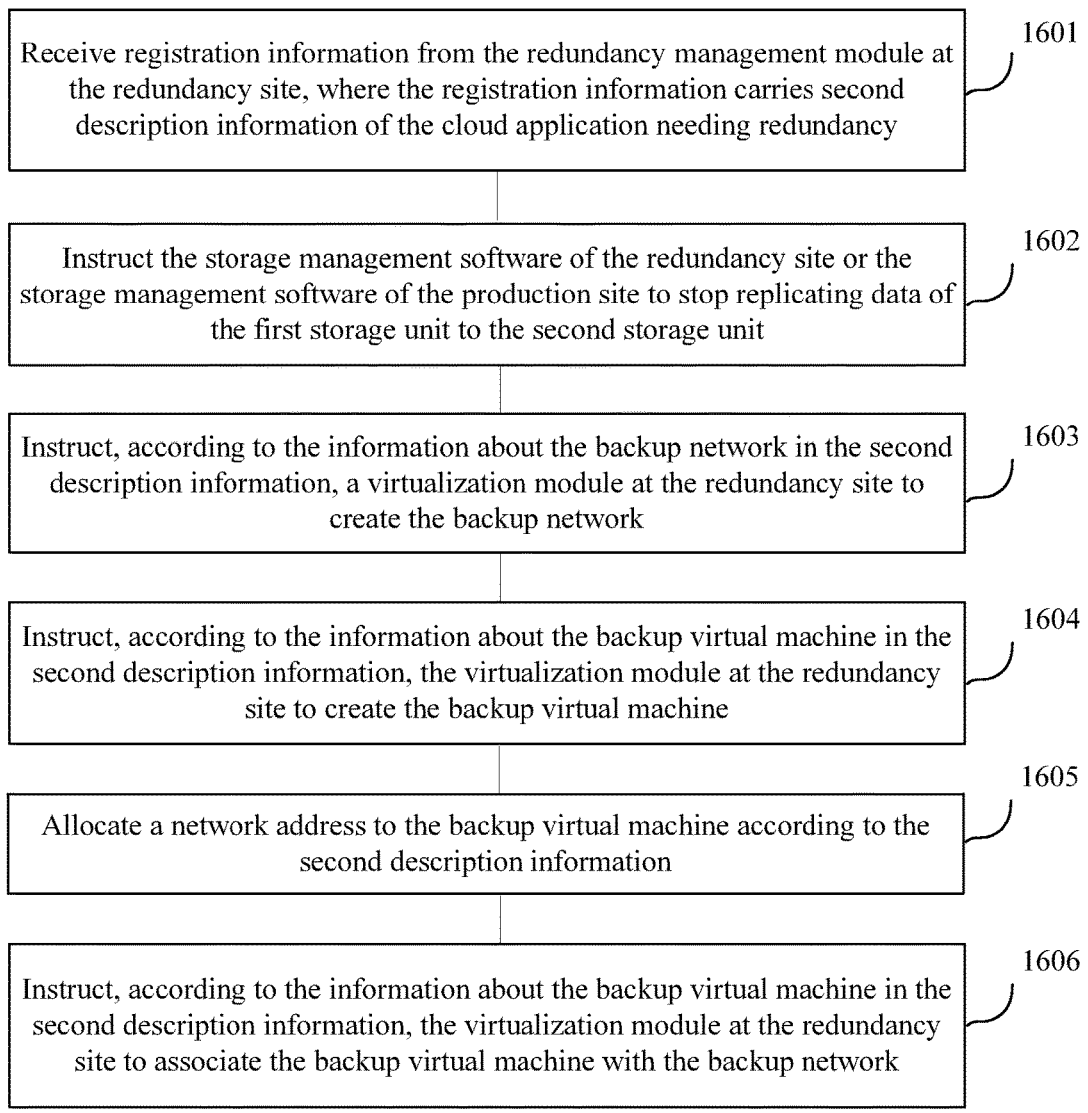
FIG. 16 is a flowchart of another redundancy method provided by an embodiment of the present invention.

With reference to the system architecture shown in FIG. 1C and as shown in FIG. 16, a redundancy method in the embodiment of the present invention is used to recover a cloud application needing redundancy of the production site at the redundancy site when a redundancy incident occurs at the production site. The method may be executed by the cloud management module at the redundancy site. The method may include:

1601: Receive registration information from the redundancy management module at the redundancy site, where the registration information carries second description information of the cloud application needing redundancy.

The cloud management module at the redundancy site may receive the registration information from the redundancy management module at the redundancy site, and acquire the second description information of the cloud application needing redundancy carried in the registration information, where the second description information includes information about a backup network used at the redundancy site by the cloud application needing redundancy and information about a backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

Further, the information about the home network of the backup virtual machine may include an association between a virtual network adapter of the backup virtual machine and the backup network, or a network address of the virtual network adapter of the backup virtual machine.

1602: Instruct the storage management software of the redundancy site or the storage management software of the production site to stop replicating data of the first storage unit to the second storage unit.

Step 1602 is an optional step. Step 1602 may be performed before step 1601, or may be performed after step 1601, which is not limited in the embodiment of the present invention.

1603: Instruct, according to the information about the backup network in the second description information, a virtualization module at the redundancy site to create the backup network.

1604: Instruct, according to the information about the backup virtual machine in the second description information, the virtualization module at the redundancy site to create the backup virtual machine.

1605: Allocate a network address to the backup virtual machine according to the second description information.

1606: Instruct, according to the information about the backup virtual machine in the second description information, the virtualization module at the redundancy site to associate the backup virtual machine with the backup network.

The specific implementation manners of steps 1602 to 1606 in the embodiment of the present invention are similar to those of steps 702 to 706, and details are not repeatedly described herein.

In the embodiment of the present invention, the cloud management module at the redundancy site can acquire second description information of a cloud application needing redundancy from the redundancy management module at the redundancy site, where the second description information gives an overall description about the deployment of the cloud application needing redundancy at the redundancy site; and after acquiring the second description information, the cloud management module at the redundancy site can instruct, according to the information about the backup network in the second description information, the virtualization module at the redundancy site to create the backup network; instruct, according to the identifier and specifications of the backup virtual machine in the second description information and the information about the second storage unit, the virtualization module at the redundancy site to create the backup virtual machine; associate the backup virtual machine with the backup network according to the information about the home network of the backup virtual machine in the second description information; and completely and rapidly recover the cloud application needing redundancy at the redundancy site, thereby implementing redundancy based on a cloud application. Different from a manner of redundancy based on a virtual machine granularity in the prior art, the embodiment of the present invention implements redundancy at an application level, and avoids a possible problem, which is caused by the redundancy based on a virtual machine granularity, that a cloud application cannot be completely and rapidly recovered.

Redundancy Apparatus

Figure 17:
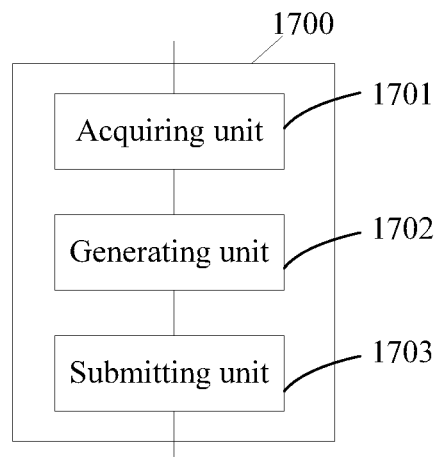
FIG. 17 is a composition diagram of a redundancy apparatus provided by an embodiment of the present invention.

With reference to the system architecture shown in FIG. 1A, or FIG. 1B, or FIG. 1C and as shown in FIG. 17, a redundancy apparatus 1700 in an embodiment of the present invention is used to configure a cloud application needing redundancy of the production site at the redundancy site, so as to recover the cloud application needing redundancy at the redundancy site according to configuration information when a redundancy incident occurs at the production site. The apparatus may be the cloud management module at the production site shown in FIG. 1B, or may be the redundancy management module shown in FIG. 1A, or may be the redundancy management module at the production site or the redundancy management module at the redundancy site shown in FIG. 1C. The apparatus may include an acquiring unit 1701 configured to acquire first description information of a cloud application needing redundancy, where the first description information includes information about a source network used at the production site by the cloud application needing redundancy and information about a source virtual machine used at the production site by the cloud application needing redundancy; a generating unit 1702 configured to generate second description information of the cloud application needing redundancy according to the first description information acquired by the acquiring unit 1701, where the second description information includes information about a backup network used at the redundancy site by the cloud application needing redundancy and information about a backup virtual machine used at the redundancy site by the cloud application needing redundancy; and a submitting unit 1703 configured to provide, for the redundancy site, the second description information generated by the generating unit 1702, so that the redundancy site recovers the cloud application needing redundancy according to the second description information.

In the embodiment of the present invention, the acquiring unit 1701 is capable of acquiring first description information of a cloud application needing redundancy, where the first description information not only includes information about a source virtual machine used at a production site by the cloud application needing redundancy, but also includes information about a source network used at the production site by the cloud application needing redundancy; the generating unit 1702 can generate, based on the first description information that gives an overall description about the cloud application needing redundancy, second description information of the cloud application needing redundancy at a redundancy site, where the second description information can also give an overall description about the deployment of the cloud application needing redundancy at the redundancy site; and the submitting unit 1703 is capable of providing the second description information for the redundancy site, so that the redundancy site can recover the cloud application needing redundancy completely at the redundancy site after acquiring the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 18:
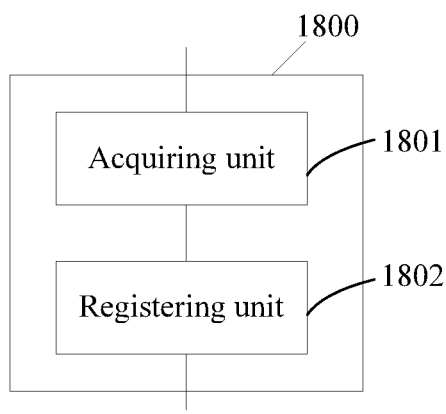
FIG. 18 is a composition diagram of another redundancy apparatus provided by an embodiment of the present invention.

With reference to the system architecture shown in FIG. 1C and as shown in FIG. 18, a redundancy apparatus 1800 in an embodiment of the present invention is used to acquire configuration information of a cloud application needing redundancy of the production site at the redundancy site, so as to recover the cloud application needing redundancy at the redundancy site according to configuration information when a redundancy incident occurs at the production site. The apparatus may be the redundancy management module at the redundancy site. The apparatus includes an acquiring unit 1801 configured to acquire second description information of a cloud application needing redundancy, where the second description information includes information about a backup network used at the redundancy site by the cloud application needing redundancy and information about a backup virtual machine used at the redundancy site by the cloud application needing redundancy; and a registering unit 1802 configured to register the second description information acquired by the acquiring unit 1801 with the cloud management module at the redundancy site, so that the cloud management module at the redundancy site recovers the cloud application needing redundancy according to the second description information.

In the embodiment of the present invention, the acquiring unit 1801 can acquire second description information of a cloud application needing redundancy, where the second description information gives an overall description about the deployment of the cloud application needing redundancy at a redundancy site; and the registering unit 1802 can register the second description information with a redundancy management module at the redundancy site, so that the redundancy management module at the redundancy site can completely and rapidly recover the cloud application needing redundancy at the redundancy site according to the second description information, thereby implementing redundancy based on a cloud application. Different from a manner of redundancy based on a virtual machine granularity in the prior art, the embodiments of the present invention implements configuration and recovery for redundancy at an application level, and avoids a possible problem, which is caused by the redundancy based on a virtual machine granularity, that a cloud application cannot be completely and rapidly recovered.

Figure 19:
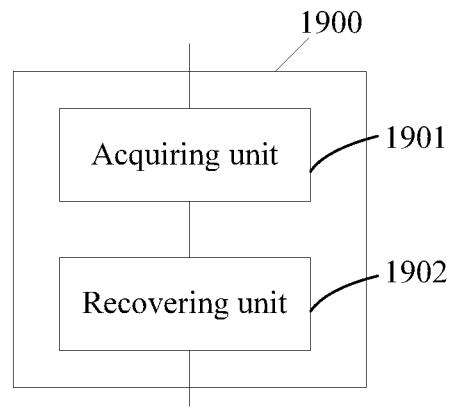
FIG. 19 is a composition diagram of another redundancy apparatus provided by an embodiment of the present invention.

With reference to the system architecture shown in FIG. 1A, or FIG. 1B, or FIG. 1C and as shown in FIG. 19, a redundancy apparatus 1900 in an embodiment of the present invention is used to recover a cloud application needing redundancy of the production site at the redundancy site. The apparatus may be the cloud management module at the redundancy site. The apparatus includes an acquiring unit 1901 configured to acquire second description information of a cloud application needing redundancy, where the second description information includes information about a backup network used at the redundancy site by the cloud application needing redundancy and information about a backup virtual machine used at the redundancy site by the cloud application needing redundancy; and a recovering unit 1902 configured to recover the cloud application needing redundancy at the redundancy site according to the second description information acquired by the acquiring unit 1901.

In the embodiment of the present invention, the acquiring unit 1901 can acquire second description information of a cloud application needing redundancy from the cloud management module at the production site shown in FIG. 1B, or the redundancy management module shown in FIG. 1A, or the redundancy management module at the production site shown in FIG. 1C, where the second description information gives an overall description about the deployment of the cloud application needing redundancy at the redundancy site; and the recovering unit 1902 can completely and rapidly recover the cloud application needing redundancy at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

Figure 20:
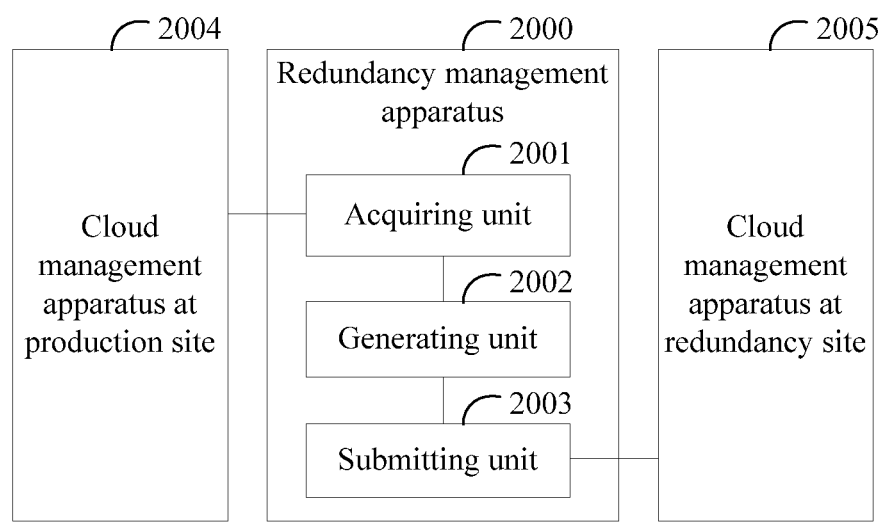
FIG. 20 is a composition diagram of a system provided by an embodiment of the present invention.

A system shown in FIG. 20 includes a cloud management apparatus 2004 at a production site, a redundancy management apparatus 2000, and a cloud management apparatus 2005 at a redundancy site, where the apparatus is the redundancy management apparatus 2000. The redundancy management apparatus 2000 includes an acquiring unit 2001, a generating unit 2002, and a submitting unit 2003; and the apparatus may be used to configure a cloud application needing redundancy of the production site at the redundancy site, so as to recover the cloud application needing redundancy at the redundancy site according to configuration information when a redundancy incident occurs at the production site.

The acquiring unit 2001 is configured to acquire first description information of a cloud application needing redundancy from the cloud management apparatus 2004 at the production site, where the first description information includes information about a source network used at the production site by the cloud application needing redundancy and information about a source virtual machine used at the production site by the cloud application needing redundancy; and the information about the source virtual machine includes an identifier and specifications of the source virtual machine, information about a first storage unit occupied at the production site by the source virtual machine, and information about a home network of the source virtual machine, where the information about the home network of the source virtual machine includes a network address of the source virtual machine or an association between a virtual network adapter of the source virtual machine and the source network.

There may be two methods for acquiring the first description information of the cloud application needing redundancy: 1) In a first method, the acquiring unit 2001 queries, using an interface connected to the cloud management apparatus at the production site, for the first description information of the cloud application needing redundancy from the cloud management apparatus at the production site, where the cloud management apparatus at the production site may collect, after the virtual machine of the cloud application is deployed, static description information and dynamic description information of a running instance of the cloud application to generate the first description information. 2) In a second method, the acquiring unit 2001 queries, from the cloud management apparatus at the production site using an interface connected to the cloud management apparatus at the production site, for the identifier and specifications of the source virtual machine used at the production site by the cloud application needing redundancy, the information about the first storage unit occupied at the production site by the source virtual machine, and the network address of the source virtual machine, and generates the first description information.

The generating unit 2002 is configured to configure, for the cloud application needing redundancy according to the first description information acquired by the acquiring unit 2001, information about a backup network used at the redundancy site and information about a backup virtual machine used at the redundancy site, that is, generate second description information of the cloud application needing redundancy, where the second description information includes the information about the backup network used at the redundancy site by the cloud application needing redundancy and the information about the backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

Then, the generating unit 2002 is configured to determine the identifier and the specifications of the backup virtual machine according to the identifier and the specifications of the source virtual machine; determine the information about the second storage unit according to the information about the first storage unit; configure the information about the backup network for the cloud application needing redundancy according to the information about the source network; and determine the information about the home network of the backup virtual machine according to the identifier of the backup virtual machine and the information about the home network of the source virtual machine, where the information about the home network of the backup virtual machine may include an association between a virtual network adapter of the backup virtual machine and the backup network or a network address of the backup virtual machine.

The generating unit 2002 may be further configured to create a replication relationship between the first storage unit and the second storage unit, and configure the replication relationship for storage management software of the production site and storage management software of the redundancy site, so that the storage management software of the production site and the storage management software of the redundancy site can replicate data of the first storage unit to the second storage unit according to the replication relationship between the first storage unit and the second storage unit and a set replication cycle and replication manner, where the replication relationship between the first storage unit and the second storage unit may be determined according to specification of a user.

The submitting unit 2003 is configured to register the second description information generated by the generating unit 2002 with the cloud management apparatus 2005 at the redundancy site, so that the cloud management apparatus 2005 at the redundancy site can recover the cloud application needing redundancy at the redundancy site according to the second description information.

In the embodiment of the present invention, the acquiring unit 2001 is capable of acquiring first description information of a cloud application needing redundancy from the cloud management apparatus at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the generating unit 2002 can configure, for the cloud application needing redundancy, information about a backup network used at the redundancy site and information about a backup virtual machine used at the redundancy site, that is, generate second description information of the cloud application needing redundancy at the redundancy site, where the second description information gives an overall description about the deployment of the cloud application needing redundancy at the redundancy site; and the submitting unit 2003 can register the second description information with the cloud management apparatus at the redundancy site, so that the cloud management apparatus at the redundancy site can completely and rapidly recover the cloud application needing redundancy at the redundancy site according to the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 21:
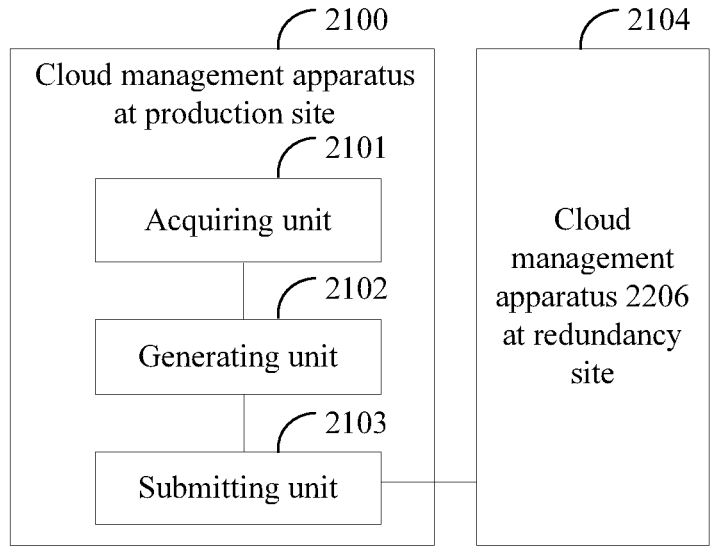
FIG. 21 is a composition diagram of another system provided by an embodiment of the present invention.

A system shown in FIG. 21 includes a cloud management apparatus 2100 at a production site and a cloud management apparatus 2104 at a redundancy site, where the cloud management apparatus 2100 at the production site includes an acquiring unit 2101, a generating unit 2102, and a submitting unit 2103; and the apparatus may be used to configure a cloud application needing redundancy of the production site at the redundancy site, so as to recover the cloud application needing redundancy at the redundancy site according to configuration information when a redundancy incident occurs at the production site.

The acquiring unit 2101 is configured to acquire first description information of a cloud application needing redundancy, where the first description information includes information about a source network used at the production site by the cloud application needing redundancy and information about a source virtual machine used at the production site by the cloud application needing redundancy. The information about the source virtual machine includes an identifier and specifications of the source virtual machine, information about a first storage unit occupied at the production site by the source virtual machine, and information about a home network of the source virtual machine. Further, the information about the home network of the source virtual machine includes a network address of the source virtual machine or an association between a virtual network adapter of the source virtual machine and the source network.

There may be two methods for the acquiring unit 2101 to acquire the first description information of the cloud application needing redundancy, which are 1) In a first method, the acquiring unit 2101 directly acquires the first description information, which is recorded by the cloud management apparatus at the production site, of the cloud application needing redundancy, where the cloud management apparatus at the production site may collect, after the virtual machine of the cloud application is deployed, static description information and dynamic description information of a running instance of the cloud application to generate the first description information. 2) In a second method, the acquiring unit 2101 generates the first description information according to the identifier and specifications of the source virtual machine used at the production site by the cloud application needing redundancy, the information about the first storage unit occupied at the production site by the source virtual machine, and the network address of the source virtual machine, where the foregoing information is recorded by the cloud management apparatus at the production site.

The generating unit 2102 is configured to configure, for the cloud application needing redundancy according to the first description information acquired by the acquiring unit 2101, information about a backup network used at the redundancy site and information about a backup virtual machine used at the redundancy site, that is, generate second description information of the cloud application needing redundancy, where the second description information includes the information about the backup network used at the redundancy site by the cloud application needing redundancy and the information about the backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine. Then, the generating unit 2102 is configured to determine the identifier and the specifications of the backup virtual machine according to the identifier and the specifications of the source virtual machine; determine the information about the second storage unit according to the information about the first storage unit; configure the information about the backup network for the cloud application needing redundancy according to the information about the source network; and determine the information about the home network of the backup virtual machine according to the identifier of the backup virtual machine and the information about the home network of the source virtual machine, where the information about the home network of the backup virtual machine may include an association between a virtual network adapter of the backup virtual machine and the backup network or a network address of the backup virtual machine.

The generating unit 2102 may be further configured to create a replication relationship between the first storage unit and the second storage unit, and configure the replication relationship for storage management software of the production site and storage management software of the redundancy site, so that the storage management software of the production site and the storage management software of the redundancy site can replicate data of the first storage unit to the second storage unit according to the replication relationship between the first storage unit and the second storage unit and a set replication cycle and replication manner, where the replication relationship between the first storage unit and the second storage unit may be determined according to specification of a user.

The submitting unit 2103 is configured to register the second description information generated by the generating unit 2102 with the cloud management apparatus 2104 at the redundancy site, so that the cloud management apparatus 2104 at the redundancy site can recover the cloud application needing redundancy at the redundancy site according to the second description information.

In the embodiment of the present invention, the acquiring unit 2101 is capable of acquiring first description information of a cloud application needing redundancy, where the first description information not only includes information about a source virtual machine used at a production site by the cloud application needing redundancy, but also includes information about a source network used at the production site by the cloud application needing redundancy; based on the first description information that gives an overall description about the cloud application needing redundancy, the generating unit 2102 can configure, for the cloud application needing redundancy, information about a backup network used at a redundancy site and information about a backup virtual machine used at the redundancy site, that is, generate second description information of the cloud application needing redundancy at the redundancy site, where the second description information gives an overall description about the deployment of the cloud application needing redundancy at the redundancy site; and the submitting unit 2103 can register the second description information with the cloud management apparatus at the redundancy site, so that the cloud management apparatus at the redundancy site can completely and rapidly recover the cloud application needing redundancy at the redundancy site according to the second description information, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 22:
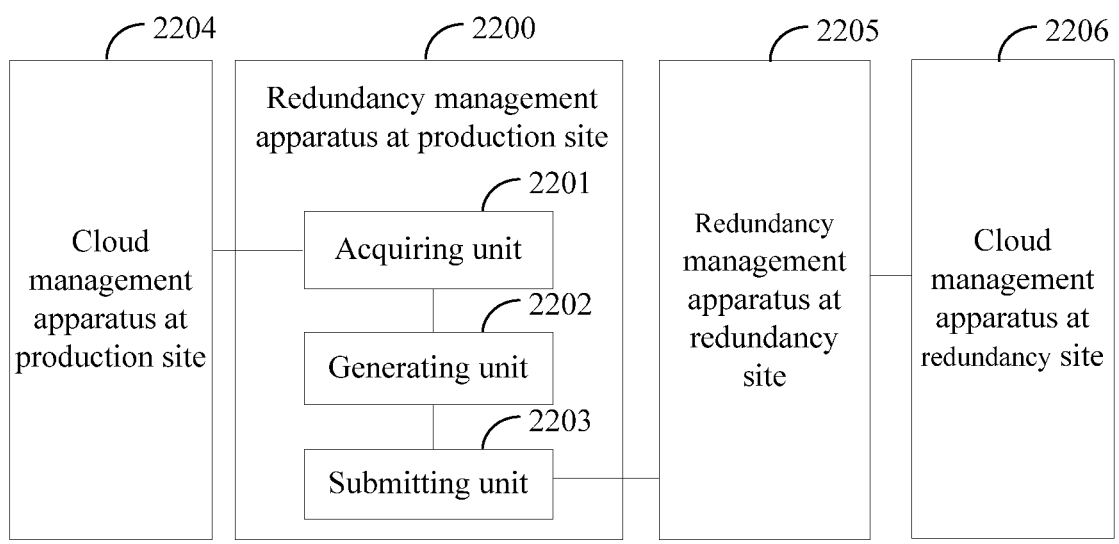
FIG. 22 is a composition diagram of another system provided by an embodiment of the present invention.

A system shown in FIG. 22 includes a redundancy management apparatus 2200 at a production site, a cloud management apparatus 2204 at the production site, a redundancy management apparatus 2205 at a redundancy site, and a cloud management apparatus 2206 at the redundancy site, where the redundancy management apparatus 2205 at the production site may include an acquiring unit 2201, a generating unit 2202, and a submitting unit 2203; and the apparatus may be used to configure a cloud application needing redundancy of the production site at the redundancy site, so as to recover the cloud application needing redundancy at the redundancy site according to configuration information when a redundancy incident occurs at the production site.

Further, the acquiring unit 2201 is configured to acquire first description information of a cloud application needing redundancy from the cloud management apparatus 2204 at the production site, where the first description information includes information about a source network used at the production site by the cloud application needing redundancy and information about a source virtual machine used at the production site by the cloud application needing redundancy. The information about the source virtual machine includes an identifier and specifications of the source virtual machine, information about a first storage unit occupied at the production site by the source virtual machine, and information about a home network of the source virtual machine. Further, the information about the home network of the source virtual machine includes a network address of the source virtual machine or an association between a virtual network adapter of the source virtual machine and the source network.

There may be two methods for the acquiring unit 2201 to acquire the first description information of the cloud application needing redundancy. In a first method, the acquiring unit 2201 directly acquires the first description information of the cloud application needing redundancy from the cloud management apparatus 2204 at the production site, where the cloud management apparatus at the production site may collect, after the virtual machine of the cloud application is deployed, static description information and dynamic description information of a running instance of the cloud application to generate the cloud management apparatus. In a second method, the acquiring unit 2201 generates the first description information according to the identifier and specifications of the source virtual machine used at the production site by the cloud application needing redundancy, the information about the first storage unit occupied at the production site by the source virtual machine, and the network address of the source virtual machine, where the foregoing information is recorded by the cloud management apparatus 2204 at the production site.

The generating unit 2202 is configured to configure, for the cloud application needing redundancy according to the first description information acquired by the acquiring unit 2201, information about a backup network used at the redundancy site and information about a backup virtual machine used at the redundancy site, that is, generate second description information of the cloud application needing redundancy, where the second description information includes the information about the backup network used at the redundancy site by the cloud application needing redundancy and the information about the backup virtual machine used at the redundancy site by the cloud application needing redundancy; and the information about the backup virtual machine used at the redundancy site by the cloud application needing redundancy includes an identifier and specifications of the backup virtual machine, information about a second storage unit occupied at the redundancy site by the backup virtual machine, and information about a home network of the backup virtual machine.

Then, the generating unit 2202 is configured to determine the identifier and the specifications of the backup virtual machine according to the identifier and the specifications of the source virtual machine; determine the information about the second storage unit according to the information about the first storage unit; configure the information about the backup network for the cloud application needing redundancy according to the information about the source network; and determine the information about the home network of the backup virtual machine according to the identifier of the backup virtual machine and the information about the home network of the source virtual machine, where the information about the home network of the backup virtual machine may include an association between a virtual network adapter of the backup virtual machine and the backup network or a network address of the backup virtual machine.

The submitting unit 2203 is configured to send the second description information generated by the generating unit 2202 to the redundancy management apparatus 2205 at the redundancy site, so that the redundancy management apparatus 2205 at the redundancy site can recover the cloud application needing redundancy at the redundancy site according to the second description information.

Additionally, the generating unit 2202 may be further configured to create a replication relationship between the first storage unit and the second storage unit, and configure the replication relationship for storage management software of the production site and storage management software of the redundancy site, so that the storage management software of the production site and the storage management software of the redundancy site can replicate data of the first storage unit to the second storage unit according to the replication relationship between the first storage unit and the second storage unit and a set replication cycle and replication manner, where the replication relationship between the first storage unit and the second storage unit may be determined according to specification of a user.

In the embodiment of the present invention, the acquiring unit 2201 is capable of acquiring first description information of a cloud application needing redundancy from the cloud management apparatus 2204 at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the generating unit 2202 can configure, for the cloud application needing redundancy, information about a backup network used at the redundancy site and information about a backup virtual machine used at the redundancy site, that is, generate second description information of the cloud application needing redundancy at the redundancy site, where the second description information gives an overall description about the deployment of the cloud application needing redundancy at the redundancy site; and the submitting unit 2203 can send the second description information to the redundancy management apparatus 2205 at the redundancy site, so that the redundancy management apparatus at the redundancy site can provide the second description information for the redundancy site, to completely and rapidly recover the cloud application needing redundancy, thereby implementing redundancy based on a cloud application. Different from a manner of redundancy based on a virtual machine granularity in the prior art, the embodiment of the present invention implements configuration for redundancy at an application level, and avoids a possible problem, which is caused by the redundancy based on a virtual machine granularity, that a cloud application cannot be completely and rapidly recovered.

Figure 23:
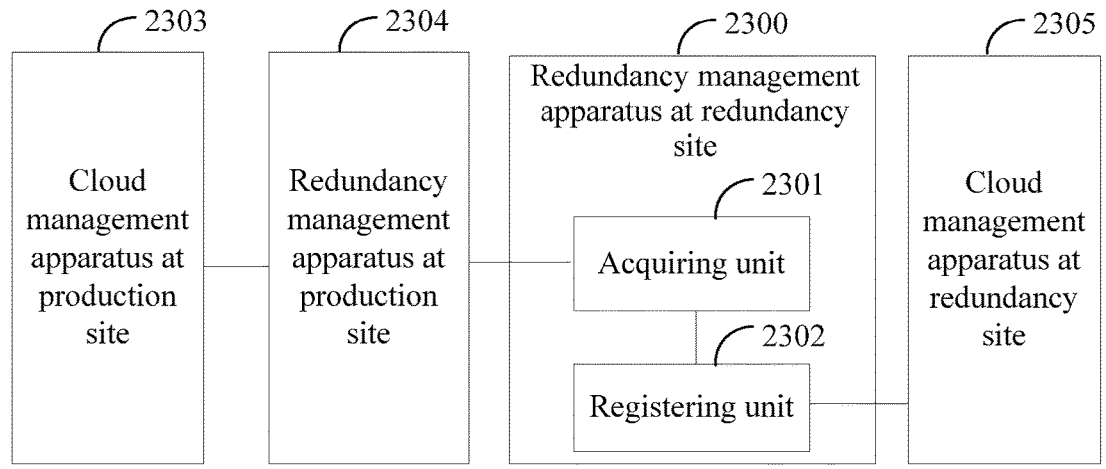
FIG. 23 is a composition diagram of another system provided by an embodiment of the present invention.

A system shown in FIG. 23 includes a redundancy management apparatus 2304 at a production site, a cloud management apparatus 2303 at the production site, a redundancy management apparatus 2300 at a redundancy site, and a cloud management apparatus 2305 at the redundancy site, where the redundancy management apparatus 2300 may include an acquiring unit 2301 and a registering unit 2302; and the apparatus may be used to configure a cloud application needing redundancy of the production site at the redundancy site, so as to recover the cloud application needing redundancy at the redundancy site according to configuration information when a redundancy incident occurs at the production site.

Further, the acquiring unit 2301 is configured to acquire second description information of a cloud application needing redundancy, where the second description information includes information about a backup network used at the redundancy site by the cloud application needing redundancy and information about a backup virtual machine used at the redundancy site by the cloud application needing redundancy; the information about the backup virtual machine includes an identifier and specifications of the backup virtual machine, information about a second storage unit occupied at the redundancy site by the backup virtual machine, and information about a home network of the backup virtual machine; and further, the information about the home network of the backup virtual machine includes a network address of the backup virtual machine or an association between a virtual network adapter of the backup virtual machine and the backup network.

The acquiring unit 2301 may receive the second description information of the cloud application needing redundancy sent by the redundancy management apparatus 2304 at the production site, and may also receive first description information sent by the redundancy management apparatus 2304 at the production site, and generate the second description information according to the first description information, where the first description information includes information about a source network used at the production site by the cloud application needing redundancy and information about a source virtual machine used at the production site by the cloud application needing redundancy; and the information about the source virtual machine includes an identifier and specifications of the source virtual machine, information about a first storage unit occupied at the production site by the source virtual machine, and information about a home network of the source virtual machine. Then, the generating the second description information according to the first description information includes determining the identifier and the specifications of the backup virtual machine according to the identifier and the specifications of the source virtual machine; determining, according to the information about the first storage unit, the information about the second storage unit occupied at the redundancy site by the backup virtual machine; configuring the information about the backup network for the cloud application needing redundancy according to the information about the source network; and determining the information about the home network of the backup virtual machine according to the information about the backup network, the identifier of the backup virtual machine, and the information about the home network of the source virtual machine.

The information about the home network of the source virtual machine may include a network address of the source virtual machine or an association between a virtual network adapter of the source virtual machine and the source network.

The registering unit 2302 is configured to register the second description information acquired by the acquiring unit 2301 with the cloud management apparatus 2305 at the redundancy site, so that the cloud management apparatus 2305 at the redundancy site recovers the cloud application needing redundancy at the redundancy site according to the second description information.

In the embodiment of the present invention, the acquiring unit 2301 is capable of acquiring second description information of a cloud application needing redundancy, where the second description information gives an overall description about the deployment of the cloud application needing redundancy at a redundancy site; and the redundancy management apparatus at the redundancy site can register the second description information with the cloud management apparatus 2305 at the redundancy site, so that cloud management apparatus 2305 at the redundancy site can completely and rapidly recover the cloud application needing redundancy at the redundancy site according to the second description information, thereby implementing redundancy based on a cloud application. Different from a manner of redundancy based on a virtual machine granularity in the prior art, the embodiments of the present invention implements configuration for redundancy at an application level, and avoids a possible problem, which is caused by the redundancy based on a virtual machine granularity, that a cloud application cannot be completely and rapidly recovered.

Figure 24:
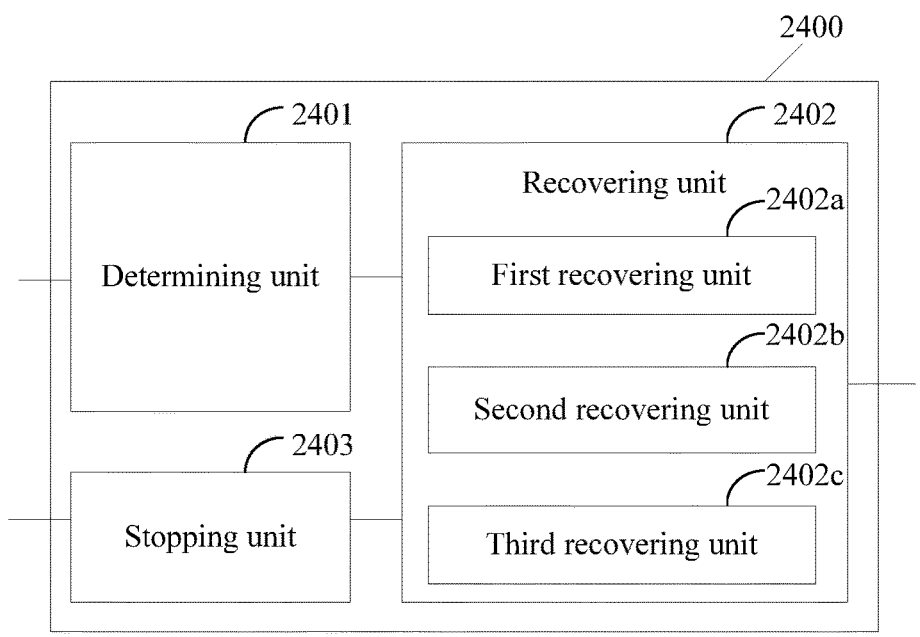
FIG. 24 is a composition diagram of another redundancy apparatus provided by an embodiment of the present invention.

With reference to the system architecture shown in FIG. 1A, or FIG. 1B, or FIG. 1C and as shown in FIG. 24, a redundancy apparatus 2400 in an embodiment of the present invention is used to recover a cloud application needing redundancy of the production site at the redundancy site. The apparatus may include a determining unit 2401 and a recovering unit 2402.

The determining unit 2401 is configured to acquire second description information of a cloud application needing redundancy, where the second description information comprises information about a backup network used at the redundancy site by the cloud application needing redundancy and information about a backup virtual machine used at the redundancy site by the cloud application needing redundancy; and the information about the backup virtual machine includes an identifier and specifications of the backup virtual machine, information about a second storage unit occupied at the redundancy site by the backup virtual machine, and information about a home network of the backup virtual machine. For example, second description information of APP1 may be shown in Table 2. Further, the information about the home network of the backup virtual machine may include an association between a virtual network adapter of the backup virtual machine and the backup network, or a network address of the virtual network adapter of the backup virtual machine. There may be two methods for the determining unit 2401 to acquire the second description information of the cloud application needing redundancy:

1) A First Method,

In the system architecture shown in FIG. 1B, the determining unit 2401 is configured to receive registration information from the cloud management module at the production site, and acquire the second description information of the cloud application needing redundancy carried in the registration information.

In the system architecture shown in FIG. 1A, the determining unit 2401 is configured to receive registration information from the redundancy management module, and acquire the second description information of the cloud application needing redundancy carried in the registration information.

In the system architecture shown in FIG. 1C, the determining unit 2401 is configured to receive registration information from the redundancy management module at the redundancy site, and acquire the second description information of the cloud application needing redundancy carried in the registration information.

2) A Second Method,

In the system architecture shown in FIG. 1A, or FIG. 1B, or FIG. 1C, the determining unit 2401 acquires first description information of the cloud application needing redundancy, and generates the second description information according to the first description information, where the first description information includes information about a source network used at the production site by the cloud application needing redundancy and information about a source virtual machine used at the production site by the cloud application needing redundancy; the information about the source virtual machine includes the identifier and specifications of the source virtual machine used at the production site by the cloud application needing redundancy, the information about the first storage unit occupied at the production site by the source virtual machine, and the information about the home network of the source virtual machine; and the information about the home network of the source virtual machine includes the network address of the source virtual machine, or the association between the virtual network adapter of the source virtual machine and the source network.

The recovering unit 2402 is configured to recover the cloud application needing redundancy at the redundancy site according to the second description information acquired by the determining unit 2401. The recovering unit 2402 includes a first recovering unit 2402a, a second recovering unit 2402b, and a third recovering unit 2402c, where the first recovering unit 2402a is configured to instruct, according to the information about the backup network, the virtualization module at the redundancy site to create the backup network; the second recovering unit 2402b is configured to instruct, according to the identifier and specifications of the backup virtual machine and the information about the second storage unit, the virtualization module at the redundancy site to create the backup virtual machine; and the third recovering unit 2402c is configured to instruct, according to the information about the home network of the backup virtual machine, the virtualization module at the redundancy site to associate the backup virtual machine with the backup network.

Further, after the determining unit 2401 acquires the second description information, the first recovering unit 2402a may send a virtualized network creating command to the virtualization module at the redundancy site, where the virtualized network creating command carries the information about the backup network, so that the virtualization module at the redundancy site determines, according to the virtualized network creating command, a virtual switch used by the cloud application needing redundancy, and configures the information about the backup network for a port group of the virtual switch. Further, the cloud management module at the redundancy site sends the virtualized network creating command to the virtualization module at the redundancy site, where the virtualized network creating command carries the information about the backup network and the information about the second storage unit; and after receiving the virtualized network creating command, the virtualization module determines, according to the information about the second storage unit, the virtual switch used at the redundancy site by the cloud application needing redundancy, specifies or creates a port group of the virtual switch according to the information about the backup network, creates a correspondence between the backup network and the port group of the virtual switch, and then configures the information about the backup network for the port group of the virtual switch according to the correspondence between the backup network and the port group of the virtual switch, so that the backup network is recovered. After the virtualization module creates the backup network, the first recovering unit 2402a is further configured to acquire, from the virtualization module at the redundancy site, the correspondence between the backup network and the port group of the virtual switch, and record a correspondence between the information about the backup network and the port group of the virtual switch.

That after the determining unit 2401 acquires the second description information, the second recovering unit 2402b may instruct, according to the identifier and the specifications of the backup virtual machine and the information about the second storage unit in the second description information, the virtualization module at the redundancy site to create the backup virtual machine, includes sending a command for creating a virtual machine to the virtualization module at the redundancy site, where the command for creating a virtual machine carries the identifier and the specifications of the backup virtual machine and the information about the second storage unit, and instructing the virtualization module at the redundancy site to create the backup virtual machine and the virtual network adapter of the backup virtual machine according to the foregoing information.

That after the first recovering unit 2402a creates the backup network and the second recovering unit 2402b creates the backup virtual machine, the third recovering unit 2402c may instruct, according to the information about the home network of the backup virtual machine, the virtualization module at the redundancy site to associate the virtual network adapter of the backup virtual machine with the virtual switch, includes that the third recovering unit 2402c may acquire the association between the virtual network adapter of the backup virtual machine and the backup network according to the information about the home network of the backup virtual machine, where the acquiring the association between the virtual network adapter of the backup virtual machine and the backup network may be directly acquiring the association between the virtual network adapter of the backup virtual machine and the backup network from the information about the home network of the backup virtual machine, or determining the association between the virtual network adapter of the backup virtual machine and the backup network according to the network address of the backup virtual machine and the information about the backup network which are in the information about the home network of the backup virtual machine; the third recovering unit 2402c may acquire the correspondence between the information about the backup network and the port group of the virtual switch from the first recovering unit 2402a, and determine the correspondence between the virtual network adapter of the backup virtual machine and the port group of the virtual switch according to the association between the virtual network adapter of the backup virtual machine and the backup network and the correspondence between the information about the backup network and the port group of the virtual switch; and the third recovering unit 2402c instructs, according to the correspondence between the virtual network adapter of the backup virtual machine and the port group of the virtual switch, the virtualization module to associate the virtual network adapter of the backup virtual machine with the port group of the virtual switch, so that the backup virtual machine can use, according to the network address of the backup virtual machine, the port group of the virtual switch correspondingly associated with the virtual network adapter of the backup virtual machine and the backup network for data transmission.

Further, the apparatus may include a stopping unit 2403 configured to, before the recovering unit 2402 recovers the cloud application needing redundancy at the redundancy site, configure storage management software of the redundancy site or storage management software of the production site, so as to stop the redundancy site from replicating data of the first storage unit to the second storage unit, thereby avoiding that after the redundancy, data is overwritten because the second storage unit continues to acquire the data of the first storage unit by means of replication, and ensuring reliable recovery of the cloud application needing redundancy.

In the embodiment of the present invention, the determining unit 2401 can acquire second description information of a cloud application needing redundancy, where the second description information gives an overall description about the deployment of the cloud application needing redundancy at a redundancy site; and after the determining unit 2401 acquires the second description information, the recovering unit 2402 may instruct, according to the information about the backup network in the second description information, the virtualization module at the redundancy site to create the backup network; instruct, according to the identifier and specifications of the backup virtual machine in the second description information and the information about the second storage unit, the virtualization module at the redundancy site to create the backup virtual machine; and associate the backup virtual machine with the backup network according to the information about the home network of the backup virtual machine in the second description information, thereby implementing redundancy based on a cloud application. Different from a manner of redundancy based on a virtual machine granularity in the prior art, the embodiment of the present invention implements redundancy at an application level, and avoids a possible problem, which is caused by the redundancy based on a virtual machine granularity, that a cloud application cannot be completely and rapidly recovered.

A redundancy system provided in an embodiment of the present invention is used to configure a cloud application needing redundancy of a production site at a redundancy site, so as to recover the cloud application needing redundancy at the redundancy site according to configuration information when a redundancy incident occurs at the production site. As shown in FIG. 1A, the system includes the cloud management module 105 at the production site, the redundancy management module 120, and the cloud management module 115 at the redundancy site.

The cloud management module 105 at the production site is configured to record first description information of a cloud application needing redundancy, where the first description information includes information about a source network used at the production site by the cloud application needing redundancy and information about a source virtual machine used at the production site by the cloud application needing redundancy.

The redundancy management module 120 is configured to acquire the first description information from the cloud management module at the production site; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and register the second description information with the cloud management module 115 at the redundancy site.

The cloud management module 115 at the redundancy site is configured to receive registration information, where the registration information carries the second description information; and recover the cloud application needing redundancy at the redundancy site according to the second description information.

In the embodiment of the present invention, the redundancy management module 120 may acquire the first description information from the cloud management module 105 at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the second description information of the cloud application needing redundancy at the redundancy site can be generated, where the second description information can also give an overall description about the deployment of the cloud application needing redundancy at the redundancy site; the redundancy management module 120 can send the second description information to the cloud management module 115 at the redundancy site; and after acquiring the second description information, the cloud management module 115 at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

A redundancy system provided in an embodiment of the present invention is used to configure a cloud application needing redundancy of a production site at a redundancy site, so as to recover the cloud application needing redundancy at the redundancy site according to configuration information when a redundancy incident occurs at the production site. As shown in FIG. 1B, the system includes the cloud management module 105 at the production site and the cloud management module 115 at the redundancy site.

The cloud management module 105 at the production site is configured to acquire first description information of a cloud application needing redundancy, where the first description information includes information about a source network used at the production site by the cloud application needing redundancy and information about a source virtual machine used at the production site by the cloud application needing redundancy; generate second description information of the cloud application needing redundancy according to the first description information, where the second description information includes information about a backup network used at the redundancy site by the cloud application needing redundancy and information about a backup virtual machine used at the redundancy site by the cloud application needing redundancy; and register the second description information with the cloud management module 115 at the redundancy site.

The cloud management module 115 at the redundancy site is configured to receive registration information, where the registration information carries the second description information; and recover the cloud application needing redundancy at the redundancy site according to the second description information.

In the embodiment of the present invention, the cloud management module 105 at the production site can acquire the first description information, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the second description information of the cloud application needing redundancy at the redundancy site can be generated, where the second description information can also give an overall description about the deployment of the cloud application needing redundancy at the redundancy site; the cloud management module 105 at the production site can send the second description information to the cloud management module 115 at the redundancy site; and after acquiring the second description information, the cloud management module 115 at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

A redundancy system provided in an embodiment of the present invention is used to configure a cloud application needing redundancy of a production site at a redundancy site, so as to recover the cloud application needing redundancy at the redundancy site according to configuration information when a redundancy incident occurs at the production site. As shown in FIG. 1B, the system includes the cloud management module 105 at the production site and the cloud management module 115 at the redundancy site.

The cloud management module 105 at the production site is configured to acquire first description information of a cloud application needing redundancy, where the first description information includes information about a source network used at the production site by the cloud application needing redundancy and information about a source virtual machine used at the production site by the cloud application needing redundancy; and send the first description information to the cloud management module 115 at the redundancy site.

The cloud management module 115 at the redundancy site is configured to receive the first description information; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and recover the cloud application needing redundancy at the redundancy site according to the second description information. In the embodiment of the present invention, the cloud management module 115 at the redundancy site can acquire first description information of a cloud application needing redundancy from the cloud management module 105 at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the second description information of the cloud application needing redundancy at the redundancy site can be generated, where the second description information can also give an overall description about the deployment of the cloud application needing redundancy at the redundancy site; and when a redundancy incident occurs at the production site, the cloud management module 115 at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

A redundancy system provided in an embodiment of the present invention is used to configure a cloud application needing redundancy of a production site at a redundancy site, so as to recover the cloud application needing redundancy at the redundancy site according to configuration information when a redundancy incident occurs at the production site. As shown in FIG. 1C, the system includes the cloud management module 105 at the production site, the redundancy management module 120 at the production site, the cloud management module 115 at the redundancy site, and the redundancy management module 121 at the redundancy site.

The cloud management module 105 at the production site is configured to record first description information of a cloud application needing redundancy, where the first description information includes information about a source network used at the production site by the cloud application needing redundancy and information about a source virtual machine used at the production site by the cloud application needing redundancy.

The redundancy management module 120 at the production site is configured to acquire the first description information of the cloud application needing redundancy from the cloud management module 105 at the production site; generate second description information of the cloud application needing redundancy according to the first description information, where the second description information includes information about a backup network used at the redundancy site by the cloud application needing redundancy and information about a backup virtual machine used at the redundancy site by the cloud application needing redundancy; and send the second description information to the redundancy management module 121 at the redundancy site.

The redundancy management module 121 at the redundancy site is configured to receive the second description information sent by the redundancy management module 120 at the production site, and register the second description information with the cloud management module 115 at the redundancy site.

The cloud management module 115 at the redundancy site is configured to receive registration information, where the registration information carries the second description information; and recover the cloud application needing redundancy at the redundancy site according to the second description information.

In the embodiment of the present invention, the redundancy management module 120 at the production site can acquire first description information from the cloud management module 105 at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the second description information of the cloud application needing redundancy at the redundancy site can be generated, where the second description information can also give an overall description about the deployment of the cloud application needing redundancy at the redundancy site; the redundancy management module 120 at the production site can send the second description information to the redundancy management module 121 at the redundancy site; and the redundancy management module 121 at the redundancy site registers the second description information with the cloud management module 115 at the redundancy site, so that the cloud management module 115 at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

A redundancy system provided in an embodiment of the present invention is used to configure a cloud application needing redundancy of a production site at a redundancy site, so as to recover the cloud application needing redundancy at the redundancy site according to configuration information when a redundancy incident occurs at the production site. As shown in FIG. 1C, the system includes the cloud management module 105 at the production site, the redundancy management module 120 at the production site, the cloud management module 115 at the redundancy site, and the redundancy management module 121 at the redundancy site.

The cloud management module 105 at the production site is configured to record first description information of a cloud application needing redundancy, where the first description information includes information about a source network used at the production site by the cloud application needing redundancy and information about a source virtual machine used at the production site by the cloud application needing redundancy.

The redundancy management module 120 at the production site is configured to acquire the first description information of the cloud application needing redundancy from the cloud management module 105 at the production site; and send the first description information to the redundancy management module 121 at the redundancy site.

The redundancy management module 121 at the redundancy site is configured to receive the first description information sent by the redundancy management module 120 at the production site; generate second description information of the cloud application needing redundancy according to the first description information, where the second description information includes information about a backup network used at the redundancy site by the cloud application needing redundancy, and information about a backup virtual machine used at the redundancy site by the cloud application needing redundancy; and register the second description information with the cloud management module 115 at the redundancy site.

The cloud management module 115 at the redundancy site is configured to receive registration information, where the registration information carries the second description information; and recover the cloud application needing redundancy at the redundancy site according to the second description information.

In the embodiment of the present invention, the redundancy management module 121 at the redundancy site can acquire first description information from the redundancy management module 120 at the production site, where the first description information not only includes information about a source virtual machine used at the production site by the cloud application needing redundancy, but also includes information about a source network used at the production site by the cloud application needing redundancy; based on the first description information that gives an overall description about the cloud application needing redundancy, the second description information of the cloud application needing redundancy at the redundancy site can be generated, where the second description information can also give an overall description about the deployment of the cloud application needing redundancy at the redundancy site; the redundancy management module 121 at the redundancy site can register the second description information with the cloud management module 115 at the redundancy site, so that the cloud management module 115 at the redundancy site can recover the cloud application needing redundancy completely at the redundancy site according to the second description information, thereby implementing redundancy based on a cloud application. Different from a manner of redundancy based on a virtual machine granularity in the prior art, the embodiment of the present invention implements configuration and recovery for redundancy at an application level, and avoids a possible problem, which is caused by the redundancy based on a virtual machine granularity, that a cloud application cannot be completely and rapidly recovered.

Figure 25:
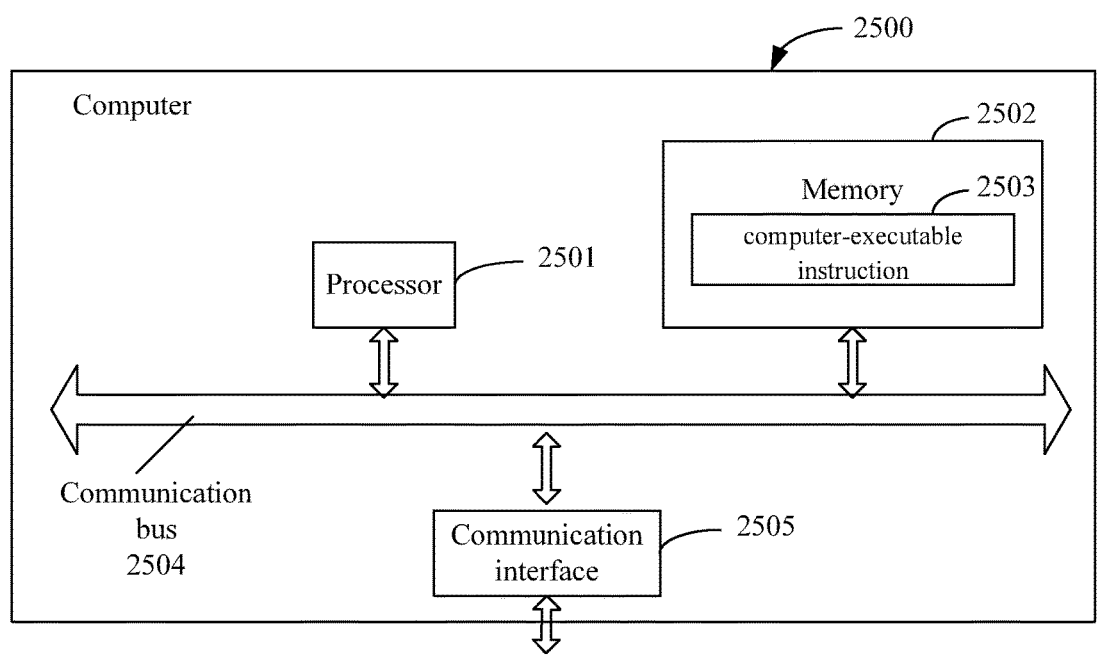
FIG. 25 is a schematic structural diagram of another redundancy apparatus provided by an embodiment of the present invention.

FIG. 25 is a schematic structural diagram of a redundancy apparatus 2500 according to an embodiment of the present invention. The redundancy apparatus provided by the embodiment of the present invention may include a processor 2501, a memory 2502, a communication bus 2504, and a communication interface 2505. The processor 2501, the memory 2502, and the communication interface 2505 are connected using the system bus 2504, and communicate with each other.

The processor 2501 may be a single-core or multi-core central processing unit, or a specific integrated circuit, or is configured to be one or multiple integrated circuits implementing the embodiments of the present invention.

The memory 2502 may be a high-speed random access memory (RAM) memory or a non-volatile memory, for example, at least one disk memory.

The memory 2502 is configured to store a computer-executable instruction 2503. Further, the computer-executable instruction 2503 may include program code.

When the redundancy apparatus runs, the processor 2501 runs the computer-executable instruction 2503, and the method flow according to any one of FIG. 2 to FIG. 5 or the method flow according to any one of FIG. 7 to FIG. 17 can be executed.

A person of ordinary skill in the art should understand that the aspects of the present invention or the possible implementation manners of the aspects may be implemented as systems, methods, or computer program products. Therefore, the aspects of the present invention or the possible implementations of the aspects may be implemented in the form of complete hardware, complete software (including firmware, resident software, and so on), or a combination of software and hardware, which are uniformly referred to as "circuit", "module", or "system" herein. Furthermore, the aspects of the present invention or the possible implementations of the aspects may be in the form of a computer program product, where the computer program product refers to computer-readable program code stored in a computer-readable medium.

The computer-readable medium may be a computer-readable signal medium or a computer-readable storage medium. The computer-readable storage medium includes but is not limited to electronic, magnetic, optical, electromagnetic, infrared, or semiconductor systems, devices, or apparatuses, or any appropriate combination, such as a random access memory (RAM), a read-only memory (ROM), an erasable programmable read-only memory (EPROM or Flash memory), an optical fiber, and a compact disc read-only memory (CD-ROM).

A processor in a computer reads the computer-readable program code stored in the computer-readable medium, so that the processor can execute functions and actions specified in the steps or a combination of the steps in the flowcharts, and generate an apparatus configured to implement functions and actions specified in the blocks or a combination of the blocks in the block diagrams.

The computer-readable program code may be completely executed on a user computer, partially executed on a user computer, used as a separate software package, partially executed on a user computer and partially executed on a remote computer, or completely executed on a remote computer or server. It should also be noted that in certain alternative implementation solutions, functions denoted in the steps of the flowcharts or in the blocks of the block diagrams may not occur according to the orders denoted in the figures. For example, depending on the involved functions, two steps or two blocks consecutively described may indeed be performed concurrently, or these blocks sometimes may be performed in a reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for cloud application redundancy comprising:
    acquiring description information of a cloud application needing redundancy, wherein the description information comprises information about a backup network used at a redundancy site by the cloud application needing redundancy and information about a backup virtual machine used at the redundancy site by the cloud application needing redundancy, wherein the information about the backup virtual machine comprises an association between a virtual network adapter of the backup virtual machine and the backup network;
    creating the backup network according to the information about the backup network;
    creating the backup virtual machine according to the information about the backup virtual machine; and
    associating the backup virtual machine with the backup network according to the association between the virtual network adapter of the backup virtual machine and the backup network,
    wherein the information about the backup virtual machine used at the redundancy site by the cloud application needing redundancy further comprises an identifier, specifications of the backup virtual machine, and information about a second storage unit occupied at the redundancy site by the backup virtual machine,
    wherein creating the backup network according to the information about the backup network comprises sending a virtualized network creating command to a virtualization module at the redundancy site, and
    wherein the virtualized network creating command carries the information about the backup network so that the virtualization module at the redundancy site:
        determines, according to the virtualized network creating command, a virtual switch used by the cloud application needing redundancy; and
        configures the information about the backup network for a port group of the virtual switch.

2. The method according to claim 1, wherein the virtualized network creating command further carries the information about the second storage unit so that the virtualization module at the redundancy site determines, according to the information about the second storage unit, the virtual switch used by the cloud application needing redundancy.

3. The method according to claim 1, wherein after creating the backup network according to the information about the backup network, the method further comprises:
    acquiring a first correspondence between the backup network and the port group of the virtual switch from the virtualization module at the redundancy site; and
    recording a second correspondence between the information about the backup network and the port group of the virtual switch.

4. The method according to claim 3, wherein creating the backup virtual machine according to the identifier, the specifications of the backup virtual machine and the information about the second storage unit comprises sending a command for creating a virtual machine to the virtualization module at the redundancy site, and wherein the command for creating the virtual machine carries the identifier, the specifications of the backup virtual machine and the information about the second storage unit, and instructs the virtualization module at the redundancy site to create the backup virtual machine and a virtual network adapter of the backup virtual machine.

5. The method according to claim 4, wherein associating the backup virtual machine with the backup network according to the association between the virtual network adapter of the backup virtual machine and the backup network further comprises:
    determining a correspondence between the virtual network adapter of the backup virtual machine and the port group of the virtual switch according to the association between the virtual network adapter of the backup virtual machine and the backup network and the correspondence between the information about the backup network and the port group of the virtual switch; and
    instructing, according to the correspondence between the virtual network adapter of the backup virtual machine and the port group of the virtual switch, the virtualization module at the redundancy site to associate the virtual network adapter of the backup virtual machine with the port group of the virtual switch.

6. The method according to claim 1, wherein acquiring the description information of the cloud application needing redundancy comprises receiving registration information, wherein the registration information carries the description information.

7. The method according to claim 1, wherein acquiring the description information of the cloud application needing redundancy at the redundancy site comprises:
    acquiring description information of the cloud application needing redundancy at a production site; and
    generating the description information at the redundancy site according to the description information at the production site, and
    wherein the description information at the production site comprises information about a source network used at the production site by the cloud application needing redundancy and information about a source virtual machine used at the production site by the cloud application needing redundancy.

8. A redundancy apparatus, comprising:
    a processor;
    a memory;
    a bus; and
    a communication interface,
    wherein the memory is configured to store a computer-executable instruction,
    wherein the processor is connected to the memory using the bus, and
    wherein when the redundancy apparatus runs, the processor executes the computer executable instruction stored in the memory so that the redundancy apparatus executes the following steps:
        acquire description information of a cloud application needing redundancy, wherein the description information comprises information about a backup network used at a redundancy site by the cloud application needing redundancy and information about a backup virtual machine used at the redundancy site by the cloud application needing redundancy, and wherein the information about the backup virtual machine comprises an association between a virtual network adapter of the backup virtual machine and the backup network;
        send a virtualized network creating command to a virtualization module at the redundancy site, wherein the virtualized network creating command carries the information about the backup network, so that the virtualization module at the redundancy site determines, according to the virtualized network creating command, a virtual switch used by the cloud application needing redundancy, and configures the information about the backup network for a port group of the virtual switch;
        create the backup virtual machine according to the information about the backup virtual machine; and
        associate the backup virtual machine with the backup network according to the association between the virtual network adapter of the backup virtual machine and the backup network, and
    wherein the information about the backup virtual machine used at the redundancy site by the cloud application needing redundancy further comprises an identifier, specifications of the backup virtual machine, and information about a second storage unit occupied at the redundancy site by the backup virtual machine.

9. The apparatus according to claim 8, wherein the virtualized network creating command further carries the information about the second storage unit so that the virtualization module at the redundancy site determines, according to the information about the second storage unit, the virtual switch used by the cloud application needing redundancy.

10. The apparatus according to claim 8, wherein the processor executes the computer-executable instruction stored in the memory so that the redundancy apparatus further executes the following steps:
    acquire a first correspondence between the backup network and the port group of the virtual switch from the virtualization module at the redundancy site; and
    record a second correspondence between the information about the backup network and the port group of the virtual switch.

11. The apparatus according to claim 10, wherein the processor executes the computer-executable instruction stored in the memory so that the redundancy apparatus further executes the following step: send a command for creating a virtual machine to the virtualization module at the redundancy site, wherein the command for creating the virtual machine carries the identifier, the specifications of the backup virtual machine, and the information about the second storage unit, and wherein the command for creating the virtual machine instructs the virtualization module at the redundancy site to create the backup virtual machine and a virtual network adapter of the backup virtual machine.

12. The apparatus according to claim 11, wherein the processor executes the computer-executable instruction stored in the memory so that the redundancy apparatus further executes the following steps:
- determine a correspondence between the virtual network adapter of the backup virtual machine and the port group of the virtual switch according to the association between the virtual network adapter of the backup virtual machine and the backup network and the correspondence between the information about the backup network and the port group of the virtual switch; and
- instruct, according to the correspondence between the virtual network adapter of the backup virtual machine and the port group of the virtual switch, the virtualization module at the redundancy site to associate the virtual network adapter of the backup virtual machine with the port group of the virtual switch.

13. The apparatus according to claim 8, wherein the processor executes the computer-executable instruction stored in the memory so that the redundancy apparatus further executes the following step: receive registration information, and wherein the registration information carries the description information.

14. The apparatus according to claim 8, wherein the processor executes the computer-executable instruction stored in the memory so that the redundancy apparatus further executes the following steps:
- acquire description information of the cloud application needing redundancy at a production site; and
- generate the description information at the redundancy site according to the description information at the production site, and
- wherein the description information at the production site comprises information about a source network used at the production site by the cloud application needing redundancy and information about a source virtual machine used at the production site by the cloud application needing redundancy.

* * * * *

UNITED STATES PATENT AND TRADEMARK OFFICE
CERTIFICATE OF CORRECTION

PATENT NO. : 9,529,683 B2  
APPLICATION NO. : 14/737188  
DATED : December 27, 2016  
INVENTOR(S) : Xiangyang Wu, Fengshao Zou and Gaoding Fu Page 1 of 1

It is certified that error appears in the above-identified patent and that said Letters Patent is hereby corrected as shown below:

On the Title Page

Item (63), Related U.S. Application Data Should Read:  
Continuation of application No. 14/539,332, filed on Nov. 12, 2014, which is a continuation of application No. PCT/CN2013/085823, filed on Oct. 23, 2013.

Signed and Sealed this  
Eighteenth Day of April, 2017

Michelle K. Lee  
*Director of the United States Patent and Trademark Office*